United States Patent
Pinsky et al.

(10) Patent No.: US 11,019,801 B2
(45) Date of Patent: Jun. 1, 2021

(54) MULTIPLE CELL VOLUNTARY MILKING METHOD AND SYSTEM, COMPRISING A MOBILE MILKING ROBOT HAVING A MINIMAL FOOTPRINT

(71) Applicant: Afimilk Agricultural Cooperative Ltd., Kibutz Afikim (IL)

(72) Inventors: Niv Pinsky, Kibbutz Afikim (IL); Oren Drori, Binyamina (IL); Doron Shalem, Kibbutz Mishmar-Haemek (IL)

(73) Assignee: Afimilk Agricultural Cooperative Ltd., Kibutz Afikim (IL)

( * ) Notice: Subject to any disclaimer, the term of this patent is extended or adjusted under 35 U.S.C. 154(b) by 0 days.

(21) Appl. No.: 16/199,234

(22) Filed: Nov. 26, 2018

(65) Prior Publication Data

US 2019/0090451 A1    Mar. 28, 2019

Related U.S. Application Data

(63) Continuation-in-part of application No. 15/533,654, filed as application No. PCT/IL2016/051046 on Sep. 21, 2016.

(60) Provisional application No. 62/221,168, filed on Sep. 21, 2015, provisional application No. 62/221,173, filed on Sep. 21, 2015, provisional application No. 62/221,116, filed on Sep. 21, 2015, provisional application No. 62/221,189, filed on Sep. 21, 2015, provisional application No. 62/221,216, filed on Sep.

(Continued)

(51) Int. Cl.
*A01K 1/12* (2006.01)
*A01J 5/003* (2006.01)
*A01J 7/04* (2006.01)
*A01J 9/08* (2006.01)
*A01J 5/017* (2006.01)

(52) U.S. Cl.
CPC ................. *A01K 1/12* (2013.01); *A01J 5/003* (2013.01); *A01J 7/04* (2013.01); *A01K 1/123* (2013.01); *A01J 5/017* (2013.01); *A01J 5/0175* (2013.01); *A01J 9/08* (2013.01)

(58) Field of Classification Search
CPC ............ A01J 5/003; A01K 1/12; A01K 1/123
See application file for complete search history.

(56) References Cited

U.S. PATENT DOCUMENTS

| | | |
|---|---|---|
| 2,512,926 A | 6/1950 | Finn |
| 3,786,762 A | 1/1974 | Corkum et al. |
| 4,034,711 A | 7/1977 | Bender et al. |

(Continued)

FOREIGN PATENT DOCUMENTS

| | | | | |
|---|---|---|---|---|
| CA | 2484371 | | 4/2005 | |
| CA | 2484371 A1 | * | 4/2005 | ............. A01J 7/025 |

(Continued)

OTHER PUBLICATIONS

International Search Report for International App. No. PCT/IL2016/051046 dated Jan. 9, 2017.

*Primary Examiner* — Kristen C Hayes

(74) *Attorney, Agent, or Firm* — The Roy Gross Law Firm, LLC; Roy Gross

(57) ABSTRACT

A voluntary milking system and method for treating dairy livestock having fore legs and hind legs, wherein the system comprises milking stalls voluntarily accessible to animals that are milked by mobile units configured to travel between the fore and hind legs of the animal.

14 Claims, 29 Drawing Sheets

Related U.S. Application Data 21, 2015, provisional application No. 62/221,224, filed on Sep. 21, 2015.

(56) References Cited

U.S. PATENT DOCUMENTS

| | | | |
|---|---|---|---|
| 4,344,385 | A | 8/1982 | Swanson |
| 5,572,947 | A | 11/1996 | Larson et al. |
| 5,950,561 | A | 9/1999 | Redmond |
| 6,142,098 | A | 11/2000 | Van Den Berg |
| 6,205,949 | B1 | 3/2001 | Van Den Berg |
| 6,213,052 | B1 | 4/2001 | Oosterling |
| 6,343,566 | B1 | 2/2002 | Eriksson |
| 6,386,141 | B1 | 5/2002 | Forsen et al. |
| 6,401,654 | B1 | 6/2002 | Hallsten et al. |
| 6,427,625 | B1 | 8/2002 | Schuster |
| 6,431,116 | B1 | 8/2002 | Nilsson |
| 6,543,382 | B1 | 4/2003 | Kolstad et al. |
| 7,261,054 | B2 | 8/2007 | Van Den Berg et al. |
| 10,058,069 | B2 * | 8/2018 | Holmertz .......... A01J 5/0175 |
| 2002/0033137 | A1 | 3/2002 | Van Der Lely et al. |
| 2003/0154925 | A1 * | 8/2003 | Van Den Berg ........ A01J 5/003 119/14.02 |
| 2005/0076839 | A1 | 4/2005 | Van Den Berg et al. |
| 2006/0219180 | A1 | 10/2006 | Kassibrahim |
| 2008/0020432 | A1 | 1/2008 | Buttcher et al. |
| 2008/0178811 | A1 * | 7/2008 | Heinrich .......... A01J 5/0175 119/14.04 |
| 2008/0202432 | A1 | 8/2008 | Petterson |
| 2009/0260574 | A1 | 10/2009 | Odeberg et al. |
| 2010/0064974 | A1 | 3/2010 | Van De Berg et al. |
| 2010/0132626 | A1 | 6/2010 | Torgerson et al. |
| 2010/0139723 | A1 | 6/2010 | Torgerson et al. |
| 2010/0282172 | A1 | 11/2010 | Eriksson |
| 2011/0110179 | A1 | 5/2011 | Richards et al. |
| 2012/0067288 | A1 | 3/2012 | Dole et al. |
| 2012/0272913 | A1 | 11/2012 | Hofman et al. |
| 2013/0087101 | A1 | 4/2013 | McDougal et al. |
| 2013/0180455 | A1 | 7/2013 | Holmertz et al. |
| 2013/0239897 | A1 | 9/2013 | Birk et al. |
| 2014/0041591 | A1 | 2/2014 | Krone |
| 2015/0189854 | A1 | 7/2015 | Krone et al. |
| 2015/0257355 | A1 * | 9/2015 | Pinsky ............ A01J 5/003 119/14.01 |
| 2015/0366157 | A1 | 12/2015 | Holmstrom et al. |
| 2016/0128298 | A1 * | 5/2016 | Holmertz .......... A01J 5/0175 119/14.02 |
| 2017/0000074 | A1 | 1/2017 | Berghuis et al. |
| 2017/0231186 | A1 | 8/2017 | Rousseau et al. |
| 2018/0116172 | A1 | 5/2018 | Kraaij et al. |
| 2019/0090451 | A1 * | 3/2019 | Pinsky ............ A01K 1/12 |

FOREIGN PATENT DOCUMENTS

| | | | |
|---|---|---|---|
| DE | 102006012154 A1 | 9/2007 | |
| EP | 1188366 | 3/2002 | |
| EP | 1188366 A1 * | 3/2002 | ............ A01J 5/0175 |
| EP | 1336337 A2 * | 8/2003 | ............ A01J 5/003 |
| EP | 1336337 A2 | 8/2003 | |
| EP | 1447002 | 8/2004 | |
| EP | 1616483 A1 | 1/2006 | |
| WO | 2004084622 A1 | 10/2004 | |
| WO | 2006018845 A2 | 2/2006 | |
| WO | 2011098994 | 8/2011 | |
| WO | WO 2014/081379 | 5/2014 | |
| WO | 2014204395 | 12/2014 | |
| WO | 2014204395 A1 | 12/2014 | |
| WO | WO-2014204395 A1 * | 12/2014 | ............ A01J 5/0175 |
| WO | 2017051414 A1 | 3/2017 | |
| WO | WO-2017051414 A1 * | 3/2017 | ............ A01J 5/007 |
| WO | 2018008026 | 1/2018 | |

\* cited by examiner

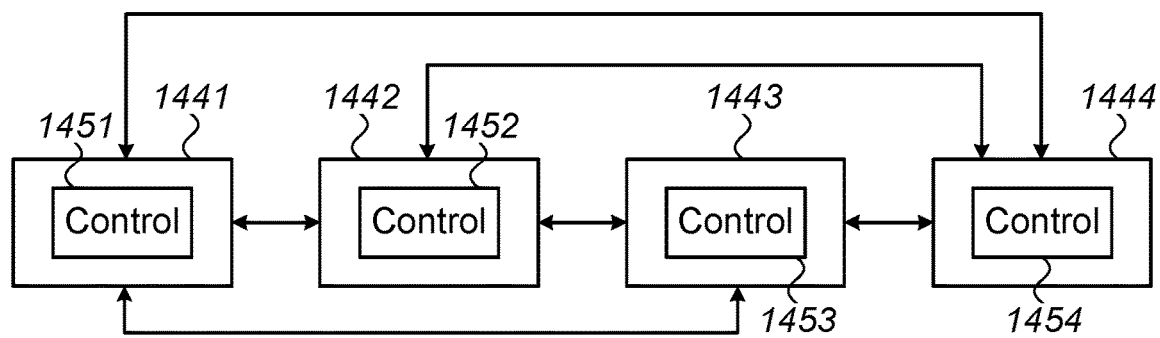
Figure 8
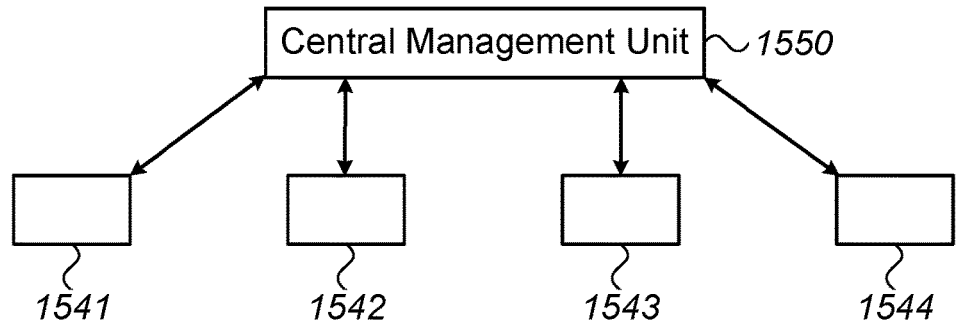
Figure 9
Figure 10
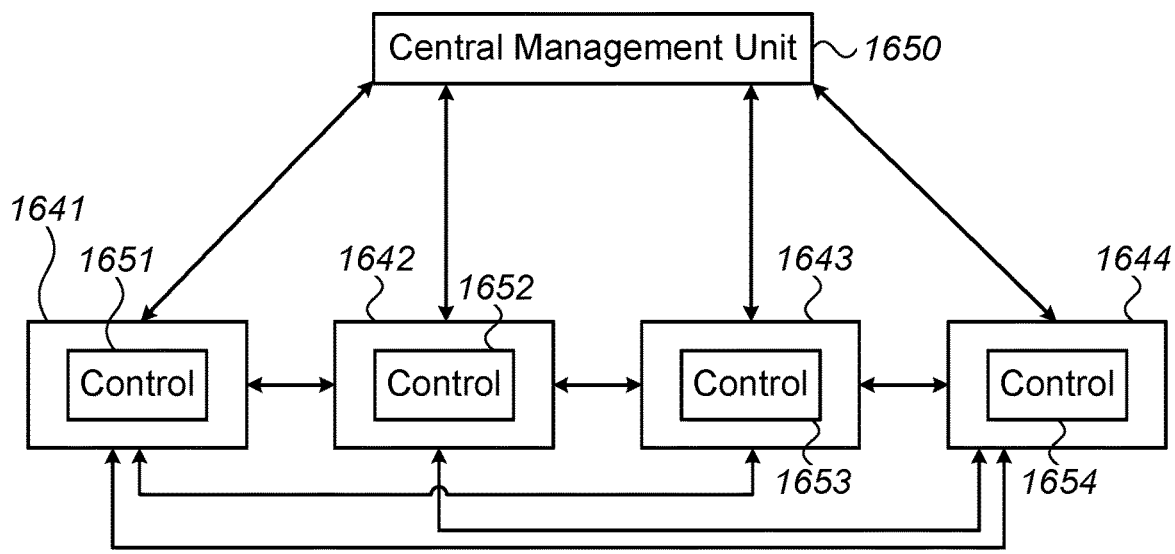

MULTIPLE CELL VOLUNTARY MILKING METHOD AND SYSTEM, COMPRISING A MOBILE MILKING ROBOT HAVING A MINIMAL FOOTPRINT

CROSS REFERENCE TO RELATED APPLICATIONS

This application is a continuation-in-part of U.S. patent application Ser. No. 15/533,654, filed Jun. 7, 2017, which is a National Phase of PCT International Patent Application No. PCT/IL2016/051046, which is entitled "Mobile Milking Robot With Minimal Footprint", filed Sep. 21, 2016, and which claims the benefit of U.S. Provisional Patent Applications No. 62/221,168, filed Sep. 21, 2015, No. 62/221,173, filed Sep. 21, 2015, No. 62/221,116, filed Sep. 21, 2015, No. 62/221,189, filed Sep. 21, 2015, No. 62/221,216, filed Sep. 21, 2015, and No. 62/221,224, filed Sep. 21, 2015, each of which is incorporated herein by reference in its entirety.

FIELD OF THE INVENTION

The invention is directed to a multiple cell voluntary milking method and system, having a mobile milking unit having a minimal footprint.

BACKGROUND OF THE INVENTION

International Patent Applications Publications Nos. WO 2017/051418 and WO 2017/051414, both of which are incorporated herein by reference, disclose a mobile milking unit having a minimal footprint that may be implemented in rotational or parallel milking farms.

However, many milking farms have abandoned the use of rotational and parallel milking techniques and have transferred to robotic systems, known as voluntary milking systems (VMS). The known VMS systems include the use of a stationary box-robot, into which the animals enter when they feel the need to be milked.

Each box-robot includes a large robotic arm, which performs all of the necessary milking actions. Each cow (or other animal being milked) generally enters the box-robot between two and six times a day, each time for about 10-15 minutes. The VMS systems are known to be advantageous since the stress on the milked animals is minimal, thereby enhancing their milk produce. However, the number of cows that can be milked by each box-robot is limited to approximately 60 cows, and, therefore, the box-robot itself is a type of bottle-neck in the VMS system.

Large milking farms may, therefore, either continue using the conventional rotational or parallel systems or otherwise may divide the animals into groups of approximately 60, wherein a box-robot is assigned to each group. This requires both the separation of the animals into groups, which includes rearranging the entire milking farm and, more importantly, requires the purchase of several box-robots, which is a high expense for any milking farm.

Therefore, there is a need both to enhance the milk produce, e.g., by allowing the animals to be freely milked, as well as to limit the cost of implementing the system in an existing milking farm.

SUMMARY OF THE INVENTION

Embodiments of the invention are directed to a voluntary milking system comprising:

a plurality of voluntarily accessible milking stalls for holding dairy livestock, wherein the dairy livestock freely roam in an area outside the milking stalls and enter the milking stalls, without human intervention, for milking;

vertical upright teat cup holders comprising teat cups, which are part of the milking stalls and are connected directly to the main milk-line; and at least one mobile unit comprising equipment for treating livestock and a processor, wherein the mobile unit is configured to:

travel between the fore legs and hind legs of the dairy livestock; and use the equipment to perform at least one action related to a treatment of the dairy livestock;

wherein the equipment includes an arm configured to withdraw the teat cups from the vertical teat cup holder and connect them to the dairy livestock.

According to some embodiments, the milking stalls in the plurality of milking stalls are adjacent to one another, and wherein each milking stall is voluntarily accessible, not depending on the occupancy of any of the other adjacent milking stalls.

According to some embodiments, the milking stall has a front end and a rear end and wherein the milking stall is designed for the animal to enter and exit the milking stall from the rear end.

According to some embodiments, the milking stall is wide enough for the animal to rotate within the milking stall in order to exit the milking stall from the rear end.

According to some embodiments, the milking stall is designed for the animal to back out of the rear end of the milking stall in order to exit the milking stall.

According to some embodiments, the milking stall has a front end, a front side or both, a rear side, a rear end or both, and wherein the milking stall is designed for the animal to enter the milking stall from the rear end or the rear side and exit the milking stall from the front end or the front side.

According to some embodiments, the front end of the milking stall is equipped with a barrier having a closed configuration and an opened configuration, wherein, when the barrier is transformed to the closed configuration, the animal is restrained within the milking stall, and when the barrier is transformed to the opened configuration, the animal may exit the milking stall from the front end.

According to some embodiments, the plurality of milking stalls is divided into separate groups, such that each separate group comprises at least one milking stall.

According to some embodiments, each separate group of milking stalls comprises at least one mobile unit.

According to some embodiments, at least one mobile unit may travel from a first group of milking stalls to a second group of milking stalls.

According to some embodiments, the mobile units are prevented from traveling from a first group of milking stalls to a second group of milking stalls.

According to some embodiments, the vertical upright teat cup holders are protected by a protecting element.

According to some embodiments, the vertical upright teat cup holders move vertically, such that a bottom end of the vertical upright teat cup holders is positioned above the livestock, when the livestock is entering the milking stall, wherein the bottom end of the vertical teat cup holders is positioned below the level of the livestock's udder when the livestock is positioned in the milking stall, and wherein milk from the animal is milked to a high line.

According to some embodiments, the bottom end of the vertical teat cup holders is lower than the platform or ramp on which the livestock enter the milking stall.

Some embodiments of the invention are directed to a method for milking animals, wherein the method comprises:

allowing at least one animal to voluntarily enter a milking stall, wherein the milking stall is one of a plurality of milking stalls and is equipped with a vertical upright teat cup holder comprising teat cups that are connected directly to a main milk line;

a mobile unit positioning itself, at least partially, between the front legs and hind legs of the animal;

attaching the teat cups to the animal by the mobile unit, thereby milking the animal, such that milk flows directed into the main milk line;

detaching the teat cups from the animal and returning them to the vertical upright teat up holder by the mobile unit, when the milking is completed; and allowing the animal to exit the milking stall.

According to some embodiments, the milking stall has a front end and a rear end and wherein the animal both enters and exits the milking stall from the rear end. According to some embodiments, the animal rotates within the milking stall in order to exit from the rear end. According to some embodiments, the animal walks backwards in order to exit from the rear end of the milking stall.

According to some embodiments, the milking stall has a front end, a front side, or both, a rear side, a rear end, or both, wherein the animal enters the milking stall from the rear end or the rear side and exits the milking stall from the front end or the front side.

According to some embodiments, the front end of the milking stall includes a barrier element, which has an opened configuration and a closed configuration, wherein the barrier element is transformed to the opened configuration when the milking is completed, thereby allowing the animal to exit the milking stall from the front end.

According to some embodiments, the vertical upright teat cup holder moves vertically, wherein, during milking, the vertical teat cup holder is at a high position while during a time when an animal enters the milking stall, the vertical teat cup holder is at a low position.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 5A, 5B and 5C present a system according to embodiments of the invention in a parallel milking parlor, wherein FIG. 5A presents

FIG. 8 presents an embodiment of the invention including a plurality of mobile units wherein at least one of them communicates with at least one other unit;

FIG. 9 presents an embodiment of the invention including a plurality of mobile units that communicate with a central management unit;

FIG. 10 presents an embodiment of the invention including a plurality of mobile units wherein at least one of them communicates with one other unit and with a central management unit;

Figure 1:
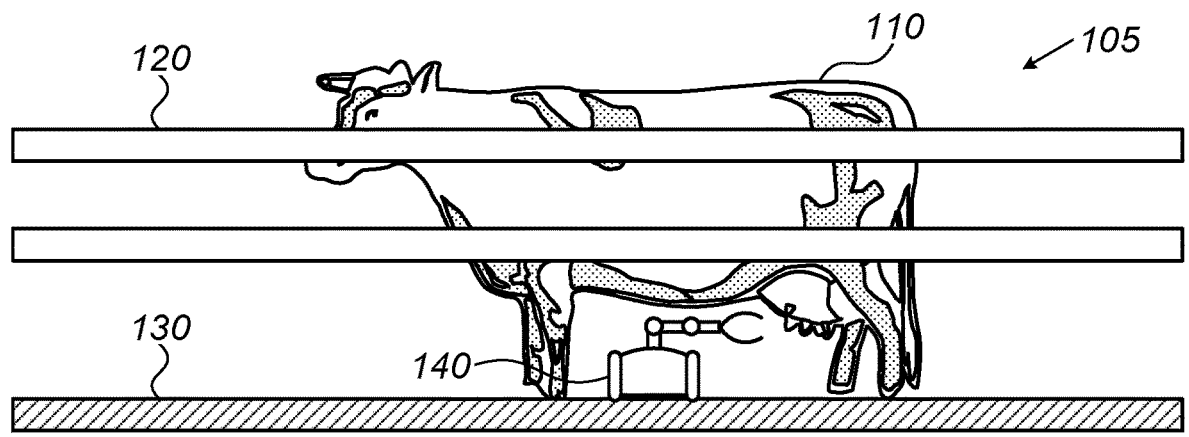
FIG. 1 shows an exemplary system according to embodiments of the invention.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device, that manipulates and/or transforms data represented as physical (e.g., electronic) quantities within the computer's registers and/or memories into other data similarly represented as physical quantities within the computer's registers and/or memories or other information non-transitory processor-readable storage medium that may store instructions, which when executed by the processor, cause the processor to perform operations and/or processes.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Although embodiments of the invention are not limited in this regard, the term "set" when used herein may include one or more items.

It is noted that throughout this document, the definitions of the "parallel milking parlor", "parallel ramp" and the like, include ramps and milking parlors in which the stalls for confining the animals on the same ramp are at least approximately parallel to one another. Thus, those terms include, what is known in the art as parallel ramps/milking parlors as well as parabone ramps/milking parlors, and any other type of ramp/milking parlor, in which the system may operate.

It is noted that throughout this document, unless specifically mentioned otherwise, the terms "teat cups", "milking cups" and the like are interchangeable. It is noted that throughout, term such as "vertical upright holder", "vertical upright teat cup holder", and the like, are interchangeable unless specifically mentioned otherwise or unless a person skilled in the art would understand that any one of those terms has a different and/or broader definition than the other. In this respect, it is noted that the vertical upright teat cup holders are defined herein to hold teat cups that are directly connected to the main milk-line; however, other than being connected to the main milk-line, the teat cups held in the vertical upright teat cup holder are not connected to any robotic arm or the like. It is further emphasized that the teat cups according to this invention are defined to be connected to the main milk-line, although not to any robotic arm or the like. As detailed herein, the teat cups may be held/gripped by a robotic arm of the mobile unit; however, they are not connected thereto. It is further noted that, throughout, terms such as "communication", "collaboration", "coordination" and the like, relevant to the operation of several mobile units in the same system, are interchangeable unless specifically mentioned otherwise, or unless a person skilled in the art would understand that any one of those terms has a different and/or broader definition than the other. In this respect, and as detailed herein, several mobile units may communicate/collaborate/coordinate directly with one another and/or via a central management system or any other appropriate means.

Although dairy livestock (and in particular, cows) are mainly discussed herein, it will be understood that embodiments of the invention may be applicable to any type of livestock (e.g., goats, sheep, horses etc.). Particularly, even when cows are specifically related to, the embodiments are intended to cover any other type of livestock as well. Although milking of dairy livestock is mainly discussed herein it will be understood that embodiments of the invention may be applicable to other operations, or treatments of livestock. For example, treatments, such as, disinfecting or washing the livestock, heating an organ of the livestock and/or milking may all be enabled or performed by a system or method according to embodiments of the invention. Embodiments of the invention may be applicable to operations such as; diagnostic measures, acquiring an image, testing for pregnancy or capturing a heartbeat of a fetus and/or identifying the livestock.

Embodiments of the invention may include a system and method for treating livestock. The term "treating" includes treatments such as, milking, disinfecting, administering medicaments, and/or testing and/or diagnosing, and the like. In particular, embodiments of the invention may include a system and method directed to milking, disinfecting and other treatments and/or testing of dairy livestock. An embodiment of a system may include a ramp for containing dairy livestock and one or more mobile units configured to travel on the ramp, below the abdomen, i.e., between the front and hind legs of the dairy livestock, and perform at least one action related to a treatment of the dairy livestock. In this respect it is noted that throughout the application, unless specifically mentioned otherwise, when the terms "under the livestock" "below the livestock" or similar terms are used, they refer to a mobile unit found on the same geometric plane as the livestock, i.e., on the same ramp, platform, rail or guide attached to the ramp, and the like, while being positioned, at least partially, under the belly/abdomen of the livestock, between the fore and hind legs thereof.

Further, throughout this application, unless specifically mentioned otherwise or unless would have been understood otherwise by a person skilled in the art, the milking stalls referred to in this application are voluntarily accessible milking stalls, which the animals enter to be milked on a voluntary basis. In order to encourage animals to enter the milking stalls, they may be provided with feed/water in the stalls and/or in the vicinity of the stalls, e.g., in a waiting area adjacent to the stalls. According to some embodiments, once the animal enters the waiting area, it can leave only after it has been milked in one of the milking stalls or after the system determines that the animal in the stall does not need to be currently milked, e.g., it was already milked in the last hour and the like. Further, in order for the animal to remain in the stall until the milking process is completed, e.g., until the post-dip sanitation of the teats is completed, headlocks may be used in the stalls. It is noted that, since the milking of the animals is on a voluntary basis, the animals may enter and exit the milking stalls independently of one another, wherein no animal can enter a stall that is already occupied.

Some embodiments of the invention are directed to a voluntary milking system comprising a mobile milking unit (referred to herein as VMS-MU), such as the mobile unit as detailed in International Patent Applications Publications Nos. WO 2017/051418 (referred to herein as "WO '418") and WO 2017/051414 (referred to herein as "WO '414")), and as incorporated herein by reference.

In the VMS-MU system of the invention, the milk, milked by the mobile unit, is milked into teat cups connected to the main milk line of the milking parlor, and, therefore, the milk is transferred from the milked animal directly into the main milk-line, without being stored in any type of receptacle or being transferred from receptacle to receptacle, or the like.

Accordingly, the VMS-MU system of the invention includes
voluntarily accessible milking stalls for holding dairy livestock, wherein the dairy livestock freely roam in an area outside the milking stalls and enter the milking stalls, without human intervention, for milking;
a vertical upright teat cup holder comprising teat cups, which are part of the milking stalls and are connected directly to the main milk-line; and
at least one mobile unit comprising:
equipment for treating livestock and a processor, wherein the mobile unit is configured to:
travel between the fore legs and hind legs of the dairy livestock; and
use the equipment to perform at least one action related to a treatment of the dairy livestock;
wherein the equipment includes an arm configured to withdraw the teat cups from the vertical teat cup holder and connect them to the dairy livestock.

Although, generally, the use of a single mobile unit is detailed herein, it is noted that any number of mobile units may be used, each of which may perform a specific type of action, may be designated to be utilized in specific milking stalls, or the like.

In the VMS-MU system of the invention, the milking stalls may be positioned at any appropriate location in the milking parlor, e.g., approximately at the center of the compound in which the animals are held. The mobile unit may travel between the milking stalls, performing any required actions. The VMS-MU system may include any number of milking units as well as any number of milking stalls.

According to some embodiments, the milking stalls are all positioned at least partially adjacent to one another. According to other embodiments, the milking parlor may include any number of groups of milking stalls, wherein each group may comprise any number of milking stalls, at least partially adjacent to one another, and wherein the different groups may be located in different locations within the milking parlor.

In order for the animals to be able to enter and exit the milking stalls independently of one another, each group of milking stalls may be designed in order to allow such independent movement. For example, each stall may be accessible from one certain point, angle or area, such that the accessibility of each stall is not limited by the occupation of animals in the neighboring stalls. For example, the stalls may be relatively large in comparison to conventional stalls, such as those used in parallel dairy farms. The size of the stalls and/or the spaces between them may allow the animals to enter and exit the stalls regardless of which stalls are or are not occupied.

For example, the size and/or spaces between the stalls may allow the animals to maneuver within the stalls and/or in the area between the stall, such that the animal may even turn around in the stalls/area between the stalls in order to exit the stalls. In such embodiments, the milking stalls may include any appropriate type of restraints designed to restrain the animals in certain positions within the stall while being milked. Such restraints may move in any appropriate direction, such that the animals may easily enter and exit the stall, being restrained only during the milking process, which may include pre-dip, post-dip, etc.

For example, any of the equipment in the stalls, such as the teat cup holder, may change position according to the stall being occupied or not, such that the equipment does not hinder the entrance/exit of the animal from the stall. For example, the teat cup holder may be positioned behind the animal, approximately between its hind legs while the animal is being milked; however, when the stall is not occupied, or when the milking process, including the post-dip, is completed and the animal turns to exit the stall, the teat cup holder may change position, e.g., it may retract into a compartment lower than the level on which the animals stand to be milked.

According to some embodiments, the position and height of the teat cups holders is set such that the animal may walk over the teat cup holder while entering/exiting the milking stall. For example, the teat cup holder may be at least partially recessed, i.e., the bottom of the teat cup holder may be lower than the platform/ramp on which the animals stand/walk. In certain embodiments, the platform/ramp may be raised above ground level, such that the animals may walk over the teat cup holders without interference.

According to some embodiments, the teat cup holders, and any other equipment, any be protected by any type of protecting element, such as barriers, fencings, boxes and the like, such that the maneuvering of the animals between the teat cup holders, or any another equipment, is not harmed by any of the movements of the animals. For example, if the milking stalls are designed such that the animals walk above, around, between or next to the teat cup holders, the teat cup holders may be surrounded by any appropriate barrier or fencing, including any sides as well as the top of the teat cup holder, such that the animal movements do not interfere with the teat cup holders. The barriers, fencings, boxes and the like may be designed such that both, the teat cup holders and the animals do not interfere or harm one another, and also, such that barriers, fencings, boxes and the like do not interfere with the movements of the mobile unit. According to some embodiments, any part of the barriers, fencings, boxes and the like may have more than one position and may change position according to the location of animals in the vicinity of the milking stalls, inside the milking stalls and/or entering of exiting the milking stalls. For example, the teat cup holders may be protected by a top cover when the animals enter/exit the stall or are in the vicinity of the stalls, wherein, once an animal is position inside the milking stall, the top cover is removed, tilted back, i.e., in a direction away from the interior of the milking stall, or moved sidewise and the like, thereby enabling the mobile unit free access to the teat cups. The change of position of any part of the barriers, fencings, boxes and the like may be performed due to a response to any appropriate type of sensor or due to any other mechanical movements within the stall, when positioning the animal in the milking position. For example, if there are restrains, such as head barrier that move when the animal enters the stall, the movement of those elements may cause the movement of any of the elements protecting the treat cup holders or any other protecting elements appropriate.

According to some embodiments, the group of milking stalls is designed similarly to a group of milking stalls in a conventional parallel milking farm, such that the group of cells resembles a section of one of the two parallel ramps in a parallel milking farm. According to such an embodiment, the animals enter the group of cells from the side, wherein, as in a parallel milking farm, in order to occupy a milking stall, each animal must proceed until the farthest vacant milking stall. Once the animal is milked (or the system determines that it need not be milked currently) it may exit the stall, e.g., by a gate opening at the front of the stall, where the head of the animal is positioned during milking. Thus, while the animals are somewhat limited regarding their entrance to the stalls, i.e., they can enter only a vacant stall that is closer and adjacent to the entrance to the group of stalls than the first occupied milking stalls, when exiting the stalls, each animal may be independent from one another, since each stall may be equipped with a designated exit gate, e.g., at the front of the stall, where the head of the animal is positioned during milking. According to some embodiments, as detailed herein, each of the stalls may be provided rear exits rather than front exits, e.g., the stalls are wide enough to allow the animal to rotate therein in order to exit the stall. In this embodiment and throughout, the system may be such that the animal may exit the stall only after the milking process is completed, including any post-dip processes etc.

Figure 23:
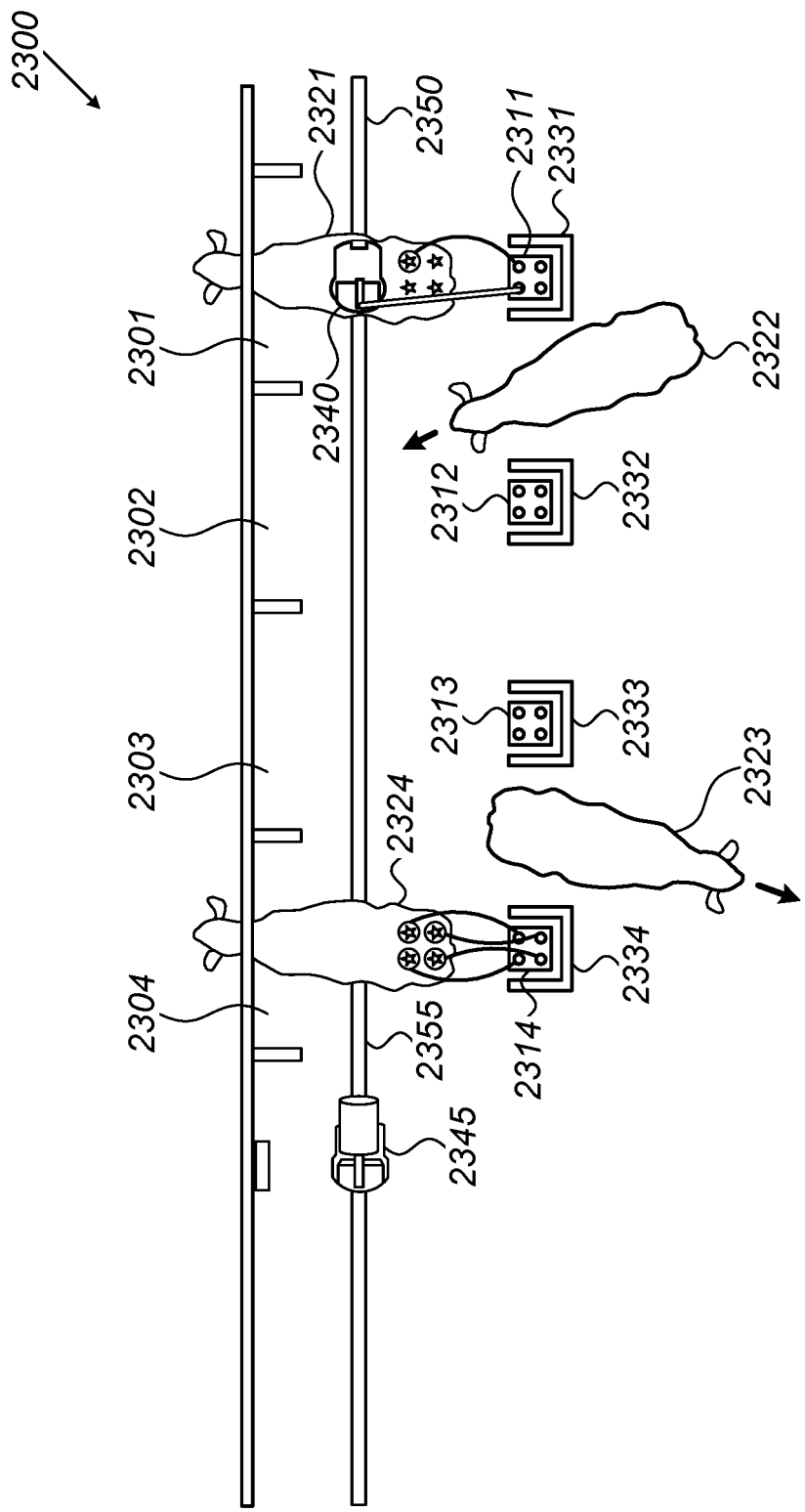
FIG. 23 presents one group of milking stalls according to an embodiment of the invention.

Reference is now made to FIG. 23, presenting one group of milking stalls 2300 according to an embodiment of the invention. Milking stall group 2300 is depicted as including four milking stalls, 2301, 2302, 2303 and 2304, wherein each of milking stalls 2301, 2302, 2303 and 2304 includes teat cup holder 2311, 2312, 2313, 2314, respectively. As shown in FIG. 23, each of stalls 2301, 2302, 2303 and 2304 is independently accessible to the animals. As shown in FIG. 23, even though stall 2301 is occupied by animal 2321, animal 2322 may enter stall 2302 without disturbing any of the equipment, including teat cup holders 2311 and 2312, and further, without disturbing animal 2321, which occupies stall 2301. It is noted that, even though not shown in FIG. 23, animal 2322 could have entered stall 2302 from the other side of teat cup holder 2312, i.e., between teat cup holders 2312 and 2313, instead of between teat cup holders 2311 and 2312. As further shown in FIG. 23, each of teat cup holders 2311, 2312, 2313 and 2314 may be protected by protecting element, 2331, 2332, 2333 and 2334, respectively. Protecting element, 2331, 2332, 2333 and 2334, may be, e.g., fencing, a box like fixture, or the like. Similar protecting elements may be used for any equipment that should be protected from the movements of the animals, the mobile unit or any other element in the milking farm, in or around the milking stalls of the invention.

As further presented in FIG. 23, animals may exit any of the stalls independently of the occupancy of any of the other stalls. For example, animal 2323 is presented as exiting stall 2303, even though stall 2304 is occupied by animal 2324. In order for an animal to exit the stall, and although not particularly shown, the stalls are sufficiently wide (or have enough space between them) in order to allow the animal to turn/rotate in the stall and exit the stall from one of the sides of the teat cup holder. For example, in FIG. 23, animal 2323 is depicted as exiting stall 2303 after it has already been milked (or the system determined that it need not be milked) and after it turned around in stall 2303 in order to exit from the back of the stall, between teat cup holders 2313 and 2314. It is noted in this respect that animal 2323 could have exited stall 2303 from between teat cup holders 2312 and 2313.

As further presented in FIG. 23, group of stalls 2300 includes rail 2350, which may include segment 2355. Any number of mobile units, e.g., mobile units 2340 and 2345 may travel along rail 2350 and treat the animals, e.g. perform pre-dip, milking and post-dip procedures, as detailed herein. For example, mobile unit 2340, positioned under the abdomen of animal 2321, is presented as reaching and gripping the front left teat cup in teat cup holder 2311, in order to grip attach that teat cup to the front left teat of animal 2321 after already having attached the front right teat cup to the front right teat of animal 2321. Any of the mobile units, when not in action, may park in any location, such as segment 2355, as shown for mobile unit 2345 in FIG. 23. The system of the invention may also include a designated parking area. For example, when parked on segment 2355 (or any other appropriate location), the mobile unit may be out of the way of any animal movements, including the entering and exiting of any of the animals form any of the stalls, such that the mobile unit is not harmed by the any animal movements and vice versa. According to other embodiments, the mobile unit may park at any location along rail 2350 when not in use and may travel from one position to another when animal movements are detected by sensors included in the system, ensuring that there are no collisions between the mobile unit and any of the animals. It is noted that although two mobile units are presented in FIG. 23, any number of mobile units may be implemented according to the invention, as detailed herein. According to some embodiments, a single mobile unit is designated for each group of milking stalls.

Figure 24:
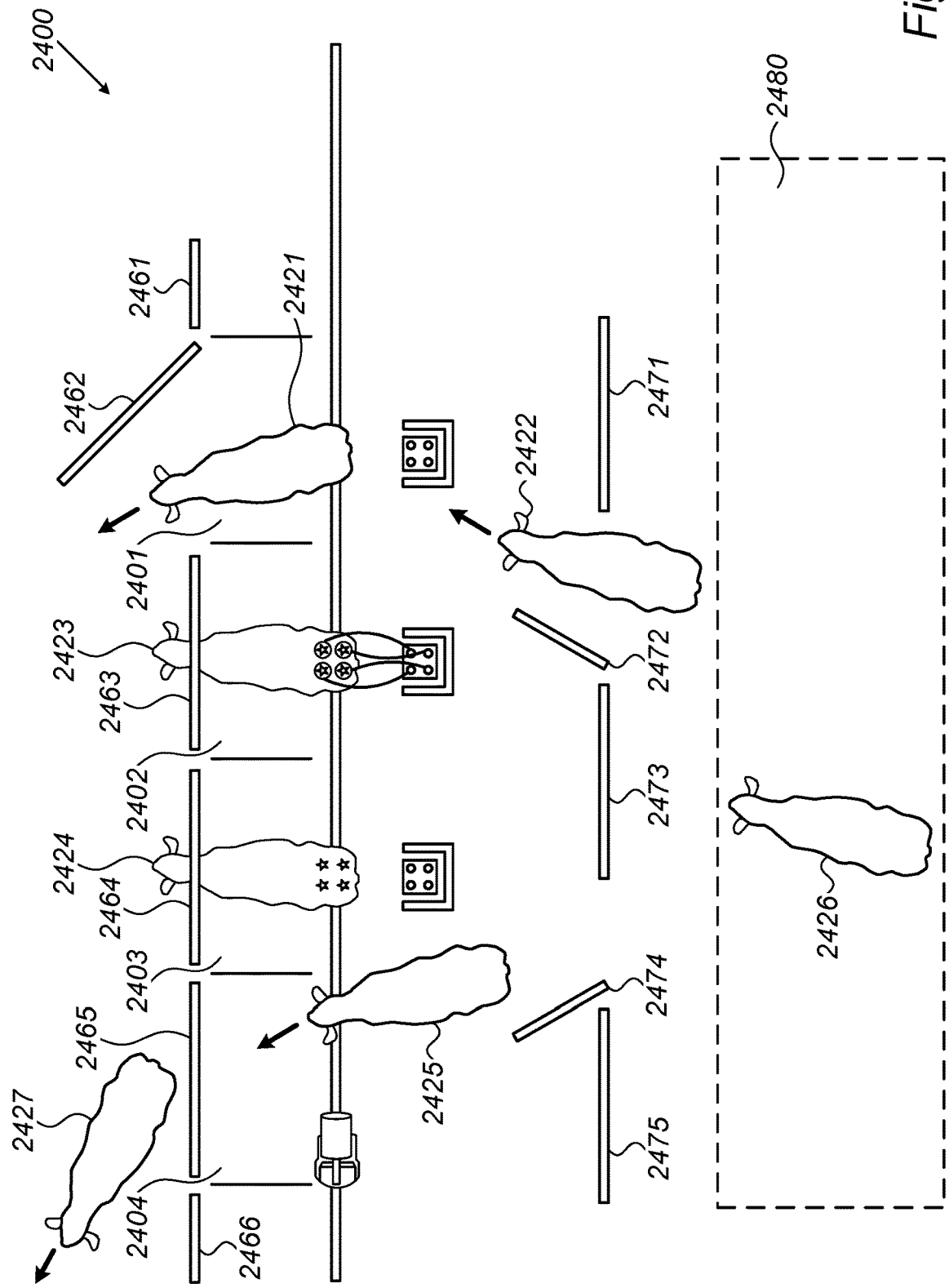
FIG. 24 presents an embodiment of a group of milking stalls according to the invention.

Reference is now made to FIG. 24, presenting an embodiment of a group of milking stalls of the invention, in which the milking stalls include front barrier sections 2461, 2462, 2463, 2464, 2465 and 2466 and rear barrier sections 2471, 2472, 2473, 2474 and 2475. It is noted that although only a certain number of stalls and barriers is depicted, any the system of the invention may include any number of stalls in any group of stall, as well as any number of barriers and barrier sections. Unlike the embodiment presented in FIG. 23, in which the animals entered and exited the stalls from the same side, i.e., the rear end of the stalls, according to the embodiment presented in FIG. 24, the animals enter stalls 2401, 2402, 2403 and 2404 from the rear end of the stalls and exit stalls 2401, 2402, 2403 and 2404 from the front end of the stalls.

In order for the animal to remain within stalls 2401, 2402, 2403 and 2404 until the completion of the milking process, the front ends of the stalls include barriers, such as front barrier sections 2461, 2462, 2463, 2464, 2465 and 2466. The barriers that are at the front of the stalls, such as front barriers, 2462, 2463, 2464 and 2465 have a closed and an opened configuration. When in the closed configuration, such as front barrier sections 2463, 2464 and 2465, the animals in the stalls, such as animals 2423 and 2424, or the animals entering the stalls, such as animal 2425, are prevented from leaving the stalls until the milking process is completed. They are also prevented from using the stalls as a passageway, since the front ends of the stalls are closed by the front end barriers. It is noted that headlocks may also be included in each of the stalls in order to ensure that the animal remains in position until the conclusion of the milking process.

When the milking process is completed, including the post-dip, the front barrier section is transferred to its opened configuration, as presented for front barrier section 2462, thereby allowing animal 2421 to exit stall 2401 from the front end of the stall. Once the animal has exited the stall, the front barrier section is transformed back into its closed configuration. For example, animal 2427 completely exited stall 2404, and, therefore, front barrier section 2465 transferred back into its closed configuration, and the next animal entering stall 2404, such as animal 2425, will be blocked by front barrier section 2465 until the end of the milking process of animal 2425. The transformation of any of the barrier sections from closed to opened configuration, or vice versa, may be performed by the system by a combination of any appropriate sensors, central command systems and the like.

According to some embodiments, also presented in FIG. 24, the rear end of stall group 2400 includes rear barrier sections 2471, 2472, 2473, 2474 and 2475. It is noted that, although rear barrier sections 2471, 2472, 2473, 2474 and 2475 are presented together with front barrier sections 2461, 2462, 2463, 2464, 2465 and 2466, these are two separate embodiments. Thus, some embodiments of the invention may include only front barrier sections, only rear barrier sections, or both front barrier sections and rear barrier sections. Therefore, for example, the embodiment presented in FIG. 23 could also include rear and/or front barrier sections, and the embodiment presented in FIG. 24, having front barrier sections, may not comprise the rear barrier sections and vice versa.

Rear barrier sections 2471, 2472, 2473, 2474 and 2475 may prevent the entrance of animals into occupied stalls and may also prevent the exiting of an animal from a stall before the milking process has been completed. For example, animal 2426, waiting behind rear barrier section 2473, in its closed configuration, is prevented from entering stalls 2402 and 2403 since those stalls are already occupied by animals 2423 and 2424, respectively. Once stalls are vacated, e.g., stall 2404, from which animal 2427 has exited from the front end of the stall, rear barrier sections 2474 and/or 2475 may be transformed to their opened configuration, thereby allowing animal 2425 to enter stall 2404. Once animal 2425 enters stall 2404, rear barrier section 2474 will close behind it, thereby preventing other animals from entering stall 2404 while it is occupied. According to some embodiments, the rear barrier section, e.g., rear barrier section 2472, may be transformed to its opened configuration even when an animal only partially exits the stall, such as animal 2421, exiting stall 2401. According to some embodiments, the rear barrier section, e.g., rear barrier section 2472, may be transformed to its opened configuration once the corresponding front barrier section, e.g., front barrier section 2462, is opened, even before the animal in the stall even begins to exit the stall. Thus, once the milking process is completed, the animal occupying the stall may be, at least partially, pushed out of the front of the stall by the animal entering the stall from the back, wherein the front barrier section closes after the first animal leaves the stall, but in time to restrain the entering animal into an appropriate milking position.

According to some embodiments, any number of mobile units may be designated to each group of milking stalls. According to some embodiments, the mobile units may have the ability to travel from one group of stalls to another. According to other embodiments, the mobile units may operate within a specific group of milking stalls, without traveling from one group of milking stalls to another. According to some embodiments, even if a mobile unit is designated to operate within a certain group of milking stalls, an operating system, operated manually or automatically, may command any mobile unit to travel from one group of stalls to another. This may be useful in case of the malfunction of any of the mobile units. This may also be useful if one group of stalls proves to be more attractive to the animals and, therefore, requires more actions on part of the mobile units.

Thus, if the number of animals attending a certain stall or group of stalls is above a certain, predetermined, threshold, the mobile units may be transferred from certain stalls or groups of stalls to others in order to maximize the number of animals that may be milked at any time interval.

Therefore, according to some embodiments of the invention, the VMS-MU system of the invention includes sensors for determining the number of animals using, or intending to use, each stall/group of stalls. According to some embodiments, the VMS-MU system of the invention includes sensors for determining the number of animals intending to use each stall/group of stalls, e.g., by determining the number of animals in a waiting zone outside of the stall/group of stalls, or the number of animals in any determined range from the stall/group of stalls.

According to some embodiments, the VMS-MU system of the invention includes a waiting zone in which animals may wait for their turn to enter a milking stall, in case all milking stalls are occupied. According to some embodiments, the waiting zone includes an entrance, through which the animals enter the waiting zone. According to some embodiments, the waiting zone includes an exit, through which the animals exit the waiting zone. According to some embodiments, the entrance to and exit from the waiting zone are the same element, such that the animal can enter or exit the waiting zone at the same location. According to some embodiments, the waiting zone includes more than one entrance and/or exit. According to some embodiments, once an animal enters the waiting zone, it can exit only via a milking stall, after it is milked or after the system determines that it need not be milked currently. According to some embodiments, the waiting zone includes feed/water in order to entice the animals to enter the waiting zone in order for them to eventually be milked. It is noted that, throughout the application, the phrases "waiting zone" and "waiting area" are interchangeable, unless specifically mentioned otherwise or unless a person skilled in the art would have understood otherwise.

According to some embodiments, the entrance(s) to the milking stalls are located within the waiting zone. According to some embodiments, the waiting zone is located at the entrance to the milking stalls or group of stalls. According to some embodiments, the waiting zone is located around the milking stalls or group of stalls. According to some embodiments, each group of stalls has its own waiting zone. According to some embodiments, any number of groups of stalls may share the same waiting zone.

The waiting zone may be a defined area, e.g., a fenced-in area with an entrance and/or exit. According to other embodiments, the waiting zone is a predetermined range in front of or around the milking stalls group(s) of milking stalls, wherein the predetermined range is not fenced in.

The waiting zone, whether physically defined, e.g., by a fence, or not, may include feeding stalls, water troughs and/or means for monitoring the livestock found in the waiting zone. As mentioned above, the mobile units of the invention may be directed to different stalls or groups of stalls, according to the numbers of animals in those stalls or in their designated waiting zone.

Waiting zone 2480, as presented in FIG. 24, in which animal 2426 is waiting to be milked, is an example of a waiting zone that is not a physically defined area, i.e., it is not fenced in or the like; rather it is defined by the characteristics of the zone, e.g., the occupation thereof by animals may be covered by sensors, feeding and watering stations may be strategically placed in waiting zone 2480, and any other means appropriate to cause the animals to wait in waiting zone 2480 until a stall is freed, in order for them to be milked.

Figure 25B:
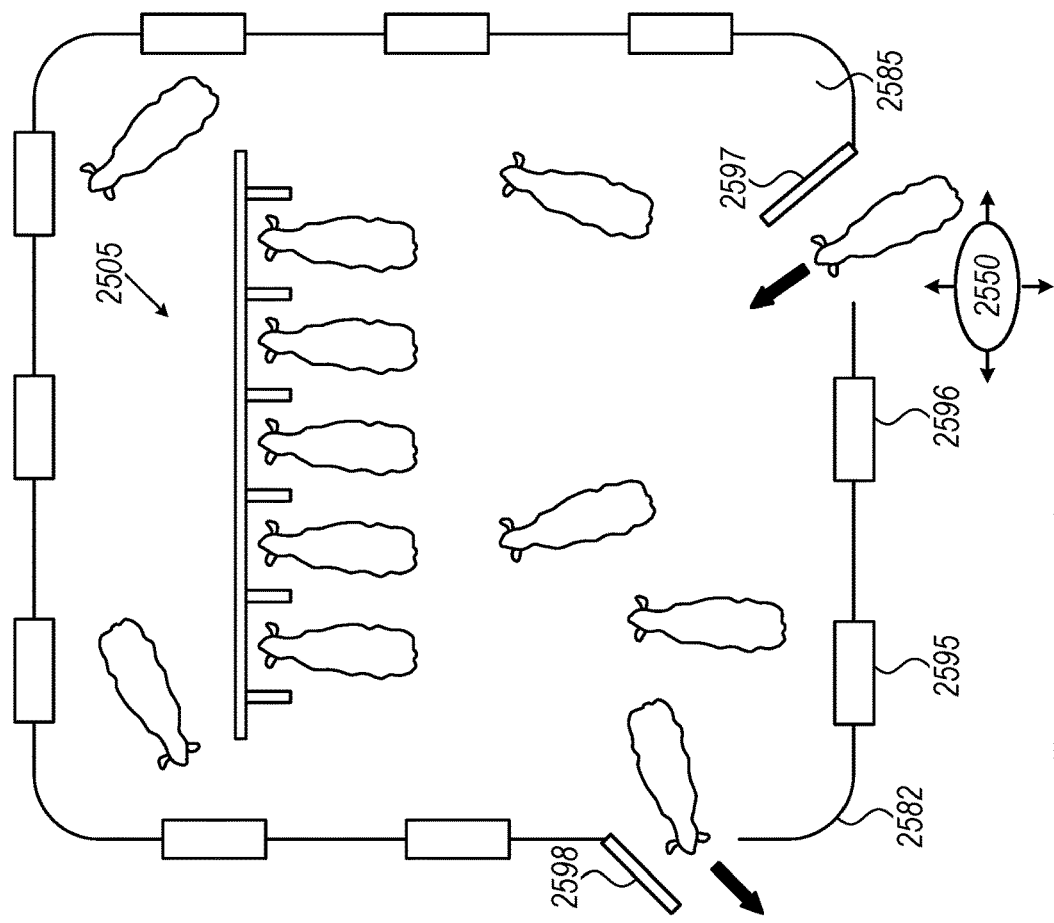
FIGS. 25A and 25B present two embodiments of the VMS-MU system of the invention, each comprising a waiting zone.
Figure 25A:
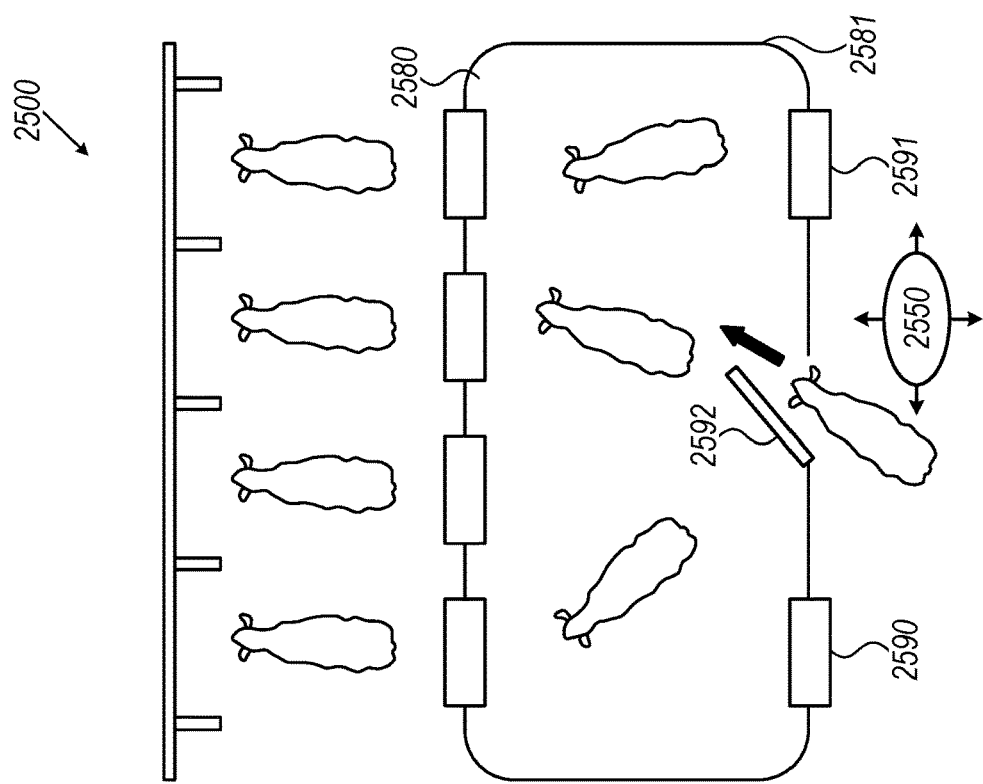

Reference is now made to FIGS. 25A and 25B, presenting two additional embodiments of the VMS-MU system of the invention, comprising waiting zone 2580, positioned behind stall group 2500, and waiting zone 2585, position around stall group 2505, respectively. Waiting zones 2580 and 2585 may be defined by a fence or railing 2581 and 2582, respectively, wherein gates that may open or close, such as gates 2590, 2591, 2595 and 2596 (closed configuration) as well as gates 2592, 2597 and 2598 (opened configuration), so as to allow animals in and out of the waiting zone. According to some embodiments, the gates may be one-way gates, such that animals may enter the waiting zone via those gates (or gate) and then, may exit only though the milking stalls, after being milked or after the system determines that the animal need not be currently milked.

According to some embodiments, once entering the waiting zone, the animals must pass through the milking stalls, before exiting the waiting zone, such that the animals are released from the milking stalls after being milked or after the system determines that they need not be currently milked. According to other embodiments, animals are free to enter and exit the waiting zone, with or without having been milked and/or independently of the systems determination regarding the milking status of the animals. According to some embodiments, the number of animals in the waiting zone is limited, and, therefore, once the maximal number of animals is reached, the gates into the waiting zone are locked, thereby preventing additional animals from entering the waiting zone until at least one animal leaves the waiting zone, e.g., into a milking stall or outside into the surrounding animal compound area, e.g., area 2550.

According to some embodiments, if the system determines that the animal need not be currently milked, any of the "one-way" entrances into the waiting areas may be designed such that animals that need not be currently milked may leave the waiting zone via those "one-way" entrances. In other words, if the system determines that a certain animal needs to be milked, it may leave the system only through a milking stall after it has been milked; however, if the system determines that a certain animal need not be currently milked, that particular animal may be allowed to leave the system, e.g., the waiting area, by any other opening, even if that opening would not allow an animal that needs to be milked to pass there-through in that direction, i.e., exiting the system.

According to some embodiments, the animals in the milking farm may be divided into groups, e.g., by fencing, wherein each group has milking stalls designated particularly to that group, e.g., by the location of those milking stalls. The groups of animals may be of any appropriate size, wherein the animals may be divided by any appropriate criteria, including number of animals, age, gestation cycle considerations and the like.

The size of the animal groups may be changed as required and further, animals may be allowed to transfer from group to group (or made to transfer from group to group) under certain circumstances. For example, if the milking stalls designated for a first group are full, animals from the first group may be allowed to travel to the milking stalls designated for other groups, if those stalls are not full or are not as busy at any time point. The system may automatically reassign any number of animals to different groups, e.g., by opening and closing gates in the dairy farm, thereby allowing animals to transfer from one group to another. This may be performed in order for the milking stalls to be used at the highest possible capacity, such that the animals are not require to wait for their turn to be milked or that their waiting time be minimized. The VMS-MU system of the invention may include sensors for determining which milking stalls are occupied, the number of animals in the vicinity of each stall/group of stalls, e.g., in designated waiting zones, and the like, as detailed herein. Feed, water, or the like, may be used in order to encourage animals to transfer from one group to another, when desired. The feed may be automatically provided by the VMS-MU system of the invention, wherein the feed may be provided in specific zones in order to lure the animals to those zones, e.g., near empty milking stalls, e.g., into the waiting zones, e.g., into particular areas within the waiting zones that are particularly in the vicinity of empty milking stalls. The feed, or the like, may be provided, e.g., by a mobile unit.

Figure 26:
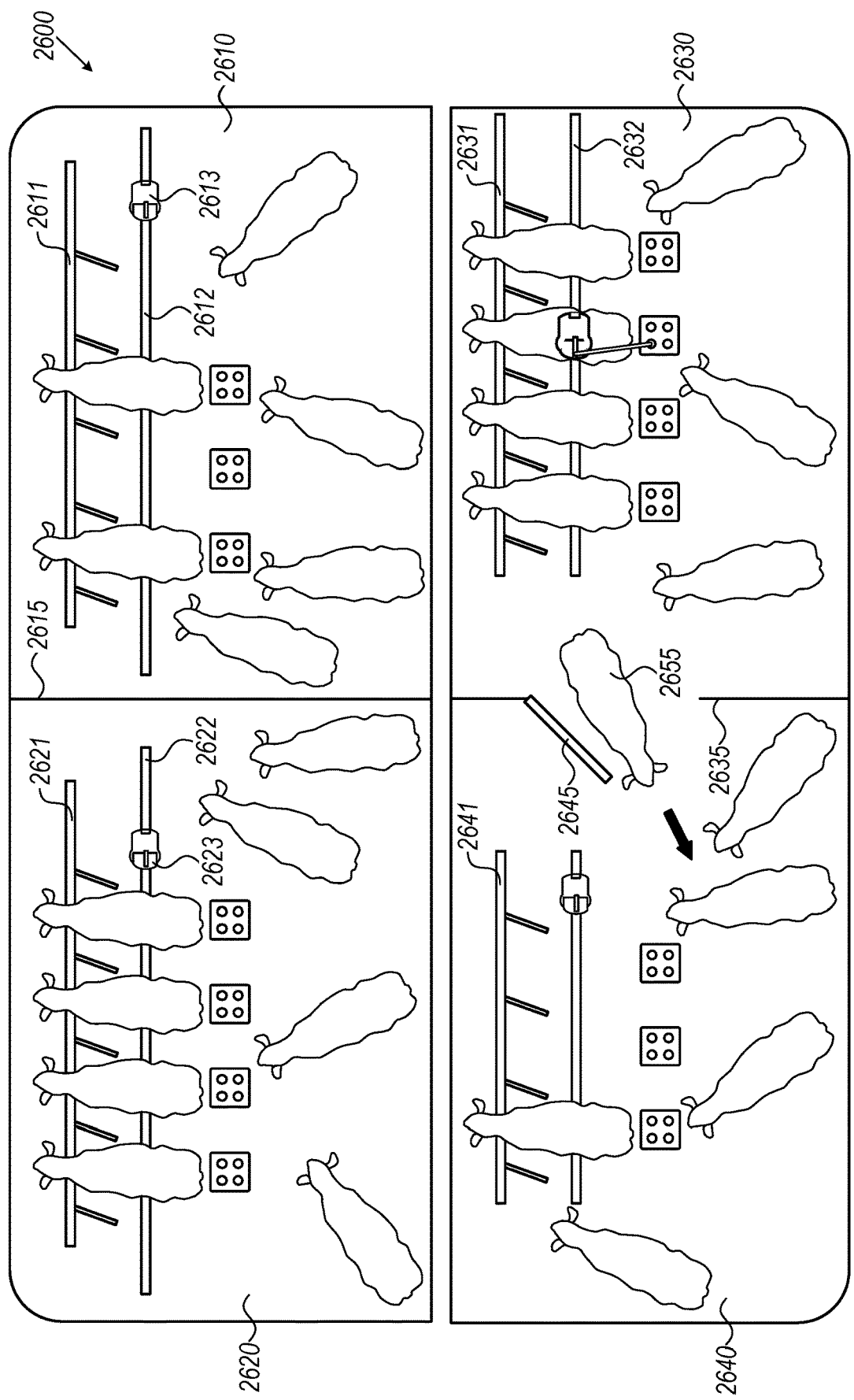
FIG. 26 presents two embodiments of the VMS-MU system of the invention, one of which includes two completely separate compounds, while the second embodiment comprises two separate compounds connected to one another by a gate.

Reference is now made to FIG. 26, presenting two examples of the VMS-MU system of the invention, wherein system 2600 includes two separate compounds 2610 and 2620, separated from one another by fence 2615. A separate group of animals is placed in each of compounds 2610 and 2620. Further, each of compounds 2610 and 2620 has a designated group of milking stalls, 2611 and 2621, respectively, which the animals in each of compounds 2610 and 2620 voluntarily attend in order to be milked. Further, each of compounds 2610 and 2620 has a designated mobile unit, 2613 and 2623, respectively, which travels along rail 2612 or 2622, respectively. It is noted that, as detailed throughout, although one mobile unit is presented for each of compounds 2610 and 2620 in FIG. 26, any number of mobile units may be used. It is also noted that, although not shown in FIG. 26, there may be an opening between compounds 2610 and 2620 that is large enough to allow a mobile unit to travel between those compounds, yet small enough such that animals cannot pass between those compounds. Further, although mobile units 2613 and 2623 are presented as traveling along rails 2612 and 2622, respectively, some embodiments of the invention include mobile units that travel freely, i.e., not along rails, as well as mobile units that may travel both along rails and freely. It is further noted that, although group of stalls 2611 is depicted as including three milking stalls and group of stalls 2621 is depicted as including four milking stalls, the invention covers any appropriate options for any number of stalls in any group of stalls. The number of stalls may depend on the number of animals in the compound, the milk abundance of the animals in the compound, and the like. Further, although not shown, any type of waiting zones may be included in compounds 2610 and/or 2620.

Since, as presented in FIG. 26, compounds 2610 and 2620 are separated by fence 2615, the animals of each group are completely separated from one another, and, therefore, even if milking stall group 2621 is fully occupied, as shown in FIG. 26, the animals in compound 2620 cannot reach milking stall group 2611, even though, as shown in FIG. 26, not all stalls in milking stall group 2611 are occupied. It is noted that, although not shown, it may be possible, by human intervention, to transfer animals from compound 2610 to compound 2620, or vice versa.

FIG. 26 further presents compounds 2630 and 2640, which are separated from one another by fence 2635; however, fence 2635 includes gate 2645, which has opened and closed configurations, allowing animals, under certain circumstances, to move from compounds 2630 to compound 2640, or vice versa. For example, as shown in FIG. 26, all four stalls of milking stall group 2631 are occupied, animal 2655, which wants to be milked, passes through gate 2645 (in its opened configuration) in order to move from compound 2630 to compound 2640, thereby allowing animal 2655 to enter the stalls of milking stall group 2641, which are not fully occupied. Further, although not shown, compounds 2630 and/or 2640 may include waiting zones, intended to lure animals to be milked. Sensor may be used to determine that it would be beneficial to cause animals to move from one compound to another, e.g., in order to lure them towards vacant milking stalls. In instances when the system determines that it would be beneficial to lure animals to move from one compound to another feed/water may be provided particularly in the compound, e.g., in the waiting zone of the compound into which it is desired that the animals move into. Accordingly, feed/water may be selectively provided in certain waiting zones in certain times, e.g., when there are vacant milking stalls. This is true whether or not several compounds exist.

According to some embodiments, gate 2645 remains in its closed configuration until the stalls of one of group of milking stalls 2631 or 2641 is fully occupied. When one group of milking stalls, 2631 or 2641, is fully occupied any appropriate constellation of sensors and control systems may command gate 2645 to transform to its opened configuration in order to allow the passage of animals between compounds 2630 and 2640. According to some embodiments, gate 2645 has two different opened configurations—the first opened configuration allowing animals to pass from compound 2630 to compound 2640 (and not vice versa), and the second opened configuration allowing animals to pass from compound 2640 to compound 2630 (and not vice versa). Accordingly, the sensors/control system detecting that milking stall group 2631 is completely occupied, may command gate 2645 to be transformed from the closed configuration to the first opened configuration, allowing animals to pass from compound 2630, in which the milking stalls are fully occupied, into compound 2640, in which the milking stalls are not fully occupied. Further, the sensors/control system detecting that milking stall group 2641 is completely occupied, may command gate 2645 to be transformed from the closed configuration to the second opened configuration, allowing animals to pass from compound 2640, in which the milking stalls are fully occupied, into compound 2630, in which the milking stalls are not fully occupied. According to such embodiments, the animals are allowed to pass only from a compound in which the stalls are complete occupied into a different compound. According to some embodiments, the sensors/control system will allow animals to transfer only from a compound in which all of the stalls are occupied into a compound that has free stalls. Therefore, for example, if both groups of milking stalls 2631 and 2641 are fully occupied, the system may cause gate 2645 to stay in its closed configuration, allowing gate 2645 to transform to an opened configuration only if one of the stalls in one of groups of milking stalls 2631 or 2641 is vacated. It is noted that, although FIG. 26 presents systems 2600 and 2650, each comprising two compounds, i.e., compounds 2610 and 2620 in system 2600 and compounds 2630 and 2640 in system 2650, any system of the invention may comprise any number of compounds, any number of milking stall groups in any of the compounds, any number of milking stalls in any of the milking stall groups and any number of mobile units.

According to some embodiments, the animals are not divided into groups, and, therefore, any of the animals in the milking farm may voluntarily go to be milked in any of the milking stalls in the milking farm, whether the milking stalls are divided into groups or not. In order to minimize the waiting time of the animals to be milked, they may be lured to empty milking stalls (or to milking stalls where the line of animals waiting to be milked is shorter in comparison to other milking stalls/groups of milking stalls). As mentioned above, the VMS-MU system of the invention may include sensors for determining which milking stalls are occupied, the number of animals in the vicinity of each stall/group of stalls, the number of animals in any of the waiting zones, and the like. Feed or the like may be used in order to encourage animals to go to certain milking stalls/groups of milking stalls, when desired. The feed may be automatically provided by the VMS-MU system of the invention, wherein the feed may be provided in specific zones in order to lure the animals to those zones, e.g., near empty milking stalls or waiting zones. The feed may be provided, e.g., by a mobile unit.

The mobile unit of the invention may travel along any appropriate type of rail, as detailed herein. The rail may be designed in sections, wherein each group of stalls includes a rail separate from the rails of the other groups of stalls (see, e.g., FIG. 26 in which rails 2612 and 2622 are separate from one another, as are rails 2631 and 2641). According to some embodiments, there may be connecting rails between the rails of the different groups of stalls. The rails may be included only in the stall areas or they may stretch along any region of the milking farm, e.g., the waiting zones, areas in which feed is to be provided by the mobile unit, any region through which the mobile unit enters the stall area, e.g., from outside the animal compound, etc. According to some embodiments, the mobile unit is capable of traveling only along a rail, and, therefore, the rail, or sections of the rail, may stretch to any point that must be reached by the mobile unit. According to other embodiments, the mobile unit may be capable of traveling independently of a rail and therefore, the rail may or may not be present in any of the regions within the dairy farm. For example, the rail may be present only in the milking stalls, such that, when milking the animals, and performing actions relevant to milking, such as pre-dip and post-dip, the mobile unit travels along a rail, but, when traveling from one group of stalls to another, when entering the stalls from outside the animal compound, when providing feed at a location within the animal compound, etc., the mobile unit travels freely, without a rail.

The mobile unit may be provided with sensors allowing it to maneuver throughout the animal compound and/or any other region of the dairy farm, without disturbing any of the equipment in the farm and further, without disturbing the freely roaming animals.

The milking stalls that are adjacent to one another may be in line with one another, or they may form a semi-circular shape, a semi-elliptical shape, a circular shape, an elliptical shape, a polygon, a partial polygon, or any other appropriate shape that allows the animals free access to the milking stalls. Any group of milking stalls may be in any shape, wherein the different groups of milking stalls may or may not have the same shape. The shape and size of any group of milking stalls may be designed so as to allow animals to enter and exit the stalls without disturbing any of the other animals in the adjacent stalls or any of the equipment. The shape and size of any group of milking stalls may further be designed to allow the animals to rotate within the stalls without disturbing equipment of other animals in adjacent stalls. Such a design, allowing the animals to rotate within the stalls, would allow the animals to enter and exit the stalls from the same direction, e.g., the rear end of the stall, or between the two rear ends of two stalls, ensuring that no equipment, including the teat cup holders, that may be placed approximately at the center of the rear end of the stalls, is disturbed by the animal movements, including the rotation thereof.

Figure 27:
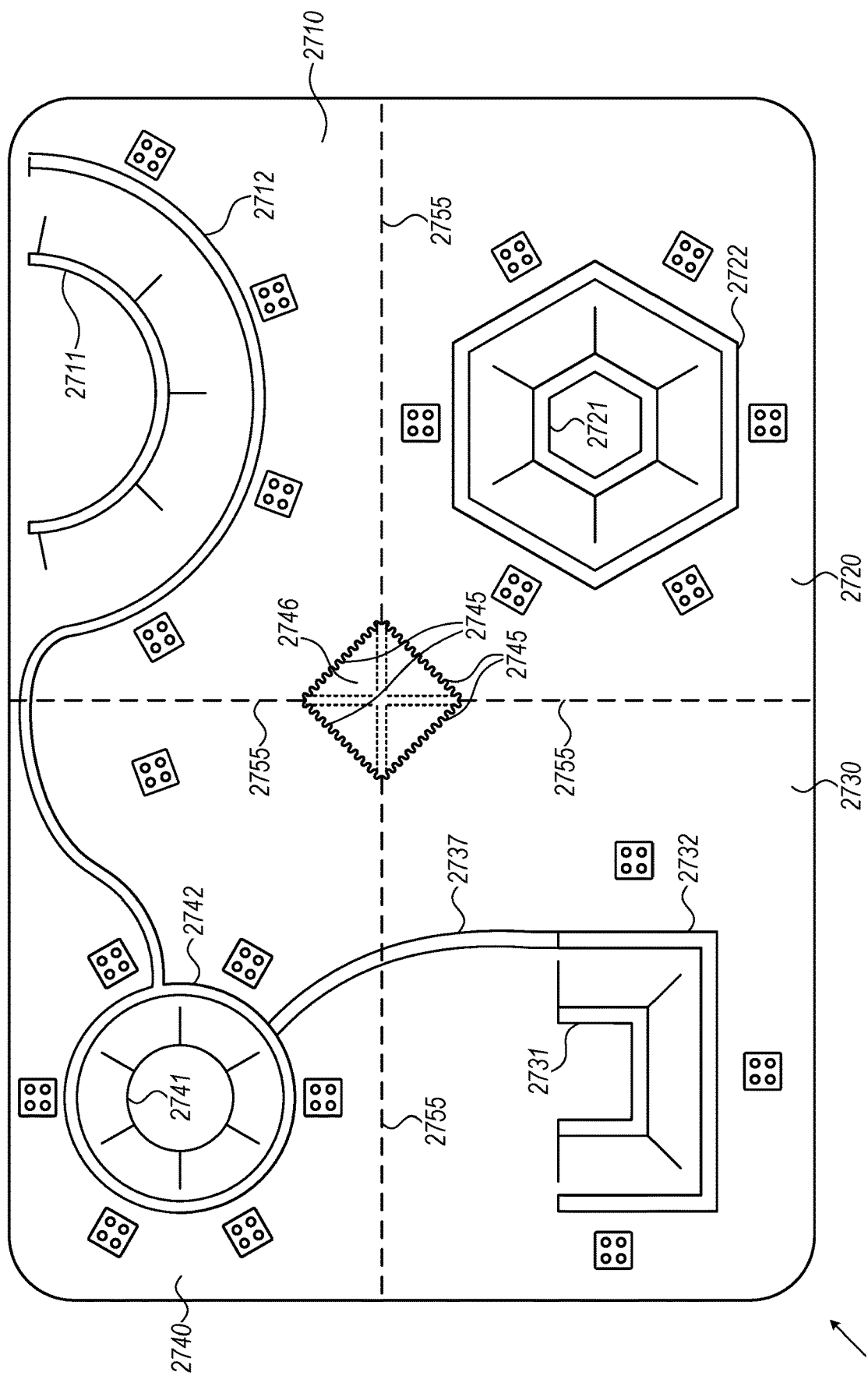
FIG. 27 presents an embodiment of the VMS-MU system of the invention comprising four compounds, each comprising a different setup and shape of a group of milking stalls.

Reference is now made to FIG. 27, presenting an embodiment of the VMS-MU system of the invention, particularly, system 2700. System 2700 includes four compounds, namely compounds 2710, 2720, 2730 and 2740. Any of compounds 2710, 2720, 2730 and 2740 may be separated from one another by fence 2755 or any segment thereof. Any number of gates, such as gates 2745 may be added to fence 2755, thereby allowing passage of animals from compound to compound, as detailed herein. For example, as shown in FIG. 27, four gates 2745 may be included in fence 2755, allowing animals to pass into intermediate zone 2746, from which they may enter any of compounds 2710, 2720, 2730 and 2740. It is noted that, in such an embodiment, the segments of fence 2755 found inside intermediate zone 2746, represented in FIG. 27 by a double dashed line, may be non-existent, in order to allow the free movements of the animals within intermediate zone 2746, thereby allowing them to move through any one of gates 2745. As detailed herein regarding gate 2645 in FIG. 26, gates 2745 may be controlled such that they are opened and closed according to the occupation of the milking stalls in the compound that they lead to.

As presented in FIG. 27, each one of compounds 2710, 2720, 2730 and 2740 comprises a milking stall group having a particular shape. As shown, milking stall group 2711 in compound 2710 has a semi-circular (or semi-elliptical) shape, milking stall group 2721 in compound 2720 has a polygonal, particularly, a hexagonal, shape, milking stall group 2731 in compound 2730 has a semi-polygonal shape and milking stall 2741 in compound 2740 has a circular (or elliptical) shape. It is noted that, although in system 2700 each one of milking stall groups 2711, 2721, 2731 and 2741 has a different shape and set-up, any of the groups, or all of the milking stall groups, could have the same shape. Further, any other shapes and setups may be contemplated; the presented shapes are examples only. The number of stalls may vary as well, as detailed herein, wherein the main limitation regarding the milking stalls of the invention is that each milking stall has a designated teat cup holder, as detailed herein. It is noted that any stall may be missing a teat cup holder for any reason, wherein that stall will generally not be used for milking animals.

As further presented in FIG. 27, a rail may be provided for mobile unit(s) (not shown) to travel along. For example, as shown in FIG. 27, each of rails 2712, 2722, 2732 and 2742 may be designed to match the shape of milking stall groups 2711, 2721, 2731 and 2741, respectively. Having the rail corresponding to the shape and setup of the milking stalls may allow the mobile unit(s) (not shown) to travel between the stalls and, in each stall, easily reach the designated teat cup holder, as detailed herein.

As shown in FIG. 27, any group of stalls, such as milking stall group 2721 may have an independent rail 2722 that is not connected to any of the other rails in system 2700. In addition, any of the rails may be connected to one another, for example, rails 2712 and 2742 may be connected as shown such that they may be considered to be one rail, servicing two separate milking stall groups 2711 and 2741. Such a rail setup may allow mobile units (not shown) to provide service in both milking stall groups 2711 and 2741.

Further, although each milking stall group may have its own designated rail, segments and branches may be added to those rails in order to connect them to one another. For example, segment (or branch) 2737 may be added in order to connect rails 2732 and 2742, such that even though rail 2732 is designated to service milking stall group 2731 and rail 2742 is designated to service milking stall group 2741, any mobile unit (not shown) may travel from rail 2732 to rail 2742 (or vice versa) via segment (or branch) 2737, such that the same mobile unit(s) may operate in both compounds 2730 and 2740 or, at least, the mobile units may travel from compound to compound according to the requirements of the system. For example, if there are several animals in the stalls of group 2741 waiting to be milked, a free mobile unit from compound 2730 may travel to compound 2740 in order to connect teat cups to the animals in the stalls of group 2741.

Figure 28:
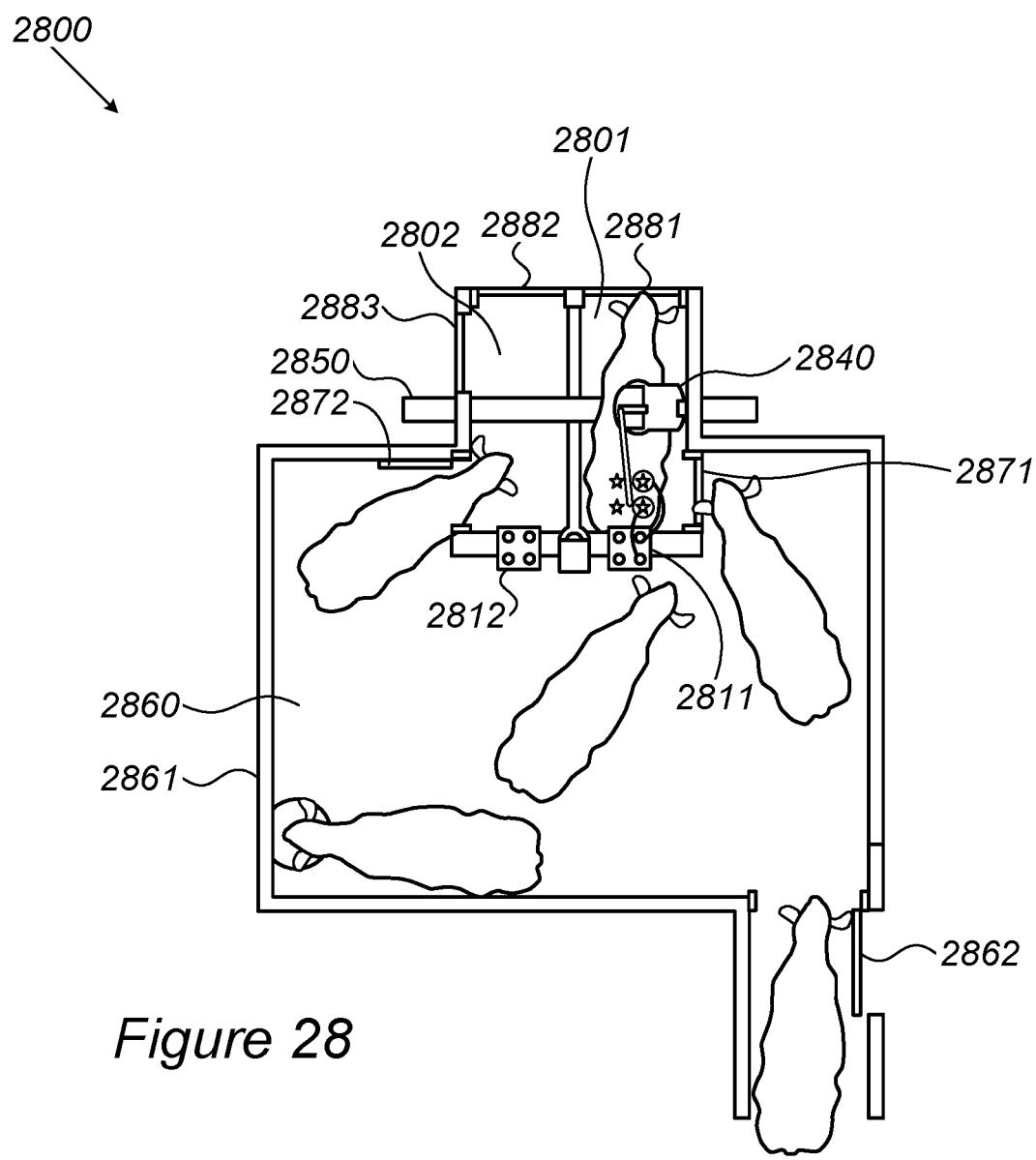
FIG. 28 presents an embodiment of the VMS-MU system of the invention comprising two milking stalls, accessible from the rear side.

Reference is now made to FIG. 28, presenting an embodiment of the VMS-MU system of the invention, particularly, system 2800. System 2800 includes milking stalls 2801 and 2802, mobile unit 2840, rail 2850 and waiting zone 2860. Waiting zone 2860 is surrounded by fence or barrier 2861, wherein animals may enter waiting zone 2860 via gate 2862, which has a closed configuration and an opened configuration (shown in the opened configuration). According to some embodiments, gate 2862 may be converted to its closed configuration when the number of animals in waiting zone 2860 is above a certain predefined threshold. According to some embodiments, gate 2862 is a one-way gate, i.e., animals may enter waiting zone 2860 via gate 2862; however, they cannot exit waiting zone 2860 via gate 2862. According to such an embodiment, the animals may exit waiting zone 2860 only via one of milking stalls 2801 or 2802, after being milked or after the system determines that that particular animal need not be currently milked.

According to the embodiment shown in FIG. 28, the entrance into each one of milking stalls 2801 and 2802 is from the side of the milking stall, such that teat cup holders 2811 and 2812, respectively positioned at the rear end of stalls 2801 and 2802, do not interfere with the entrance of the animals into stalls 2801 and 2802 and further, the animals cannot harm teat cup holders 2811 and 2812 while entering stalls 2801 and 2802. The entrances to each one of stalls 2801 and 2802 may be equipped with gates, such as 2871 and 2872. Each of gates 2871 and 2872 may have a closed configuration and an opened configuration. The gate may be transformed to its closed configuration when the stall is occupied, such as gate 2871, which is in its closed configuration since stall 2801 is occupied. Similarly, gate 2872 is shown to be in its opened configuration since stall 2802 is vacant.

As detailed above, each of stalls 2801 and 2802 may include an entrance gate, shown as gates 2871 and 2872, respectively, through which animals may enter stalls 2801 and 2802. Further, each of stalls 2801 and 2802 may comprise an exit gate, e.g., at the front end of the stall, such as exit gates 2881 and 2882. Exit gates 2881 and 2882 allow animals that have been milked (or that the system determines that currently need not be milked) to exit milking stalls 2801 and 2802, respectively. In FIG. 2800, exit gates 2881 and 2882 are presented in their closed configuration; however it is to be understood that each of those exit gates may transform to its opened configuration in order to allow an animal to exit the milking stall after being milked or after the system determines that that animal need not be currently milked. It is further noted that, although exit gates 2881 and 2882 are presented as being positioned at the front end of each of milking stalls 2801 and 2802, respectively, any other exit gates, allowing animals to exit the milking stalls may be considered. For example, any one of the milking stalls may include a side exit gate, such that the animal may exit the milking stall from the side, such as exit gate 2883.

It is noted that, although system 2800 includes only two milking stalls, it may be designed to include any number of milking stalls, all grouped together or in separate groups. For example, if all milking stalls are designed such as milking stalls 2801 and 2802, wherein the entrance gates 2871 and 2872 are positioned at the side of the milking stalls, the milking stalls may be divided into groups of two, such as milking stalls 2801 and 2802, thereby enabling an animal to enter each of the stalls from the side. If the number of stalls in any of the groups is higher, some of the stalls, e.g., the left-most and right-most stalls, may include side entrance gates, such as gates 2871 and 2872, while the other stalls may include back entrance gates, as presented, e.g., in FIG. 29, or entrance gates positioned between two stalls, such as presented in FIG. 24.

Figure 29:
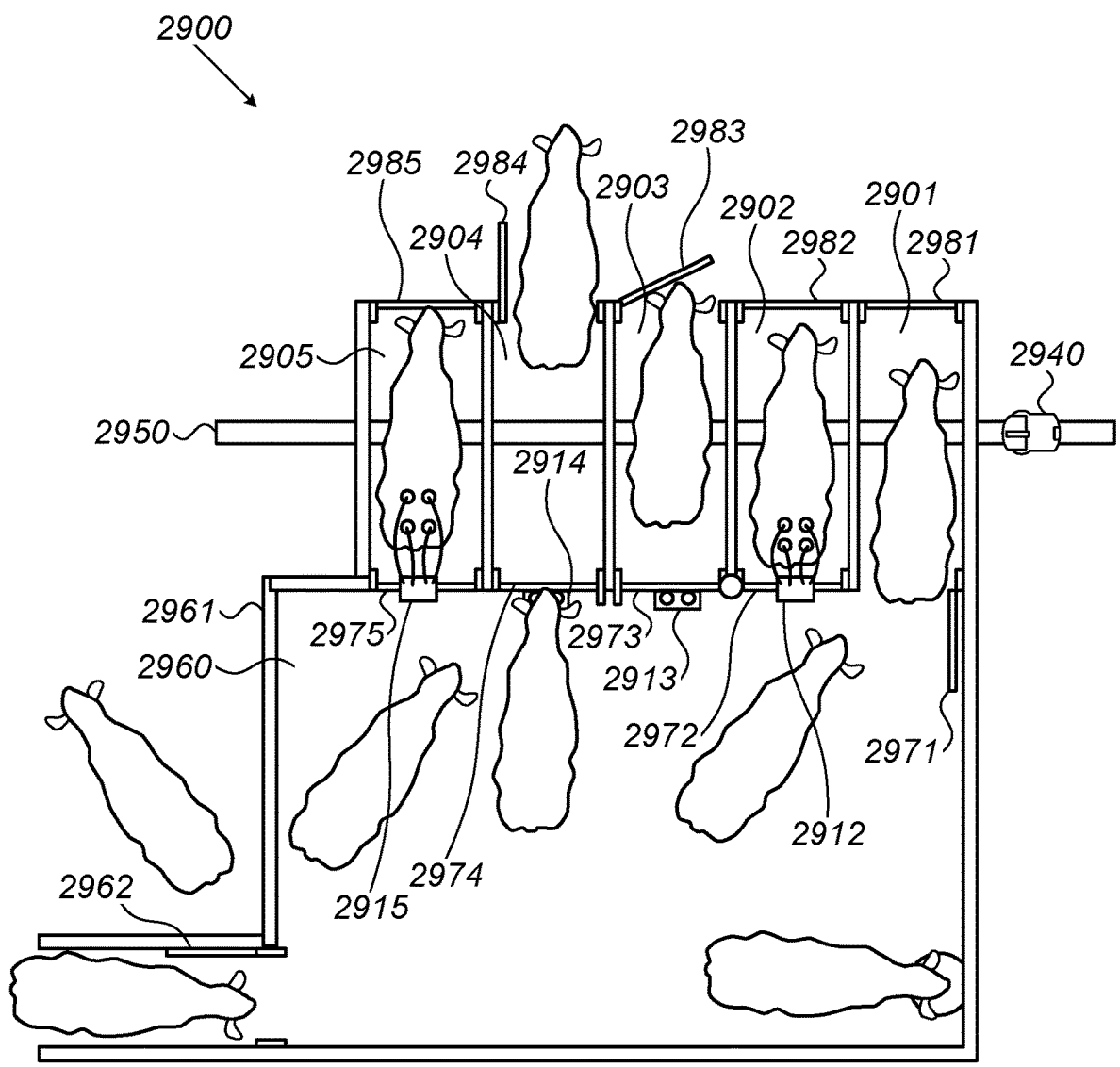
FIG. 29 presents an embodiment of the VMS-MU system of the invention comprising five milking stalls, accessible from the rear end, wherein the vertical teat cup holders may be at a lower level than the platform on which the animals enter the milking stall and/or wherein the vertical teat cup holders may move vertically, thereby changing their height.

Reference is now made to FIG. 29, presenting an embodiment of the VMS-MU system of the invention, particularly, system 2900. System 2900 includes milking stalls 2901, 2902, 2903, 2904 and 2905, mobile unit 2940, rail 2950 and waiting zone 2960. Waiting zone 2960 is surrounded by fence or barrier 2961, wherein animals may enter waiting zone 2960 via gate 2962, which has a closed configuration and an opened configuration (shown in the opened configuration). According to some embodiments, gate 2962 may be converted to its closed configuration when the number of animals in waiting zone 2960 is above a certain predefined threshold. According to some embodiments, gate 2962 is a one-way gate, i.e., animals may enter waiting zone 2960 via gate 2962; however, they cannot exit waiting zone 2960 via gate 2962. According to such an embodiment, the animals may exit waiting zone 2960 only via one of milking stalls 2901, 2902, 2903, 2904 or 2905, after being milked or after the system determines that that animal need not be currently milked.

According to the embodiment shown in FIG. 29, the entrance into each of milking stalls 2901, 2902, 2903, 2904 and 2905 is from the back of the milking stall, such that the animals entering milking stalls 2901, 2902, 2903, 2904 and 2905 must pass over teat cup holders 2911 (not shown), 2912, 2913, 2914 and 2915. Such an embodiment is possible if teat cup holders 2911, 2912, 2913, 2914 and 2915 are positioned such that the animals may enter the stalls without teat cup holders 2911, 2912, 2913, 2914 and 2915 being harmed by the animals and further without the animals being harmed, refrained from entering the stall, or the like, due to the position of teat cup holders 2911, 2912, 2913, 2914 and 2915.

For example, teat cup holders 2911, 2912, 2913, 2914 and 2915 may be positioned, at least partially, at a level lower than the platform on which the animals maneuver. It is noted that the phrase "at least partially" is used herein to describe a height at which the top of the teat cup holder is above the level on which the animals roam; however, the teat cup holder is positioned low enough, such that it is not harmed by the animal and vice versa, i.e., the bottom of the teat cup holder may be lower than the level on which the animals roam. For example, teat cup holders 2911, 2912, 2913, 2914 and 2915 may be recessed, at least partially, into the floor of the milking parlor. For example, the platform or ramp on which the animals maneuver may be raised above ground level, while the teat cup holders are positioned at ground level. According to this embodiment, the teat cup holder may be positioned under the position of the animal's udder, either by raising the animal's platform or by recessing the position of the teat cup holder, or both.

For example, teat cup holders 2911, 2912, 2913, 2914 and 2915 may be movable teat cup holders, such that, for example, their height relative to the other elements in the milking parlor may be changed. For example, teat cup holders 2911, 2912, 2913, 2914 and 2915 may move vertically, up and down, wherein, when an animal is entering the milking stall, the teat cup holder moves downwards and, in order to milk the animal, the teat cup holder moves upwards. It is noted that mobile unit 2940 may be designed such that it may reached the teat cups in the teat cup holders, at whatever level the teat cup holders may be positioned.

According to some embodiments, milking stalls 2901, 2902, 2903, 2904 and 2905 may be equipped with entrance gates 2971, 2972, 2973, 2974 and 2975, respectively, wherein each entrance gate may have closed and opened configurations. For example, the entrance gate may be in the opened configuration when the stall is vacant and when an animal is entering the stall (see, e.g., gate 2971). Further, the entrance gate may be in the closed configuration as long as the milking stall is occupied (see, e.g., stall 2902 and entrance gate 2912 as well as stall 2905 and entrance gate 2915). The entrance gate may further be in the closed configuration while the animal is exiting the milking stall, e.g., until the animal has completely left the stall (see, e.g., stall 2903 and entrance gate 2913, as well as stall 2904 and entrance gate 2914). According to other embodiments, the entrance gate may be transformed to its opened configuration when the milking process has been completed and the animal in the stall has begun to, or at least has the option of, exiting the milking stall (this embodiment is not shown).

According to some embodiments, the position of the teat cup holder may be determined according to the configuration of the entrance gate. For example, if the height of the teat cup holder changes, such that when an animal enters the stall the teat cup holder is at a low position, while when the animal is being milked the teat cup holder is at a high position, the signal for changing the position of the teat cup holder may originate from the movement of the entrance gate, or may originate from the same sensor that causes the entrance gate to open/close. According to such an embodiment, when the entrance gate is in the opened configuration, the teat cup holder may be at a low position, thereby enabling animals to enter the milking stall, without any disturbances between the teat cup holder and the animal. Similarly, when the entrance gate is in the closed configuration, the teat cup holder may be at a high position, allowing the mobile unit to easily reach the teat cups in the teat cup holder. Further, according to such an embodiment, when the entrance gate is in the opened configuration, the teat cup holder may be at a high position, above the height of the animals, thereby enabling the animals to enter the milking stalls by passing under the teat cup holders, such that there are no disturbances between the teat cup holders and the animals. Similarly, according to such an embodiment, when the entrance gate is in the closed configuration, the teat cup holder may be lowered from a height above the animal to a low position, approximately at floor level, thereby allowing the mobile unit to easily reach the teat cups in the teat cup holder. According to such an embodiment, the milk flows directly into a high milk line, as in a high line milking parlor.

As shown in FIG. 29, the animals may exit milking stalls 2901, 2902, 2903, 2904 and 2905 via exit gates 2981, 2982, 2983, 2984 and 2985, respectively. Each one of exit gates 2981, 2982, 2983, 2984 and 2985 may have an opened and a closed configuration. Each of exit gates 2981, 2982, 2983, 2984 and 2985 may be transformed to its opened configuration when the milking process has been completed.

Figure 30:
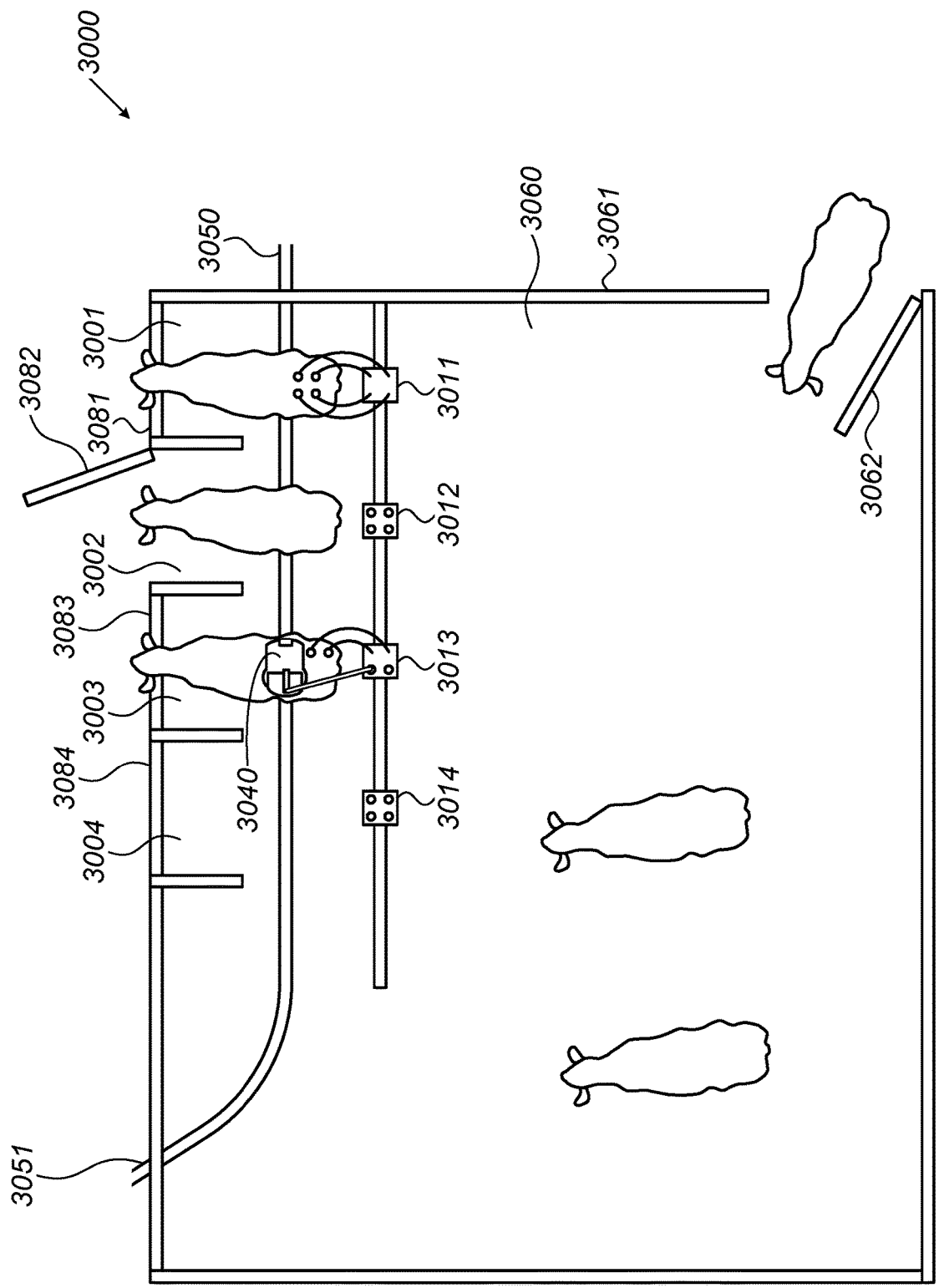
FIG. 30 presents an embodiment of the VMS-MU system of the invention comprising four milking stalls, designed similarly to conventional parallel milking stalls (one side of the two parallels).

Reference is now made to FIG. 30, presenting an embodiment of the VMS-MU system of the invention in which the milking stalls are designed similarly to conventional parallel milking stalls, such that the group of cells resembles a section of one of the two parallel ramps in a parallel milking farm. System 3000, presented in FIG. 30, includes four milking stalls 3001, 3002, 3003 and 3004, each comprising front exit 3081, 3082, 3083 and 3084, respectively. Further, each of stalls 3001, 3002, 3003 and 3004 is equipped with upright teat cup holder 3011, 3012, 3013 and 3014, respectively. System 300 further includes waiting area 3060, enclosed by fence or barrier 3061 and accessible via entrance 3062. According to some embodiments, entrance 3062 may include a one-way mechanism, such that animals may enter waiting area 3060 via entrance 3062; however, they cannot exit therefrom and, therefore, must exit system 3000, as shown, via one of milking stalls 3001, 3002, 3003 or 3004.

Mobile unit 3040 may move along rail 3050 for treating the animals. For instance, as shown in FIG. 30, mobile unit 3040 is positioned under the animal in stall 3003 and is attaching teat cups from teat cup holder 3013 to the animal, wherein two teat cups have already been attached and two teat cups still remain to be attached. As shown for example in FIG. 30, rail 3050 may include arched section 3051, which may provide a parking area for mobile unit 3040, or any other mobile units (not shown) such that there are no disturbances between animals entering the milking stalls any mobile units in the system.

As presented in FIG. 30, the animals enter the stalls from the side, wherein each animal is compelled to occupy the next vacant stall, as in a conventional parallel milking stall. Therefore, stall 3001 will be the first occupied stall, followed by stalls 3002, 3003 and 3004, in that particular order. Thus, when entering stalls 3001, 3002, 3003 and 3004, the animals are dependent on one another, i.e., they are dependent on the occupancy of the stalls. However, as presented in FIG. 30, each of stalls 3001, 3002, 3003 and 3004 may comprise an independent exit, such as front exits 3081, 3082, 3083 and 3084, respectively. Thus, as shown, if the milking process of the animal in stall 3002 has been completed (or the system registers that that animal need not be currently milked) before that of the animal in stall 3001, the animal in stall 3002 may be released therefrom via front exit 3082 (shown in its opened configuration), independently of any of the other stalls and animals.

Further embodiments of the invention are directed to a method for milking animals, wherein the animals are milked on a voluntary basis using the VMS-MU system of the invention. Particularly, embodiments of the invention are directed to a method for milking animals, wherein the method comprises:

allowing at least one animal to voluntarily enter a milking stall, wherein said milking stall is one of a plurality of milking stalls and is equipped with a vertical upright teat cup holder comprising teat cups that are connected directly to a main milk line;

a mobile unit positioning itself, at least partially, between the front legs and hind legs of the animal;

attaching the teat cups to said animal by said mobile unit, thereby milking said animal, such that milk flows directed into the main milk line;

detaching the teat cups from said animal and returning them to the vertical upright teat up holder by said mobile unit, when the milking is completed; and allowing said animal to exit the milking stall.

According to some embodiments, the method further comprises pre-washing and/or post-washing the animal's teat by the mobile unit.

According to some embodiments, the method comprises the utilization of several mobile units, each attending to specific animals in specific stalls, each attending to certain actions, e.g., one mobile unit performing the pre-wash, one attaching/detaching the teat cups and one attending to the post-wash, or any combination of the utilization of the mobile units.

According to some embodiments, the animal voluntarily enters and exits the milking stall from the rear end of the milking stall. According to some embodiments, the animal exits from the rear end of the milking stall by rotating within the milking stall and/or within any area surrounding the milking stall, e.g., between two milking stalls or an area adjacent to the milking stall and the surrounding animal compound. According to some embodiments, the animal exits the stall from the rear end by "backing up", i.e., walking backwards (hind legs first) out of the milking stall. It is noted in this respect that the rear end of the milking stall is defined as the end of the milking stall in which the animal's rear is positioned during milking, whereas the front end of the milking stall is defined as the end of the milking stall in which the animal's head is positioned during milking.

According to other embodiments, the animal exits the milking stall from the front end of the stall. According to some embodiments, a head lock, a front-end bar, a front-end gate or any other barrier element may open, change position, or the like, when the milking is completed, in order to allow the animal to exit the milking stall from the front end.

As detailed herein, the embodiments of the invention as disclosed herein utilize mobile units for performing actions, such as milking the animals in the stalls of the VMS-MU system of the invention. An action performed by a mobile unit, as detailed herein, may be, or may include, milking, disinfecting, cleaning the ramp, washing the livestock, acquiring an image, identifying the livestock, testing for pregnancy, capturing a heartbeat of a fetus, taking blood and/or milk samples and heating an organ of the livestock.

According to some embodiments, the mobile unit comprises an arm that may be operated to perform any necessary actions, such as gripping equipment, sensing the location of equipment, moving equipment from one location to another and the like. The arm itself may be equipped with any necessary equipment, such as a gripping unit, a sensor and the like, allowing the arm to perform any necessary actions.

An embodiment of a system may include a ramp adapted to translate both the livestock and the mobile unit, e.g., in a rotary milking parlor. According to other embodiments, the ramp is stationary, such as in a parallel milking parlor. include An embodiment of a system may include a ramp configured to house a milking equipment unit and a mobile unit may be adapted to detach the milking equipment unit from a housing unit and attach the milking equipment unit to dairy livestock. Particularly, according to the system of the invention, the teat cups may be positioned in holders, such that they are considered to be part of the platform, ramp or stall, not part of the mobile unit. Accordingly, milk entering the teat cups may be transferred, as detailed below, directly into the main milk-line. It is further noted that other than the teat cups and the main milk-line, any other equipment in the milking parlor may also be used in the system of the invention, e.g., by the mobile units, as required, such as the vacuum line, vacuum tank, vacuum pulsator, pre-cooling tank, milk tank, milk meter, milking point controller, and the like.

According to some embodiments, the system of the invention includes a platform or ramp that is divided into stalls, wherein each stall is intended for one animal. As known in the art, in a rotary milking parlor the stalls are arranged in a circle on a rotating platform/ramp, wherein a milking pit surrounds the rotating platform. In a parallel milking parlor, the stalls are arranged in two parallel lines, wherein the milking pit is found between those two parallel lines of stalls.

According to some embodiments, the teat cup holders are positioned at a pre-designated location, wherein each stall has a designated teat cup holder. According to some embodiments, the teat cup holders, as well as holders for any other necessary equipment or substances, are positioned such that when an animal enters the stall, the holder is about in line with the space between the hind legs of the animal. According to some embodiments, the teat cup holders, as well as holders for any other necessary equipment or substances, are positioned between every two stalls, wherein an additional holder may be positioned before the first stall or after the last stall, such that each stall has a designated holder. According to some embodiments, any of the holders, holding the same or different equipment, may be positioned about in line with the space between the back legs of an animal, when confined to the stall. According to some embodiments, some of the holders are positioned about in line with the space between the back legs of an animal confined to the stall while other holders may be positioned between two stalls.

According to some embodiments, the holders do not extend into the milking pit. According to other embodiments, the holders extend into the milking pit by up to about 5, 10, 15, 20, 25, 30, 35, 40, 45 or 50 cm. according to some embodiments, each stall is designated with at least one holder, though the designated holders may be positioned inside, partially outside, or fully outside of the stall itself, e.g., in the milking pit. According to some embodiments, when the holders are positioned in line with the space between the hind legs of the animal, they are positioned in the milking pit. According to some embodiments, in a rotary milking parlor the holders are positioned between the stalls. According to some embodiments, in a parallel milking parlor, the holders are positioned about in line with the space between the hind legs of the animal confined to the stall, protruding, at least partially, into the milking pit. According to some embodiments, in a parallel milking parlor, at least part of the holders are positioned fully in the milking pit about in line with the space between the hind legs of the animal on the ramp.

According to some embodiments, the position and/or height of the holders may change during operation. According to some embodiments, while the animals enter the stalls, the holders may be positioned, at least partially, in or over the milking pit, such that the entrance of the animals into the stalls is not hindered by the holders. Once the animals are positioned in the stalls, the holders may remain in their position (between the stalls or about in line with the space between the hind legs of the animal, though, at least partially, in or over the milking pit), from where the mobile unit will remove the necessary equipment. According to such an embodiment, the arm of the mobile unit extends into the milking pit by up to about 5, 10, 15, 20, 25, 30, 35, 40, 45 or 50 cm, as necessary, for reaching the equipment or substances in the holders. According to other embodiments, once the animals are positioned in the stalls, the position of the holders may be changed, such that they move, at least partially, from the milking pit, into a position between the stalls, or between the hind legs of the animal, on the platform/ramp. According to such an embodiment, the arm of the mobile unit may not extend into the milking pit. According to some embodiments, all of the holders move at the same time. According to other embodiments, each one of the holders may move, in or out of the position between the stalls/hind legs of the animal, at a designated time, e.g., when the equipment therein, e.g., teat cups, is to be reached by a mobile unit or when the livestock enter, are positioned in, or leave the stalls. According to some embodiments, the holders may have folded and unfolded configurations, such that their angle, in respect to their surroundings, e.g. the ramp or stalls, may be altered, as necessary. The change in configuration of the holders may be performed by the same or by other means as the change in their positions and further, the configuration change may be performed on all holders together or differently on different holders, the same as described regarding the position of the holders.

According to some embodiments, the movement of the holders is performed by any appropriate means, which may be mechanical, manual, electronic or automatic. According to some embodiments, the movement of the holders is initiated according to any signal received from any appropriate sensors, which may be either part of the milking platform or of the mobile unit. According to some embodiments, any one of the mobile units may grab any part of any one of the holders and either pull it, at least partially, into the ramp or push it, at least partially, away from the ramp. Similarly, according to any of the embodiments detailed above relevant to height, the height of the holders may change during operation, so that, regardless of their initial height, when the mobile unit reaches to withdraw/replace a teat cup (or any other equipment) from/in the holder, the height of the holders is lower than the animals' abdomen. According to some embodiments, the height of the holders is set to be constantly lower than the bottom of the livestock's abdomen. According to some embodiments, the height of the holders may be altered by any automatic, mechanical, electronic, or manual means, wherein, at least one position of the holders is at a height that is lower than the bottom of the livestock's abdomen. According to other embodiments, the height of the holders is not below the animal's abdomen; however, the holders are positioned at any appropriate position, including height, so that they can be reached by the mobile unit, e.g., when the mobile unit is positioned under the animal.

Embodiments of the invention are directed to vertical upright teat cup holders. Typically, as known to those familiar with the art, the teat cups in the milk cup holders are upside down, such that when the teat cups are withdrawn from the holders, they are flipped (i.e., turned over) by about 180° in order to attach them to the animals' udder. According to some embodiments, as shown, e.g., in FIG. 11, the holders according to this invention are vertical upright holders, such that the teat cups are positioned therein with the hole, in which the animal's teat is placed, facing upwards. Such upright teat cup holders enable a mobile unit to withdraw the teat cups from the teat cup holders and attach them directly to the animal, with only slight adjustment of the position of the hole, such that the mobile unit is not required to flip the teat cups by 180°. This may enable the procedures performed by the mobile unit to be simple, fast and inexpensive.

According to some embodiments, the teat cups in the teat cup holders are covered by at least one flap, wherein the flap may prevent the entrance of undesired matter into the teat cups. The flap may be considered to be part of the holder, such that when a teat cup is withdrawn from the holder, it is withdrawn from under the flap, and is no longer covered. According to some embodiments, each holder includes one flap, covering all of the teat cups in the holder. According to some embodiments, each holder includes two flaps, each covering half of the teat cups, e.g., each covering two out of four teat cups. According to some embodiments, each teat cup is covered by its own flap. According to some embodiments, the flaps may be replaced by any other appropriate element, either part of the holder or of any other element in the milking parlor, which prevents the entrance of unwanted matter into the teat cups and/or the loss of vacuum during attachments of the teat cups to the animals, as detailed herein.

According to some embodiments, other than preventing the entrance of unwanted matter into the teat cups, the flaps may also prevent the loss of vacuum during the attachment of the teat cups to the animal. Typically, the line/tube leading from each teat cup includes a valve, such that the vacuum in each teat cup is controlled separately. According to some embodiments, any two teat cups may be connected to the main milk line via the same valve. According to some embodiments, each two teat cups may be connected to the main milk line via one valve. According to some embodiments, all of the teat cups are connected to the main milk line via one valve. According to some embodiments, all of or at least some of the teat cups are connected directly to the main milk line, without any valves. It is noted that embodiments having teat cups connected directly to the main milk line include embodiments in which the teat cups are connected to the main milk line via milk monitors, meters and the like. Thus, the flap mechanically holds the vacuum in the teat cups covered by it. When removing any of the teat cups from the holder, the vacuum in the remaining teat cups is preserved mechanically by the flap/s, such that the teat cups withdrawn from the holder may be attached to the animal's udder, maintaining the vacuum therein once attached. According to some embodiments, once attached to the animals' udder, the teat cups will remain attached during the time in which the remaining teat cups are withdrawn from the holder, i.e., from under the flap/s, until they are attached to the udder as well, even though vacuum is not maintained, since the period of time during which the vacuum is not maintained is short and further, since already attached to the udder, the teat cups, which are fitted to the udder, will not fall off so quickly.

Once the milking is concluded, the teat cups are removed from the animal's udder and returned to the holder. A signal that the milking process has been concluded may be received by any appropriate part of the system by any electronic or mechanical means known in the art. According to other embodiments, once the milking is concluded, the teat cups are returned to the holder automatically, mechanically, electronically, by human operators, by any other appropriate means or by any combination thereof. According to some embodiments, the teat cups are removed from the udder and returned to the holder by the mobile unit. According to some embodiment, the tubes attaching the teat cups to the main milk-line pass by any number of wheels, pulleys and the like, in order to allow smooth and easy motion of the tubes, thereby allowing the teat cups to be easily withdrawn from and returned to the holder. According to some embodiments, the teat cups themselves move adjacent to any number of wheels, pulleys and the like, in order to reduce friction. The wheels, pulleys and the like may further guide the teat cups and the tubes along a certain desired path.

According to some embodiments, every one of the teat cups is attached to one tube, which in turn is attached to a piston, motor or the like, which is designed to return the teat cup to the holder once the milking is concluded. According to other embodiments, any number of tubes may be externally connected to one another by any appropriate means, such as an axle, wherein each axle is connected to a motor, piston or the like, which is designed cup to the holder once the milking is concluded. According to some embodiments, every two tubes are externally connected, allowing the removal of the teat cups in pairs and further allowing the system to include half the number removal motors/pistons, for removing the teat cups, as the number of teat cups. According to some embodiments, it is noted that although any number of tubes may be connected to one another, allowing removal in pairs or more, the holder and system are designed such that the attachment of the teat cups to the animal is not dependent on the removal of the teat cups therefrom. Thus, even if withdrawn in pairs or more, the teat cups may be attached one by one, or attached in pairs or more, though not necessarily the same pairs or more of teat cups, as removed.

According to some embodiments, the holder is designed such that it may be operated and used by a mobile unit and/or by a human operator. Thus, the holder may be designed to allow the teat cups to be withdrawn therefrom and returned thereto one-by-one, all together, in pairs or in any appropriate combination, depending on the operator. The holder may further allow enough room for the hands of a human operator to utilize any parts of the holder as well as the held equipment, e.g., teat cups, while at the same time, be designed such that a mobile unit may simply utilize any parts thereof, such that the teat cups are withdrawn therefrom/ returned thereto in an orderly manner. For example, the holder is designed such that when the teat cups are returned to the holder, they are held upright and covered by the flaps, thereby preventing the loss of vacuum as well as preventing the entrance of undesired matter into the main milk line. For example, the holder is designed such that the teat cups are held therein in parallel and/or vertical lines, allowing any type of robotic or human operator to withdraw/return the teat cups in pairs or more, without requiring unnecessary maneuvers.

Figure 11:
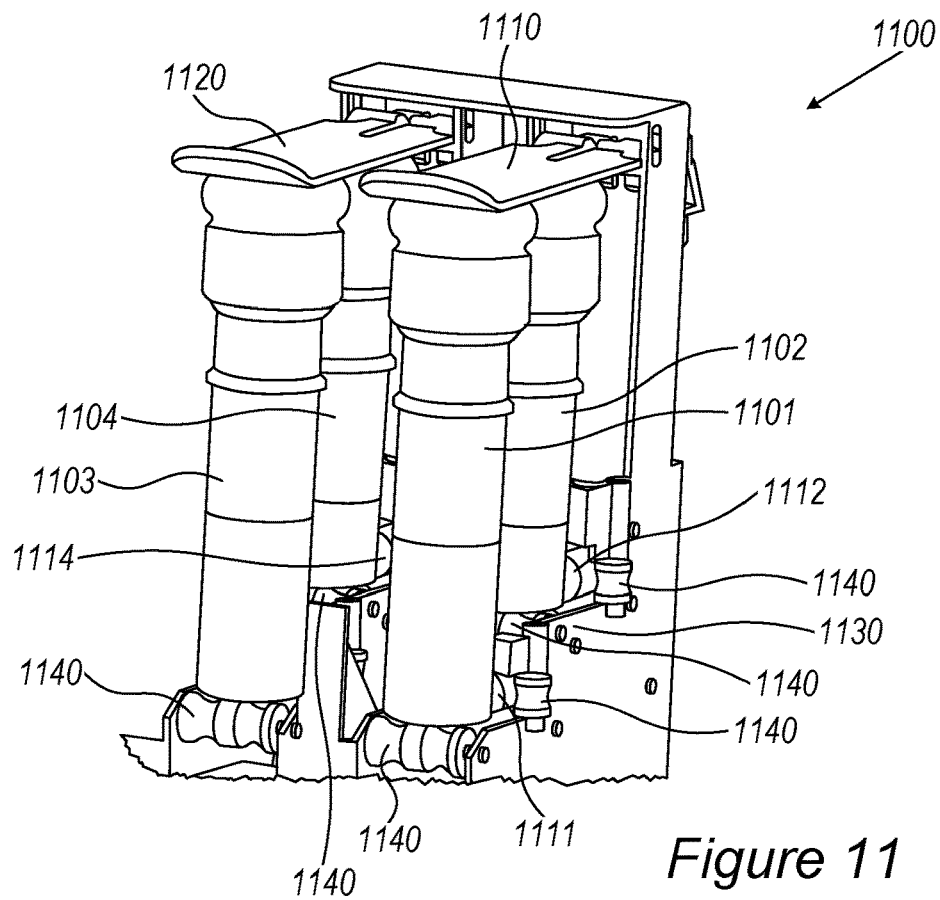
FIG. 11 presents an embodiments of the invention including a vertical upright teat cup holder comprising four teat cups, two of which are longer than the others, wherein every pair of teat cups is covered with a flap.

According to some embodiments, the holder is designed to allow the teat cups to be placed therein in parallel, vertical or staggered lines. According to some embodiments, the holder is designed to allow the teat cups to be placed therein, such that the bottom of the teat cups is staggered. According to some embodiments, the holder includes a step, indentation or the like, allowing the bottom of the teat cups to be staggered. According to some embodiments, a tube leading to the main milk line is connected to the teat cup, such that the tube is on the bottom back side of the teat cup, i.e., the bottom of the side directed away from the animal. An example of such a teat cup may be seen, e.g., in FIG. 11. Allowing the teat cups to be held in the holders when their bottoms are staggered, e.g., by placing the teat cups on designated steps in the holder, as shown, e.g., in FIG. 11, allows the tubes connected to each teat cup to be under/ above the tubes connected to the teat cup sitting on the next step in the holder, thereby preventing the entanglement of the tubes. According to some embodiments, the holder includes one step, such that the bottom part of the front teat cups, i.e., the teat cups in the direction of the animal, is lower than the bottom part of the back teat cups, i.e., the teat cups further from the animal, e.g., as shown in FIG. 11. According to some embodiments, the teat cups are positioned in the holder in pairs, such that the front teat cup in each pair, i.e., the teat cup closer to the animal, is placed on a lower step than the back teat cups. Therefore, the tube connected to the front teat cup is positioned under the tube connected to the back teat cup. Stated otherwise, each pair of teat cups may be designed to rest of two steps different in height from one another, wherein the height difference between the two steps may be at least similar to the difference in length of the two teat cups, such that when resting on the steps, the bottoms of the teat cups are staggered, while the tops thereof are not, as detailed herein.

Embodiments of the invention are directed to teat cups designed to fit the holder and to allow any type of operator to simply withdraw the teat cups from the holder and to return them thereto. According to some embodiments, the teat cups comprise any number of grooves or the like, allowing the arm of the mobile unit, as detailed herein, to easily grasp the teat cups.

As detailed herein, the holder may include at least one step, or the like, such that the bottoms of the teat cups are staggered. Accordingly, if the teat cups are all the same size, the tops thereof would be staggered as well. According to some embodiments, the set of teat cups held together in the same holder are designed such that the tops of any number of teat cups may be at approximately the same height, even if the bottom of those teat cups is staggered. According to some embodiments, the teat cups are designed such that the height of the different teat cups may be different from one another, thereby allowing the bottoms of any two teat cups to be staggered, while the tops thereof are not.

As shown in FIG. 11, at least two teat cups may be staggered at the bottom when positioned in the holder, as detailed herein, wherein the front teat cup is longer than the back teat cup, thereby allowing the tops of the two teat cups to be positioned at approximately the same height, even though the bottoms are staggered. This may allow the two (or more) teat cups to be covered by the same flap. This may further allow the removal of a pair of teat cups from the holder by a mobile unit, wherein the tubes thereof do not tangle, since they are staggered at the bottom, while still allowing the mobile unit to "see" the tops of both of the teat cups, e.g., by laser, such that the mobile unit may properly grasp both teat cups, as detailed herein. It is noted that although the staggering of the teat cups is described mainly for a pair or teat cups, the same type of staggering may be used for any number of appropriate teat cups.

Accordingly, embodiments of the invention are directed to a plurality of teat cups wherein at least two teat cups have different lengths. According to some embodiments, the teat cups having different lengths are positioned one behind the other in the holders, wherein the front of the holder is considered to be in the direction of the animal. According to some embodiments, when positioned in the holders, the bottoms of the teat cups having different lengths are staggered, possibly resting on steps of different heights, wherein the height of the steps is determined such that the tops of the teat cups are approximately at the same height. Thus, the difference in length between the teat cups may be approximately identical to the difference in height of the steps on which the teat cups are positioned. Although steps are referred to herein, it is noted that any other means, such as clips and the like may be used in order to position the teat cups in the holder, such that they are staggered at the bottom, though not at the top.

Embodiments of the invention are directed to teat cups comprising more than one groove, hook, handle, indentation, notch and the like, which are designed such that a gripping unit on the arm of the mobile may easily grasp the teat cup, as detailed herein.

Embodiments of the invention are directed to a vertical teat cup holder, in which the teat cups are positioned vertically upright, wherein the holes in which the teats are positioned face upwards, as detailed herein, comprising:

a first step and a second step being positioned at different heights;

a first teat cup and a second teat cup, each having a top, wherein there is a difference in length between the first teat cup and the second teat cup, and wherein the difference in height between the first step and the second step is approximately the same as the difference in length between the first teat cup and the second teat cup, such that when the first teat cup rests on the first step and the second teat rests on the second step, the position of the tops of the first and second teat cups is approximately at the same height;

a flap covering the tops of the first and second teat cups; and first and second tubes leading from the first and second teat cups, respectively, to the main milk line, wherein the first tube is positioned, at least partially, under the second tube.

According to some embodiments, in order to allow smooth and easy movement of the teat cups in and out of the holder, the system includes any appropriate number of smooth surfaces, wheels, ball-bearings, rollers and the like, positioned inside and/or outside of the holder, along the paths in which the teat cups and/or tubes move when the teat cups are withdrawn/returned to the holder.

A mobile unit may be adapted to determine its location and, based on its location, it may determine the location of any necessary equipment or substances, including a milking equipment unit, such as teat cups or teat cup holders, sanitizing fluid, cleaning brushes and the like. A plurality of mobile units and optionally a central management unit may be configured to dynamically cause at least some of the plurality of mobile units to each perform a portion of a treatment or task. A first mobile unit may be adapted to attach a first portion of a milking unit to the dairy livestock and a second mobile unit may be adapted to attach a second portion of the milking equipment to the dairy livestock. According to other embodiments, and as detailed herein, a plurality of mobile units and optionally a central management unit may be configured such that each of the mobile units performs the entire treatment or task in a certain, designated, number of stalls. According to further embodiments, some of a plurality of mobile units performs part of a task, while others operate in part of the stalls. In this respect it is noted that any combination and coordination between the various mobile units is possible, wherein their overall operation is intended to perform the overall required treatment or task.

An embodiment of a system may include a ramp that includes a guide or rail designed to keep the mobile unit within or on a predefined path under the livestock. An embodiment of a system may include a ramp that includes stalls and a mobile unit may be adapted to automatically travel from a first stall to a second stall. A ramp may include a mark and a mobile unit may be adapted to use the mark in order to determine its location with respect to a stall, the ramp and/or other entities in the milking parlor. A mobile unit may be configured to travel between the front and hind legs of the livestock and the rail may be configured to maintain the mobile unit on a predefined path that passes between the front and hind legs of the livestock, when they are positioned in the stalls.

According to some embodiments, once the livestock are positioned in the stalls, ready for milking, the mobile units may enter the ramp and move between the stalls, performing tasks, as detailed herein. Particularly, the tasks may be performed while the mobile units are positioned/parked under the livestock. According to some embodiments, the mobile units move into their "work-mode" position under the livestock only after the location of the livestock has been determined, according to any appropriate means, such as sensors and the like, which may be part of any element of the milking parlor. As detailed herein, the mobile unit itself may include any type of sensors, which may aid in determining the exact location of the livestock and/or the position of the mobile unit in relation to the livestock. According to some embodiments, the mobile units include any appropriate type of sensor, which prevents the mobile unit, or any part thereof, from colliding with other mobile and/or stationary entities in the milking parlor. According to some embodiments, the mobile unit includes an arm equipped with such a sensor.

According to some embodiments, the system includes a rail or guide, along which the mobile units may travel, such that they are confined to a predefined path, wherein the rail/guide may be positioned to run along at least part of the length of the ramp/platform approximately in the mid-line between the front and hind legs of the livestock. It is noted that throughout, unless specifically mentioned otherwise, the terms "guide" and "rail" are interchangeable and include any elements that may maintain the mobile units within or on a predefined path. It is noted that any type of rail may be used, including a monorail, double rail, flat rail, rail using a magnetic guide and the like. It is further noted that the rail may be prepared from any appropriate type of material, such as a metal, a polymer or any combination thereof. According to some embodiments, the rail is designed such that it is strong enough to resist deformation caused by the livestock stepping on the rail, kicking it and the like. Thus, both the shape (e.g., width) and the material from which the rail is prepared take the forces that will be exerted on the rail into account.

Implementing a rail, according to embodiments of the invention, may ensure that the mobile units remain on a predefined path, such that collisions of the mobile units with the livestock, human operators, other mobile units or other entities in the milking parlor, either mobile or stationary, are minimized. The path of the rail may be set such that it does not enter the most "kick prone" zones on the ramp, which may be around the hind legs of the animal, particularly in back of them, thereby limiting the damage to both the mobile units and the livestock. According to some embodiments, once the rail has been in position on the ramp over a certain period of time, the animals will refrain from placing their hooves on the rail, ensuring both animal and mobile unit safety, as well as allowing the mobile unit to increase its speed along the rail without harming the mobile unit or any of the animals on the ramp. According to some embodiments, the rail provides the mobile units with stability, i.e., since the mobile units are attached to a rail, a strong force may be required to "derail" them, when not desired, and therefore, even if the mobile units are hit, e.g., by an animal kick, they remain on their designated path.

According to some embodiments, when the mobile units move along a rail, their speed may be increased since, as detailed above, the rail may provide the mobile units with stability, and further, since, as detailed above, the risk of collisions is decreased when the mobile units are confined to a rail. The increase in speed of the mobile units may reduce the overall treatment, e.g., milking, time. According to some embodiments, the speed of the mobile units is in the range of about 0-2 m/s. According to some embodiments, the speed of the mobile units is in the range of about 0-3 m/s. According to some embodiments, the speed of the mobile units is in the range of about 0-1 m/s.

According to some embodiments, the system may be designed such that the mobile units have different working and security modes that differ from one another, e.g., in the speed of the mobile unit, the use of the arm of the mobile unit, the extension distance of the arm of the mobile unit and the like. Thus, according to some embodiments, the mobile units speeds, as detailed above, are defined for the working mode of the mobile unit. According to some embodiments, the mobile unit further includes a security mode. In the security mode the speed of the mobile unit may be in the range of about 0-0.25 m/s.

According to some embodiments, when in the security mode, the mobile unit does not perform actions, and therefore, does not extend/retract its arm. According to some embodiments, limited extensions and/or retractions of the mobile unit arm are allowed in the security mode. According to some embodiments, in the security mode, the arm may extend/retract up to 10% of its maximal extension/retraction capability. According to some embodiments, in the security mode, the arm may extend/retract up to 20% of its maximal extension/retraction capability. According to some embodiments, in the security mode, the arm may extend/retract up to 30% of its maximal extension/retraction capability. According to some embodiments, in the security mode, the arm may extend/retract up to 40% of its maximal extension/retraction capability. According to some embodiments, in the security mode, the arm may extend/retract up to 50% of its maximal extension/retraction capability.

According to some embodiments, the mode of the mobile units is changed from working mode to security mode, or vice versa, by manually pressing a button, flipping a switch, a magnetic sensor, or the like, wherein the button/switch may be on the mobile unit, on the teat cup holder, in any location on the ramp, in the milking parlor or in a control center remotely positioned. According to some embodiments, the mode of the mobile units is changed from working mode to security mode, or vice versa, by an electronic command sent to the mobile unit from any appropriate remote device, possible via the guide/rail, as detailed herein, via RF, Bluetooth, WiFi or the like.

According to some embodiments, the use of the rail further allows immediate or quick halts of the mobile unit when necessary, e.g., in a particular stall, in an accurate position along the rail and the like. The mobile unit may be pre-programmed to stop at certain positions, or otherwise, may stop according to data received during operation.

It this respect it is noted that the system of the invention is a modular system, which may include any number of mobile units and a rail/guide comprising any number and length of sections. Accordingly, the system of the invention may be assembled in any type of existing milking parlor, e.g. a rotary milking parlor or a parallel milking parlor. According to some embodiments, in a rotary milking parlor, the guide/rail is positioned on the circular platform/ramp, from the first to the last stall, possibly completing the circle. According to some embodiments, it a parallel milking parlor, the guide/rail is placed on each one of the parallel platforms/ramps, stretching from one end of the platform to the other. It is noted that the guide/rail may be designed to include any required branches, loops and the like, used, for example, for removing a mobile unit from the platform at any necessary point along the platform, and the like. According to some embodiments, the rail may include linking units, which link together two or more rail sections. According to some embodiments, the various rail sections and linking units may be easily and quickly assembled (or disassembled) into any required length and/or shape of rail, wherein, although the rail composes several sections/linking units, they are designed and attached such that the mobile units smoothly move from section to section along the rail, after assembled. According to some embodiments, when required or desired, any section/linking unit may be replaced, removed or added.

Since the system of the invention is modular, it may also be assembled in any milking parlor, regardless of the size or type of the milking parlor. Generally, a larger milking parlor would be equipped with a system including a larger number of mobile units and well as a longer overall length of rail/guide. The system of the invention may also be provided with a varying number of mobile units, such that at times a certain number of mobile units may be used, while at other times a different number of mobile units may be used.

The rail may be connected by any appropriate means to the ramp or to any other elements in the milking platform, such that the mobile units may travel thereon and such that the rail itself does not hinder the movements of the animals on the ramp, e.g., as they enter and exit the stalls. According to some embodiments, the rail is designed to be adjacent to the ramp. According to some embodiments, at least the top of the rail is designed to be raised above the ramp. According to some embodiments, the top of the rail is raised by about 8-20 cm above the ramp. According to some embodiments, the top of the rail is raised by about 5-10 cm above the ramp. According to some embodiments, the top of the rail is raised by about 10-15 cm above the ramp. According to some embodiments, the top of the rail is raised by about 15-20 cm above the ramp. According to some embodiments, when the top of the rail is raised above the ramp, the area beneath the ramp may be cleaned, as detailed herein. According to some embodiments, the top surface of the rail may be flush with the surface of the ramp, wherein the rest of the rail is sunken in the ramp. According to some embodiments, the entire rail, including the top surface thereof, is sunken into the ramp. Designated cleaning means, as detailed herein, may be designed to clean the rail and/or its surroundings.

According to some embodiments, the rail includes means by which electricity is provided to the mobile units. Accordingly, the mobile units are not required to include a battery pack, which would increase their size and weight, as well as require charging or replacement. Further, if electricity is provided by the rail, there is no need for attaching electric cables to the mobile units, which may be hazardous to the mobility of the livestock, may be tangled by the motion of the mobile unit and may further be cumbersome when more than one mobile unit is used. According to some embodiments, the electricity is provided from the rail to the mobile units by any appropriate pickup design. According to some embodiments, the electricity providing means may be included within the rail, attached to the outside of the rail, adjacent to the rail, or any other appropriate design. According to some embodiments, the electricity providing means may provide electricity to the mobile units, as well as to any other mobile or stationary entities.

Similarly to the means for providing electricity by the rail, electronic wires may be included in the system, such that electronic commands are forwarded to the mobile units via the rail. Therefore, throughout, the description regarding the rail directed to electricity transfer is meant to include electronic data transfer as well, when applicable.

According to some embodiments, the rail is assembled on the same ramp upon which the livestock move, and therefore, the rail is prone to get both wet and dirty. Thus, if the rail includes means for providing electricity to the mobile units, those means must be designed to be liquid-proof, so as to prevent electricity shorts and the like. The rail and the electricity providing means may further be designed to prevent liquids or undesired solids and contaminants from entering certain parts or elements of the rail/electricity providing means. According to some embodiments, the positive and negative poles of the electricity providing means may be designed to be at a minimal distance, such as to prevent the entrance of liquids into the space between the two. According to some embodiments, the electricity providing means have a labyrinth shape, so as to prevent, or at least minimize, the introduction of liquids, undesired solids and contaminants into the electrical systems. According to some embodiments, the electricity providing means may include a pickup unit, such as a brush, which is designed to contact a metal strip. According to some embodiments, the metal strip is installed along the ramp, possibly under the rail, while the pickup unit, such as a brush, is attached to a mobile unit, or any other entity moving along the rail. It is noted that electricity may be provided to the mobile unit at all times, both when mobile and when parked, as necessary. The electricity may also be cut off at any appropriate times, e.g., during maintenance, or when no treatment is being performed and the like.

According to some embodiments, the rail includes an internal housing unit through which the electricity is provided to the mobile unit, e.g., via contactors. According to some embodiments, a gliding cart is positioned in the internal housing unit and is attached by a rod or the like to the mobile unit. According to some embodiments, the gliding cart and the rod are prepared from a conductive material (either the same or different materials), wherein the gliding cart receives electricity by any appropriate means inside the internal housing unit, such as contactors and the like. The electricity may be passed from the gliding cart via the rod to the mobile unit, thereby activating any appropriate motors in the mobile unit. When the mobile unit moves forward or backwards along the rail, it may essentially move together with the gliding cart since they are connected to one another via the rod or the like. Thus, according to some embodiments, the gliding cart provides electricity to the mobile unit, while the mobile unit provides mobility to the gliding cart, which, according to some embodiments does not include its own motors and therefore, moves together with the mobile unit.

According to some embodiments, in order to prevent water and other contaminants from entering the electric system in the internal housing, the rod may pass through a water block, a rubber stopper, and the like, or any combination thereof. Further, according to some embodiments, the rod, which is isolated, enters the internal housing via a labyrinth shaped element, thereby preventing the entrance of water or other contaminants into the internal housing unit.

Other than electricity, the rail, or any sections thereof, may include elements for communicating and/or giving commands to any components in the system, including the mobile units. According to some embodiments, the rail includes means for specifically and accurately defining the position of the mobile units moving thereon and/or of any other entities in the milking parlor.

It if further noted that, although the rail is described herein as an element for guiding mobile units, it may be used for transporting any other elements, devices and/or substances, such as to convey water or any other liquid along the ramp, and the like. For example, a reservoir of pre- or post-milking disinfection liquid may be conveyed along the rail, where it may be reached, e.g., by any one of the mobile units performing the pre- or post-milking tasks. According to some embodiments, any sections of the rail may include elements such as a conveyer belt for conveying the mobile units, or any other entities, from one point to another. Hoses, pipes, conduits and the like may also be stretched along the rail or any parts thereof, wherein any liquid, such as water and the like, may be provided as required through such hoses/pipes/conduits.

According to some embodiments, the rail may include a self-cleaning mechanism. According to some embodiments, the ramp includes means for cleaning the rail. According to some embodiments, cleaning elements may be attached to or integrated into any sections of the rail. According to some embodiments, cleaning elements may be attached to or integrated into any of the components, e.g., mobile units, or designating cleaning units, that travel along the rail. According to some embodiments, cleaning equipment, which is part of the milking parlor, may be used for cleaning the rail. According to some embodiments, in a rotary milking platform, cleaning liquid sprayed from a stationary nozzle may be used to clean the rail. According to some embodiments, if the rail is raised above the ramp, it is possible to clean under the rail. The rail, its surroundings, and in some embodiments, the area under the rail, may be cleaned by any appropriate means, including manually, automatically, mechanically or electronically. Further, the rail, its surroundings and in some embodiments, the area under the rail may be cleaned at any appropriate time, e.g., at pre-defined times or when required, as determined according to any appropriate sensors, which may be part of the ramp/milking parlor/mobile unit or the like, or according to decisions made by human operators.

It is further noted that since the milk may be milked directly into the main milk-line and further, since several mobile units may be used, as detailed below, the efficiency of the system of the invention, measured in milk yield per hour, is higher than in prior art systems in which milk needs to be transferred from one or more storage vessels to the main milk-line, and/or when only one operator (robotic or other) is implemented. It is further noted, that, as detailed herein, the arm of the mobile unit has relatively small dimensions, since it needs to fit and maneuver under the livestock. Further, since the arm may remain mainly within "non-kick" zones and further, may include a safety mechanism, as detailed herein, it is not required to be robust. Small arms may perform quick maneuvers, even if equipped only with small motors, which may also contribute to a high milking yield. It is further noted, that as detailed herein, a number of mobile units may coordinate with one another, possibly via a central management system or any other appropriate element, such that the speed required from each mobile unit may also be reduced.

It is further noted that, as detailed herein, the mobile units remain on the ramp or in other designated areas, such as parking areas, and do not enter non-designated areas, e.g., the milking pit. Accordingly, human operators may safely access any other region of the milking parlor, including the milking pit, as detailed herein, which may be essential for treating any mobile unit malfunctions, as well as livestock that need manual treatment and the like. It is further noted that since the arm of the mobile unit is not robust, even if contacted or collided with a human operator or with any other elements in the milking parlor, the outcome may not be hazardous.

According to some embodiments, the arm of the mobile unit extends into the milking pit at predetermined times and/or up to predetermined distances. In order to provide safety to humans in the milking pit, the system may include safety means, preventing the entrance of a human into the part of the milking pit in which the mobile unit arm may reach. The safety means may be stationary or may move, such that when the arm enters the pit, or at times in which the arm may enter the pit, the safety means are in positioned to block contact between human operators and mobile units, while when the arm does not enter the pit, or at times when it will not enter the pit, the safety means may be positioned otherwise. For example the system may include a barrier that is positioned in the milking pit, at the maximal distance that the arm may extend into the milking pit. According to some embodiments, the barrier may change positioned, according to any received signals, such that when mobile unit arm may enter the milking pit the barrier is in place, blocking contact between human operators and the arm of the mobile unit, while at other times it is lifted or removed by any other appropriate means. It is noted in this respect that, when required, any element of the mobile unit, not only the arm, may extend into the milking pit, which remains safe for humans as detailed above.

According to some embodiments, if any part of the mobile unit, teat cup holders or the like is positioned, at least at certain times, in non-designated areas, such as the milking pit, safety mean may be included in the system as detailed above, such that when any part of the mobile unit, teat cup holder or the like, moves, a human operator found in the non-designated area will not be harmed. For example, a bar may separate between the human operator and the mobile unit, teat cup holder, and the like. The bar may have several positions, as necessary. Any other covers, barriers, and the like may be used in order to allow the human operator to safely be in the same area as at least part of the mobile unit, teat cup holder and the like. For example, the back o the teat cup holder may be covered, such that, even when various elements thereof move, a human operator would not be harmed.

An embodiment of a system may include a maintenance area (related to herein also as a maintenance pit) for servicing mobile units. A mobile unit may travel from a guide or rail to a service or maintenance area. A first mobile unit may be adapted or caused to complete an action that at least one other mobile unit failed to complete. A mobile unit may include sensors and/or treatment units.

According to some embodiments, the system includes a parking area for the mobile units. The parking area and the maintenance area may be the same, different or overlapping areas. According to some embodiments, while the livestock enters the ramp/platform, the mobile unit remains stationary in the parking area. Once the livestock have finished being positioned in the stalls, the mobile unit leaves the parking area and enters the ramp, in order the treat the cows, as described herein. Thus, when the livestock are mobile, the mobile units may remain stationary, e.g., in the predefined parking area, and when the mobile units are mobile, the livestock remain relatively stationary, e.g., confined to the predefined areas of the stalls. Once the mobile units finish performing their task, e.g., milking, they may return to the parking area. Once the mobile units are in the parking area, the livestock may be allowed to leave the stalls. The designated parking area may be large enough to park as many mobile units as may be used in the particular milking parlor. Such a setup minimizes collisions between the livestock and the mobile units, as well as any possible fright that might be caused to the livestock, due to the movements of the mobile units. According to some embodiments, the rail that stretches along the ramp reaches, by extended length or by a branch/loop in the rail, or the like, into the parking area, such that the mobile units may easily move along the rail from the ramp into the parking area and vice versa. According to some embodiments, the rail may be designed to include any number of loops, U shapes and the like, within the parking area in order to allow a plurality of mobile units to be positioned thereon.

An embodiment of a system may include a central management unit adapted to instruct or cause a mobile unit to perform an action and/or to coordinate the operation of various elements in the system with one another, including the coordination of a plurality of mobile units. It is noted that a plurality of mobile units may be used to simultaneously treat more than one animal. It is further noted that any one of the mobile units in a plurality of mobile units may preform part of the treatment of the livestock, while other mobile units perform other parts of the treatment. It is further noted that each one of the mobile units may fully treat one of the animals, while the other mobile units treat other animals. Thus, by using a plurality of mobile units, the efficiency of the system may be optimized, regarding the time necessary for completing the treatment, the amount and type of equipment any one of the mobile units is required to use or carry and the like.

If any one of the mobile units is intended to perform a certain task, possibly part of the overall required treatment, that mobile unit may be fitted with any appropriate equipment. Thus, not all mobile units must be identical to one another. For example, the end of the arm of each mobile unit may be fitted with an appropriate arm element, possibly at the distal end of the arm. For example, any one of the mobile units may be fitted with cleaning/disinfecting equipment, including brushes, hoses, nozzles, valves, cleaning or disinfecting liquids and the like. For example, any one of the mobile units may be fitted with an arm element that may grip equipment, such as teat cups, brushes and the like. According to some embodiments, such an arm element is related to herein as a gripping element, gripping unit or the like.

According to some embodiments, the arm element, or any other detachable equipment on the mobile unit, may be attached/detached from the mobile unit when necessary, e.g., by a human operator, by another mobile unit, by the mobile unit itself, or by any other entity in the milking parlor. Changing the equipment may be before, during or after the treatment of the livestock. Changing the equipment may change the role of the mobile unit in performing the treatment task, or may replace equipment that has malfunctioned, or replenish substances that need to be replenished. According to some embodiments, the role of the mobile unit may be changed in order to optimize the treatment, such that any of the mobile units may take over part of a task of another mobile unit, which, for some reason, is held up with the task it was required to perform or has malfunctioned.

According to some embodiments, any one of the mobile units may include replacement arm elements as well as replacements for any other detachable elements on the mobile unit and stores of replenishable substances. According to some embodiments, replacement elements, including arm elements and stores of replenishable substances, may be placed in any appropriate position in the milking parlor, including a parking area, the stalls, the ramp, the milking pit, as well as at any elevated point in the milking parlor, e.g., above the ramp, and the like. According to some embodiments, any one of the mobile units may leave equipment in any appropriate location, e.g., a holder in a stall or at a pre-designated location outside of the stall, for another mobile unit (or other entity) to use.

Any one of the detachable elements, including arm elements, may receive electricity, substances, such as sanitizing liquids, and the like via the mobile unit. Further, any one of the detachable elements, including arm elements, may receive commands from the mobile unit it is attached to, from any one of the other mobile units, from a central management unit or the like.

According to some embodiments, any two mobile units may be configured to communicate directly with one another, with a central management unit, or both. According to some embodiments, a central management unit may relay signals from one mobile unit to another. The central management unit may be positioned at any appropriate position in the milking parlor and may be either mobile or stationary. According to some embodiments, the central management unit is physically attached to any one of the mobile units. According to some embodiments, the central management unit may include a plurality of control units, each positioned as required, e.g., on a mobile unit or at any appropriate position in the milking parlor.

It is noted that the communication between the mobile units, directly or indirectly, via, e.g., control units attached to any of the mobile units, one or more central management units, or any other communicating entities in the milking parlor, may optimize the treatment of the livestock, enabling the various mobile units to perform different parts of the same task, to treat different animals, to take over tasks from one another when required, e.g., when one mobile unit malfunctions, to change roles before, during or after the treatment, to refrain from colliding and the like.

According to some embodiments, the communication between the various mobile units with one another and/or with the central management unit and/or control units, and/or with any other appropriate elements in the system/milking parlor may be wireless or may be via wires or at least partially so. According to some embodiments, communication wires may be included, at least partially, in a rail, or attached thereto. According to some embodiments, wireless communication may be transferred by any known means, such as RF, Bluetooth, WiFi, and the like.

Any one of the mobile units, control units, central management units, and the like, may assign tasks to any one of the mobile units, as well as to any other appropriate entities in the milking parlor, for example, a bar distancing human operators from the mobiles units' path, as detailed herein.

One embodiment is directed to a system in which at least one of a plurality of mobile units includes a camera and/or laser scanner, sonar scanner, radio wave scanner or radar device for obtaining data comprising an image of the livestock and/or for identifying any region of the livestock, wherein the system comprises a computing device for processing the data to determine a location of an organ of the livestock with respect to a marking on the ramp.

According to some embodiments, the arm of the mobile unit comprises an arm that includes a gripping unit. The gripping unit may be designated to withdraw teat cups from the holders and attach them to the animal. Once attached, the gripping unit may be detached from the teat cups and possibly, the mobile unit may move to a different location, e.g., for treating a different animal. As detailed herein, the gripping unit may further be designed to grip any other necessary equipment for pre- or post-milking processes, such as a sanitizing brush, sanitizing fluid receptacle, and the like.

According to some embodiments, the gripping unit includes a multiple gripper, i.e., a gripper that may simultaneously grip a multiple number of objects. According to some embodiments, the gripping unit includes a double gripper, i.e., a gripper that may simultaneously grip two objects. According to some embodiments, any one of the grippers may be designed to grip an object, to press a button on any appropriate object, e.g., in order to cause that object to perform a certain operation, to rotate any part of an object, to squeeze any part of an object, and the like.

According to some embodiments, the gripping unit includes a lengthwise double gripper that includes two gripping elements. According to some embodiments, the lengthwise double gripper essentially simultaneously grips two teat cups that are positioned one behind the other in the holder, and attaches them one after the other to the animal's teats, wherein the back teat cup is attached to the back teat first and only then is the front teat cup attached to the front teat. It is noted that in this respect, the front of the holder is considered to be the side of the holder facing the animal and the front teat cups are the teat cups closest to the front of the holder. Further, the front teats are the teats closest to the head of the animal. According to some embodiments, there are two rows of teat cups in the holder, a front row and a back row, wherein each row comprises two teat cups. The lengthwise double gripper may simultaneously grip two teat cups, one form the front row and one from the back row, and attach them to the animal, as detailed herein. Once the first two teat cups are attached to the animal, the lengthwise double gripper may return to the holder to grip the next two teat cups, also, one from the front row and one from the back row, and so on. In order for the lengthwise double gripper to be able to grip two teat cups at the same time, withdraw them from the holder and attached them to the animal's udder one at a time by releasing them one at a time from the lengthwise double gripper, the lengthwise double gripper is designed so that the two grippers may work together or independently, depending on the action necessary for the lengthwise double gripper to perform.

According to some embodiments, as detailed herein, the front teat cups are on a first step and the back teat cups are on a second step, wherein the first and second steps are positioned at different heights and wherein there is a difference in length between the front in back teat cups that is about the same as the difference in heights between the first and second steps. Thus, the lengthwise double gripper may grip one long (front) and one short (back) teat cup, and may further first attach the short teat cup to the back teat and then attach the long teat cup to the front teat.

According to some embodiments, the teat cups comprise more than one groove, hook, handle and the like, which are designed such that lengthwise double gripper may easily grasp the teat cup. According to some embodiments, the teat cups comprise two grooves, such that the lengthwise double gripper is able to properly grip two teat cups at a time, attaching them to the udder one after the other, which includes releasing them from the lengthwise double gripper one at a time. The two grooves may be about 0.5-2.0 cm apart from one another. According to some embodiments, the grooves cover the full circumference of the teat cups, while according to other embodiments, they are designed to be only on part of the circumference. According to some embodiments, the grooves are helical.

As detailed herein, the lengthwise double gripper may be designed to grip any appropriate equipment, including teat cups, pre-milking equipment and post-milking equipment. Embodiments of the invention are directed to an autonomous pre-milking brush. According to some embodiments, the autonomous pre-milking brush both sanitizes the teats and stimulates the milk release from the udder. According to some embodiments, the autonomous pre-milking brush includes any number of brushes that may move, e.g., rotate, such as to sanitize and stimulate the teat. According to some embodiments, the autonomous pre-milking brush includes one, two, three or four rotating brushes. According to some embodiments, the autonomous pre-milking brush includes two rotating brushes, which are operated such that the teat is positioned in between the two brushes.

According to some embodiments, the autonomous pre-milking brush is operated by electricity. According to some embodiments, electricity is provided to the autonomous pre-milking brush by any appropriate electric cable or by a battery, possibly rechargeable, which is included in the autonomous pre-milking brush assembly. According to some embodiments, the autonomous pre-milking brush may be part of or attached to the teat cup holder. According to some embodiments, the autonomous pre-milking brush is part of the stall or ramp assembly. According to some embodiments, there is an autonomous pre-milking brush designated for each stall. According to other embodiments, an autonomous pre-milking brush may be used for a number of stalls. According to some embodiments, the autonomous pre-milking brush is held in a holding port that is part of the teat cup holder, attached to the teat cup holder, part of the stall, ramp, or the like.

According to some embodiments, the autonomous pre-milking brush is coupled to or comprises a rechargeable battery. Means for recharging the battery may be found where the autonomous pre-milking brush is positioned when not in use, e.g., the holding port. For example, a recharger may be attached to or included in or on the teat cup holder. For example, a recharger may be positioned in any appropriate location in any one of the stalls, between any two of the stalls, in the milking pit or the like, as long as both the mobile unit and a manual operator may reach the autonomous pre-milking brush when necessary. According to some embodiments, the autonomous pre-milking brush includes a charging socket through which the autonomous pre-milking brush is charged when attached to the recharger, which is, e.g., an element of the teat cup holder, an element positioned in or between the stall, in the milking pit or the like. According to some embodiments, the charging socket is water proof.

According to some embodiments, the autonomous pre-milking brush is held and operated by the mobile unit. According to some embodiments, the autonomous pre-milking brush is held and operated by a human operator. According to some embodiments, the location of the autonomous pre-milking brush is set such that either a human operator or a mobile unit may reach it, grab the part of the autonomous pre-milking brush to be used for sanitizing and stimulating the animal, and move it to the animal's udder and utilize it. According to some embodiments, the autonomous pre-milking brush comprises grooves, handles, notches, indentations, hooks and the like, possibly similar to those of the teat cups, thus allowing the same lengthwise double gripper to utilize the autonomous pre-milking brush.

According to some embodiments, the autonomous pre-milking brush includes a magnetic sensor, a switch, a button, or the like, for turning it on, e.g., for causing the brush/es to rotate. According to some embodiments, the same sensor/button/switch or another sensor/button/switch, or any other appropriate means, which may be on-site or remote, may be used to operate a nozzle, or the like, to spray disinfectant/water on the autonomous pre-milking brush. According to some embodiments, the nozzle, or the like, is an element of the teat cup holder, such that essentially, the autonomous pre-milking brush is sprayed with water/disinfectant, by an element of the teat cup holder. Thus, according to some embodiments, the teat cup holder includes an element for spraying the autonomous pre-milking brush with water/disinfectant. According to some embodiments, the autonomous pre-milking brush is sprayed with disinfectant/water while in its holding port, possibly located on the teat cup holder or in its vicinity. According to other embodiments, the autonomous pre-milking brush is sprayed with disinfectant/water after it is withdrawn from its holding port. According to some embodiments, the disinfectant disinfects the autonomous pre-milking brush and further, wets the autonomous pre-milking brush, such that the autonomous pre-milking brush is ready to use for mechanically cleaning and stimulating the teats, by rotating the wet brush on the teats. According to some embodiments, the disinfectant used is such that it disinfects the brush itself, not necessarily the teat, due to the rapid action of the disinfectant. However, rotating the wet, disinfected brush on the teat disinfects the teat and further, stimulates milk release.

According to some embodiments and unlike other known systems, the various elements of the system of the invention, including the autonomous pre-milking brush, may be both manually and robotically operated.

Embodiments of the invention are further directed to a post-milking disinfection tool and filling station. According to some embodiments, the post-milking disinfection tool includes a dipping chamber and a filling detection element, wherein the dipping chamber is filled with a disinfectant. According to some embodiments, the post-milking disinfection tool further comprises a brush. According to some embodiments, the brush is positioned, at least partially, around the entrance of the dipping chamber, such that when the animal's teat is dipped into the dipping chamber, it passes through the brush, such that it is brushed thereby, thus ensuring that the disinfectant found in the dipping chamber is brushed and spread onto the teat. Further, since filled in a filling chamber, no tubes or the like are necessarily attached to the post-milking disinfection tool, thus, the post-milking disinfection tool is considered to be an autonomous post-milking disinfection tool.

According to some embodiments, the filling detection element detects whether the dipping chamber is full, whether it needs to be filled or any other possible parameter allowing the system to fill the dipping chamber when necessary. According to some embodiments, the filling detection element is electronic. According to other embodiments, the filling detection element is mechanical. According to some embodiments, the filling detection element merely detects when the dipping chamber should be filled, while according to other embodiments, the filling detection element monitors the amount of disinfectant in the chamber and alerts the system when a minimal predefined amount is reached. According to some embodiments, the filling detection element is a float. According to some embodiments, the height of the float is detected by a detection element on the mobile unit, e.g., and IR sensor. According to some embodiments, when the height of the float is below a predefined height, the dipping chamber is filled.

The dipping chamber may be filled by any appropriate means at any location in the milking parlor. According to some embodiments, the dipping chamber is filled at a designated filling station. According to some embodiments, the system includes more than one filling station. According to some embodiments, there is a filling station for each stall. According to some embodiments, there is a filling station for every few stalls. According to some embodiments, the filling station is positioned in the stalls, in between the stalls, in the milking pit, partially in the stalls and partially in the milking pit, or at any other appropriate location. According to some embodiments, the filling station is positioned at about the height of the pelvis of the animals, and is positioned between two animals, such that the filling station separates between the two animals and further, is not located where the animal's legs may hinder the use thereof. According to some embodiments, the filling station is also a holding station, wherein the post-milking disinfection tool is held when not in use.

According to some embodiments, the post-milking disinfection tool is used by the mobile unit. According to some embodiments, the mobile unit takes the post-milking disinfection tool from the filling station when necessary, sanitizes the animals' teat therewith after milking, and returns the post-milking disinfection tool to the filling station when filling is necessary and/or when the post-milking disinfection process is concluded.

According to some embodiments, the post-milking disinfection tool is gripped by a gripping element attached to the arm of the mobile unit. According to some embodiments, the post-milking disinfection tool is gripped by the double gripper, as described herein. According to some embodiments, the post-milking disinfection tool includes grooves, hooks, handles and the like, as described regarding the teat cups herein, in order to allow the gripper to grip the post-milking disinfection tool. According to some embodiments, of the grippers of the double gripper holds the post-milking disinfection tool, while the second gripper activates the filling of the dipping chamber by, e.g., pressing or rotating a button or the like. The button may be part of the post-milking disinfection tool or of the filling station. According to some embodiments, the filling of the dipping chamber is via a mechanical valve that is pressed, rotated or the like. According to some embodiments, the filling of the dipping chamber is via an electronic valve that is activated by an electronic switch, a magnetic sensor, a motion detector, a metal detector, an electro-optic sensor or the like. The mechanical/electronic valve may be activated by any one of the grippers, by any other elements on the mobile unit, by elements on the teat cup holder, by a human user, electronically from a remote device or by any other appropriate means.

According to some embodiments, like the remaining elements in the system, the post-milking disinfection tool may be used manually as well as robotically. In addition, since the post-milking disinfection tool includes a dipping chamber such that the teat of the animal is dipped in the disinfectant, the amount of disinfectant wasted is reduced in comparison to most systems in which the disinfectant is sprayed onto the animals' teats.

Further embodiments of the invention are directed to a non-planar leg separator that is positioned on the ramp, particularly on the floor in each stall approximately in the center between the hind legs, in order to cause the animal to separate its hind legs. Leg separators are known in the art and are used for separating the animals' hind legs in order to allow the robotic arm to easily access the animal's teats. Accordingly, the leg separators are designed such that the animal is uncomfortable standing on them, and therefore, will position its hind legs on the sides of the leg separator, not on the separator itself, thus separating its hind legs. According to embodiments of the invention, any number of non-planar leg separators may be positioned on the ramp, e.g., in each one of the stalls that animals may occupy and be treated, e.g., milked. According to some embodiments, any number of non-planar leg separators may be included in any one of the stalls. For example, any one of the stalls may include one relatively large leg separator or a number of smaller leg separators. For example, the number of leg separators in any stall may be different from the number of leg separators in any of the other stalls.

However, the systems known in the art include chambers into which the animals enter without needing to step on the leg separator, just to step and stand on the two sides of it. As detailed herein, the system of the invention may be used in a parallel milking parlor; accordingly, the animals walk through several stalls before reaching their designated stall. Once reaching their designated stall, they turn about 90° to be positioned for milking and/or any other treatment. Thus, if leg separators are located on the ramp, i.e., on the floor in each stall, the animals will continuously walk on them, which would be uncomfortable for them. Thus, when working in a parallel milking parlor the leg separators may be designed such that the animals may comfortably walk over them, while they are at the same time uncomfortable to stand on and therefore, are affective in causing the animal to separate its hind legs.

Thus, embodiments of the invention are directed to a non-planar leg separator, which is designed such that when the animal walks through the stall, the first and last parts of the non-planar leg separator are about flush with the ramp, i.e., the same height as the ramp, while the middle of the non-planar leg separator is elevated. According to some embodiments, the non-planar leg separator may include any number of arches, either depressed or elevated, steps, triangular shapes, V-shapes and the like, such that an animal may easily walk over the non-planar leg separator, while after rotating about 90° in the stall, the animal will be uncomfortable standing on the leg separator and will therefore, separate its hind legs. According to some embodiments, electronic, mechanic and/or manual means may change the position of the non-planar leg separator after the animal is positioned in the stall and turns about 90°. Accordingly, the leg separator itself may be flat, though is raised from the ramp after the animal turns about 90°, thereby separating the animals' hind legs.

According to some embodiments, the non-planar leg separator includes rods and spaces between the rods, wherein the size of the rods, the size of the spaces, the shape of the rods and the like are designed in order for the animal to easily walk over the non-planar leg separator sideways, while after turning about 90° in the stall, the animal is uncomfortable standing on the non-planar leg separator and therefore separates its hind legs. According to some embodiments, the non-planar leg separator includes cross-bars that connect that rods one to another and/or to the sides of the non-planar leg separator, such that the non-planar leg separator is sturdy and does not become deformed when, e.g., stepped on by an animal. According to some embodiments, any parts of the non-planar leg separator, including the rods, the cross-bars, the frame and the like, are textured to any appropriate degree in order to prevent the animal from slipping when placing a hoof on the non-planar separator; however, the texturing of the various elements is such that it is not harmful to the animal.

According to some embodiments, the diameter of any one of the rods is between about 10-30 mm, wherein the diameters of the rods are independent from one another, such that any two rods may have a different diameter. According to some embodiments, the number of rods is between about 4-10. According to some embodiments, the height difference between any two rods is between about 2-20 mm.

Reference is made to FIG. 1 that shows an exemplary system 105 according to embodiments of the invention. As shown by FIG. 1, system 105 may include a walkway or ramp 130, an enclosure, fence or stall 120 for containing and/or confining livestock (e.g., containing cow 110 as shown) and a mobile unit 140. In an embodiment of the invention, mobile unit 140 may be a mobile robot designed to travel on ramp 130 and under the livestock (e.g., under cow 110 as shown in FIG. 1). For example, mobile unit 140 may be designed and manufactured such that it freely travels under, and between the front and hind legs of the livestock. In this respect it is noted that FIG. 1 presents a side view of a cross section of ramp 130, such that mobile unit 140 is intended to enter the area between the front and hind legs of the livestock from the side, i.e., from the left or right of the animal confined to stall 120.

Various models of mobile unit 140 may be contemplated, for example, a model used for goats may be smaller than one used for cows. In one embodiment, mobile unit 140 is adapted for treating cows. Assuming a space of up to about 60 centimeters in height is available under an average cow, mobile unit 140, including an attached arm, may be designed such that it can freely travel through a space that is about 50 centimeters in height. Mobile unit 140 may be designed such that it can travel between the fore and hind legs of a cow. Accordingly, mobile unit 140 may be small enough in size to travel under cows standing on a ramp, as described.

Including a small mobile unit 140 as described, embodiments of the invention enable advantages that cannot be achieved by systems and methods known in the art. As discussed above, robotic milking machines known in the art use an arm that is based (or extends from) outside the stall containing the livestock. During operation, such an arm needs to extend into the stall and under the livestock, e.g., in order to attach a milking unit. An arm extending from outside the stall may harm the livestock when traveling, since its path may collide with the livestock, e.g., the legs of a cow in the stall. Moreover, the distance traveled by an arm based (or extending from) outside the stall is relatively long.

Designed to fit, and operate, under the livestock, and travel between the legs of the livestock, mobile unit 140 as described herein eliminates some of the above mentioned drawbacks. For example, as further described herein, mobile unit 140 may travel to a location under the livestock from the side of the livestock, thus, entering a location between the fore and hind legs along a path such that it does not collide with the legs of the livestock.

Embodiments of the invention enable treating livestock by a system that minimizes the movement or distance traveled by an arm. For example, movement of arm 215 may be minimal, e.g., extending from under the cow to a housing of a milking unit that may be in close proximity.

Figure 2A:
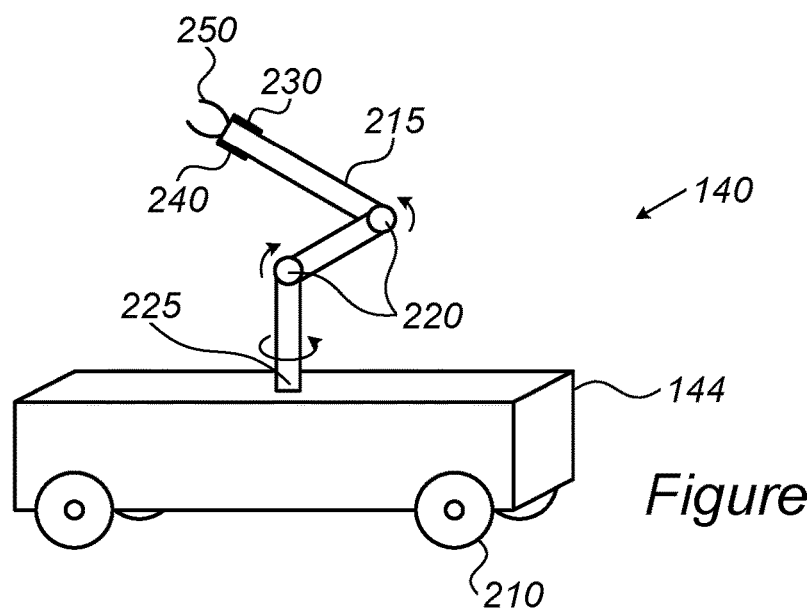
FIG. 2A schematically shows a mobile unit according to embodiments of the invention.

Reference is made to FIG. 2A, schematically showing a mobile unit 140 according to embodiments of the invention. As shown, mobile unit 140 may include wheels 210 enabling it to travel, e.g., on ramp 130 as described. It will be understood that other means for enabling a mobility of mobile unit 140 may be used. For example, instead of wheels 210, mobile unit 140 may be equipped with continuous tracks (e.g., as used in bulldozers). Further, ramp 130 may be equipped with means for transporting mobile unit 140, such as a conveyer belt, a chained track and the like.

As shown, mobile unit 140 may include an arm 215 having joints 220, wherein arm 215 is connected to main body 144 of mobile unit 140. According to some embodiments, arm 215 is connected to main body 144 via arm base 225. Although FIG. 2A shows arm 215 as being centrically positioned on main body 144, it is noted that arm 215 may be positioned and connected to main body 144 at any appropriate position, including an eccentric position. The eccentric positioning of arm 215 may allow the same mobile unit 140 to be used for treating different sized livestock, relating both to the livestock's length and height, as well as to reach farther in one direction than in the other, as required. As shown, arm 215 may include a gripping unit 250, a set of sensor units 230 and a set of treatment units 240. Arm 215 may be designed such that it may extend and rotate such that gripping unit 250, sensor units 230 and treatment units 240 may be placed at a chosen location and/or orientation. For example, although not shown, mobile unit 140 (or arm 215) may include electric motors adapted to move, rotate and/or extend arm 215 such that gripping unit 250, sensor units 230 and treatment units 240 are brought to a selected location and/or orientation. Although not shown, it is noted that, as detailed herein, gripping unit 250 may be replaced by any other required equipment. According to some embodiments, any of the equipment on mobile unit 140 may be detachable, such as gripping unit 250, sensors 230 or treatment units 240, such that they may be replaced by other units, either of the same or different type.

According to some embodiments, arm 215 is in a folded configuration while mobile unit 140 is in a mobile mode, e.g., moving from one stall to the next, into the first stall or out of the last stall. Once mobile unit 140 positions itself in a work mode, between the fore and hind legs of the livestock, arm 215 may transform into an unfolded configuration, wherein the length, height, position and orientation of arm 215 depend on the specific livestock under which it is positioned, the operation it is to perform, its orientation in respect to any type of equipment it is intended to use and the like.

Gripping unit 250 may be any unit adapted to selectively hold and release an object. For example, gripping unit 250 may be adapted to hold a teat cup, e.g., while removing it from the holder and attaching it to the animal, further, gripping unit 250 may be adapted to release the teat cups, e.g., after they are attached to the animal. It is noted that the while teat cups and/or gripping unit 250 may be designed to be attached to the animal in an assembly of two or four teat cups, the teat cups may also be designed to be attached to the animal in a singular manner, one after the other, according to any appropriate sequence.

Sensor units 230 may include any sensing device, system or module. For example, sensing units 230 may include a camera, laser scanner, sonar scanner, radio wave scanner, radar or any other appropriate device, for acquiring an image of an organ of an animal (e.g., in order to identify the animal) and/or for identifying any region of the animal, possibly assessing the position of that region in space. In an embodiment of a system, sensing units 230 may include sensors for testing for pregnancy. Testing for pregnancy using an ultrasonic sensor is known in the art. For example, in an embodiment of a system, sensor units 230 include an ultrasonic sensor used in order to test livestock for pregnancy wherein the actual testing may be performed as known in the art. In the same or other embodiment of a system, sensing units 230 may include sensors for capturing a heartbeat of a fetus. Any other sensors may be included in sensing units 230.

Treatment units 240 may include any applicable device, system or module. For example, treatment units 240 may include a washing unit adapted to wash an organ (e.g., washing the udder of an animal before or after milking). For example, mobile unit 140 may include an assembly including a tank or container that contains liquid (e.g., water, solvent or other liquid solution). The assembly may include pipes to run the liquid from the tank to jets on nozzles included in treatment units 240. The assembly may include a pump to force liquids from a liquid container through the pipes and jets.

An assembly included in mobile unit 140 as described herein may be used for cleaning or washing any object. For example, arm 215 may be positioned such that jets in treatment units 240 are directed downwards, at a floor. For example, mobile unit 140 may wash the floor of ramps 130 and 405 described herein.

Sensor units 230 may include a thermometer for determining a temperature of the livestock or a temperature of an organ of a livestock. For example, udder infections may be identified or detected for example by measuring the temperature of the udder. Any data collected by sensor units 230 may be stored on mobile unit 140, may be processed by a controller included in mobile unit 140 as described herein and/or may be sent to a remote computer using communication components included in mobile unit 140 as described herein (e.g., with reference to FIG. 3, as detailed below).

For the sake of simplicity and clarity, various elements that may be included in mobile unit 140 are not shown in FIG. 2A. For example, wires providing electric power to arm 215, sensor units 230 and treatment units 240 may be included, but are not shown. Other elements, e.g., wires carrying digital data or signals to/from sensor units 230 and treatment units 240 are not shown. Other elements included and not shown may be pipes or conduits used for running liquids (e.g., liquids used for washing or disinfecting). For example, mobile unit 140 may include an assembly including a container that contains disinfectant liquid (e.g., iodine) and a pump for causing the liquid to be transferred from the tank and sprayed on an udder of an animal through nozzles or jets in a disinfecting unit included in treatment units 240. Included also may be any types of syringes, test tubes, slides, scissors, forceps and the like, which enable the operator to perform any type of desired testing/treatment. Further, the mobile unit may include any type of safety mechanism. Such a safety mechanism may protect the mobile unit against possible collisions. The safety mechanism may further protect the mobile unit against possible kicks from the livestock.

As detailed herein, the system may be configured such that the mobile unit does not enter, or does not frequently enter, zones in which it is highly probable that a livestock will kick. In this respect it is noted that an analysis of livestock movements shows that dairy livestock, such as cows, tend to kick strongly mainly backwards with their hind legs. Other kicks are also apparent, though are not as strong. Thus, the system is configured such that the mobile unit does not move behind the hind legs of the dairy livestock. Nonetheless, the mobile unit may still be kicked and further, may collide with other mobile and/or stationary objects and therefore, embodiments of the mobile unit may include a safety mechanism. According to some embodiments, the safety mechanism is included in arm 215. According to some embodiments, the safety mechanism is at base 225 of arm 215, where arm 215 is attached to mobile unit 140. However, the configuration of the system such that the mobile unit is mostly positioned in "non-kick zones", allows arm 215 to be relatively small and light, since it is not required to withstand harsh blows. According to some embodiments, the mobile units are programmed to refrain from entering "kick zones" by any known means, which may be either a physical part of the mobile unit, the ramp, or other elements of the system, or electronic data transferred thereto when necessary by RF, Bluetooth, WiFi, and the like. According to some embodiments, the mobile units include sensors that aid in directing them to "non-kick" zones. According to some embodiments, the ramp includes marks that relay data to the mobile unit regarding zones that it may or may not enter. According to some embodiments, any types of barriers may be included on the ramp to prevent the mobile unit from entering kick-zones, wherein such barriers, while affecting the movements of the mobile units, would, generally, not affect the movements of the animals on the ramp. According to some embodiments, a rail/guide is positioned on the ramp/platform, such that mobile units moving along the rail/guide, do not enter kick-zones. The kick- and non-kick zones may be predefined, according to the regular use and movements of the livestock in the milking parlor.

According to some embodiments, the dimensions of the main body 144 of the mobile unit 140 are in the range of 20-100 cm (length)×25-55 cm (height)×20-60 cm (width). According to some embodiments, the weight of the mobile unit 140 is in the range of about 10-50 kg. According to some embodiments, the weight of the mobile unit is under about 40 kg. According to some embodiments, the weight of the mobile unit is under about 30 kg. According to some embodiments, the weight of the mobile unit is under about 25 kg. According to some embodiments, the weight of the mobile unit is under about 20 kg. Embodiments allowing mobile unit 140 to be both small and light weight, provide a mobile unit that it easily treated by any operator, including a human operator. For example, if a mobile unit 140 malfunctions, an operator may simply manually lift it up off of ramp 130. The size of mobile unit 140 also enables it to easily maneuver between the livestock's front and hind legs. Additionally, the smaller mobile unit 140 is, the less prone it will be to collisions with other stationary and mobile objects, including kicks from the livestock. A small sized mobile unit also provides safety to human operator as well as other elements in the milking parlor, since collisions with a small mobile unit may not be hazardous. Further, the parking or storage area, as detailed herein, necessary for small mobile units is relatively small and therefore, existing areas in the milking parlor can be used for storage/parking, without requiring additional space or rearrangement of the milking parlor.

Figure 2B:
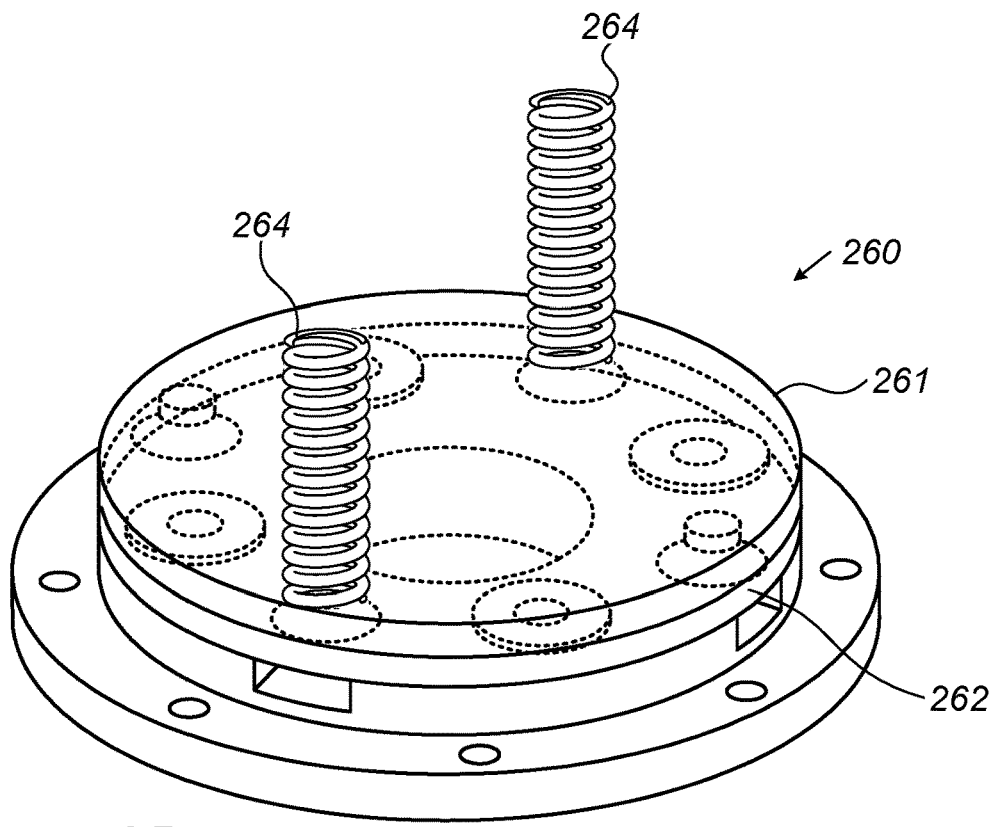
FIG. 2B schematically presents an engaged configuration of a safety mechanism for a mobile unit according to embodiments of the invention.
Figure 2C:
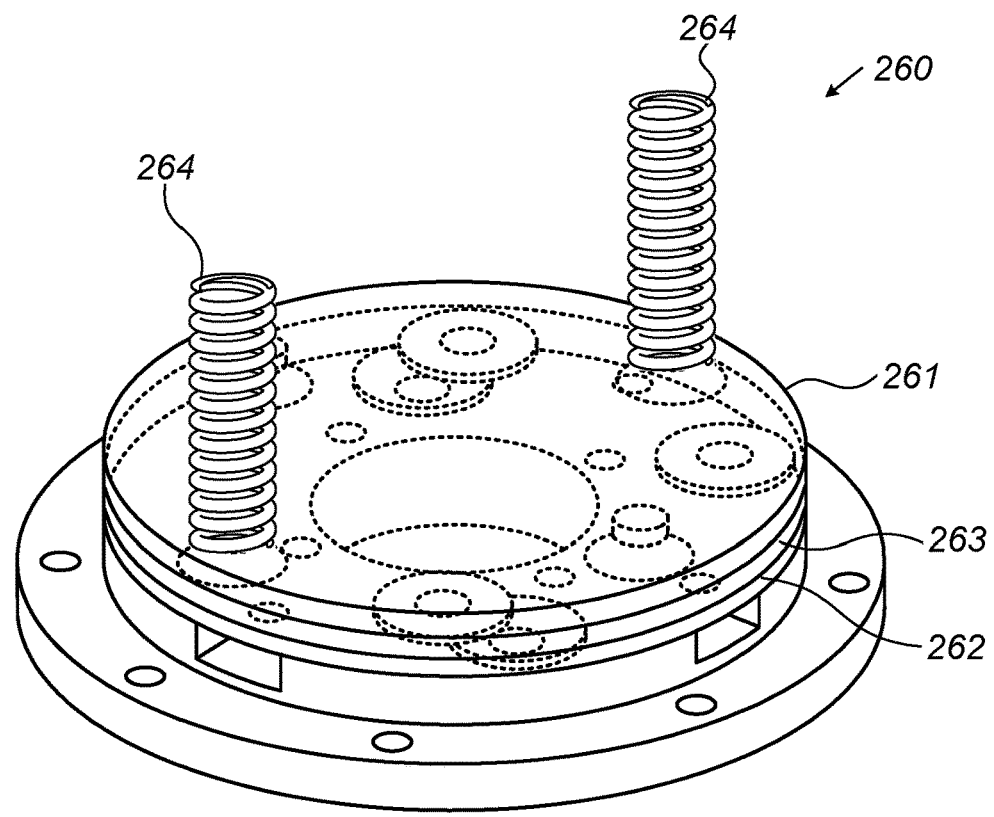
FIG. 2C schematically presents a disengaged configuration of a safety mechanism for a mobile unit according to embodiments of the invention.

Reference is now made to FIGS. 2B and 2C, presenting an embodiment of a safety mechanism that may be included in mobile unit 140, as described in FIG. 2A, wherein FIG. 2B presents safety mechanism 260 in an engaged configuration while FIG. 2C presents safety mechanism 260 in a disengaged configuration. It is noted that certain elements appear only in one of the figures (e.g., elements 140 or 215 in FIG. 2A) though are relevant to the other figures as well and therefore, the description of a certain figure may include elements appearing in a different figure. Accordingly, all of the figures should be related to together.

The safety mechanism may be any appropriate safety mechanism known in the art, which disengages top plate 261 from bottom plate 262 when an element, such as arm 215, attached to the top plate 261 is hit. Space 263 is formed by the disengagement of top plate 261 from bottom plate 262. When space 263 is formed, elements attached to top plate 261, such as arm 215, will not operate, until safety mechanism 260 is reengaged; however, the disengagement prevents irreversible damage to arm 215, mobile unit 140 and the like, since it allows top plate 261 to swivel freely around an axis, such that the force of the blow is translated into rotational movement. Safety mechanism 260 may be reengaged by any appropriate means, e.g., manually, electronically, automatically, according to predefined conditions, and the like.

According to some embodiments, in the engaged configuration, an element, such as a ball bearing, a pushpin, a protrusion, or the like (not shown) attached to top plate 261 protrudes into, e.g., a groove (not shown) in bottom plate 262, e.g., beneath one or more of springs 264. When disengaged, top plate 261 may rotate in respect to bottom plate 262, such that the ball bearing, pushpin, protrusion, or the like is withdrawn from the groove in bottom plate 262. When reengaged, top plate 261 may be rotated in respect to bottom plate 262, such that the ball bearing, pushpin, protrusion, or the like reenters the groove in bottom plate 262.

According to some embodiments, safety mechanism 260 is included in arm 215. According to some embodiments, safety mechanism 260 is included in arm base 225. According to some embodiments, arm 215 is connected to main body 144 by way of safety mechanism 260.

Figure 3:
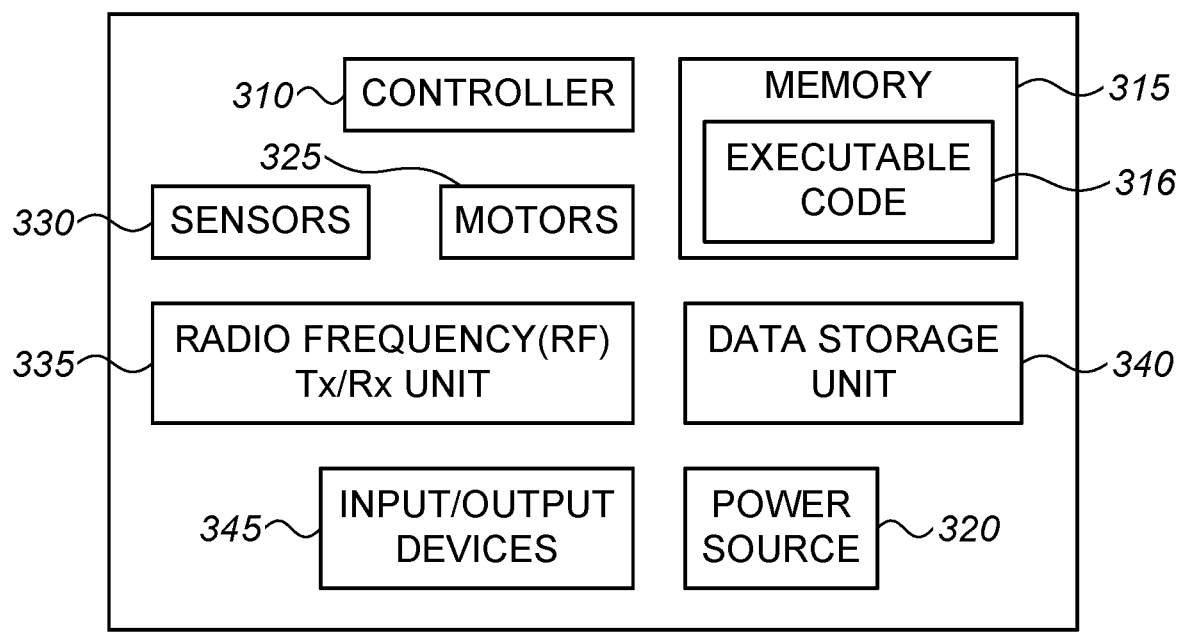
FIG. 3 schematically shows components included in a mobile unit according to embodiments of the invention.

Reference is made to FIG. 3, schematically showing components that may be included in mobile unit 140 according to embodiments of the invention. As shown, mobile unit 140 may include a controller 310, a memory 315, a radio frequency (RF) receive/transmit (Rx/Tx) unit 335 (also referred to as "RF unit 335" herein), a data storage unit 340, input/output (I/O) devices 345, a power source 320, a set of motors 325 and a set of sensors 330. For the sake of simplicity and clarity, some components that may be included in mobile unit 140 are omitted from FIG. 3. For example, arm 215 and wheels 210 are not shown in FIG. 3. Power source 320 may be any suitable power source for providing power to any components of mobile unit 140. For example, power source 320 may be a battery that provides electric energy to motors 325, controller 310, RF unit 335 and/or other components included in mobile unit 140. Accordingly, mobile unit 140 may include an internal power source. According to other embodiments, mobile unit 140 receives electricity from any appropriate external source, connected to mobile unit 140, e.g., via power source 320.

Motors 325 may be electric motors that move and/or extend arm 215, rotate wheels 210 or drive other components included in mobile unit 140. Sensors 330 may be any suitable sensors. For example, sensors 330 may be adapted to sense light, infra red (IR) light, magnetic flux and the like. For example and as described herein, a sensor included in sensors 330 may sense a mark or markers on path or ramp 130 thus enabling mobile unit 140 to position itself at predefined locations on ramp 130 or to refrain from entering certain areas on ramp 130. Another example could be that sensors 330 sense that they are positioned correctly under the animal, e.g., by detecting the shadow created by the animal's body, the heat produced thereby or the like, thus positioning mobile unit 140 as desired.

RF unit 335 may be a component enabling mobile unit 140 to communicate with any component in a system as described herein. For example, RF unit 335 may be a WiFi (also spelled Wi-Fi or Wifi) component or device enabling mobile unit 140 to communicate with a management system or with other mobile units, e.g., in a system that includes a remote management system and/or a plurality of mobile units 140 as described herein. According to other embodiments, the communication is via Bluetooth.

Controller 310 may be, for example, a central processing unit processor (CPU), a chip or any suitable computing or computational device. In some embodiments, more than one controller 310 may be used. For example, a plurality of controllers similar to controller 310 may be included in mobile unit 140.

Memory 315 may be or may include, for example, a Random Access Memory (RAM), a read only memory (ROM), a Dynamic RAM (DRAM), a Synchronous DRAM (SD-RAM), a double data rate (DDR) memory chip, a Flash memory, a volatile memory, a non-volatile memory, a cache memory or other suitable memory units or storage units. In an embodiment, memory 315 is a non-transitory processor-readable storage medium that stores instructions and the instructions are executed by controller 310. Memory 315 may be or may include a plurality of, possibly different memory units.

Executable code 316 may be any executable code, e.g., an application, a program, a process, software, a task or a script. Executable code 316 may be executed by controller 310 possibly under control of an operating system. For example, executable code 316 may be one or more applications that control or manage components in mobile unit 140. For example, when executed by controller 310, executable code 316 may cause controller 310 to control or manage arm 215, treatment units 240, sensors 230, RF unit 335, motors 325 and other components included in mobile unit 140. Where applicable, executable code 316, when executed by controller 310 may cause controller 310 to carry out operations described herein in real-time. For example, controller 310 may be configured to update, process and/or act upon information at the same rate the information, or a relevant event, is received. Executable code 316 may include a plurality of executable code segments. For example, a first code segment may manage and/or interact with RF unit 335 and a second code segment included in executable code 316 may control motors 325. Executable code 316 may include an operating system (OS) that may be a commercial operating system designed and/or configured to perform tasks involving coordination, scheduling, arbitration, supervising, controlling or otherwise managing operation of controller 310, for example, scheduling execution of programs.

Data storage unit 340 may be any suitable system or device capable of storing digital information. For example, data storage unit 340 may include a hard disk, a universal serial bus (USB) device, a CD-Recordable (CD-R) drive and media, a nonvolatile memory chip or any other memory. Content may be stored in data storage unit 340 and may be loaded from data storage unit 340 into memory 315 where it may be processed by controller 310. Content may be stored in data storage unit 340 and may be sent, e.g., using RF unit 335, from data storage unit 340 to a remote computer or system. For example, data acquired by sensor units 230 may be stored in data storage unit 340 and may later be extracted from data storage unit 340 and sent or uploaded to a remote computer.

Input/Output (I/O) devices 345 may be or may include a mouse, a keyboard, a touch screen or pad, a microphone, or any suitable input device. It will be recognized that any suitable number of input devices may be operatively connected to mobile unit 140 or controller 310. I/O devices 345 may include one or more displays, speakers and/or any other suitable output devices. It will be recognized that any suitable number of output devices may be operatively connected to mobile unit 140 or controller 310. Any applicable input/output (I/O) devices may be connected to mobile unit 140 or controller 310. For example, a wired or wireless network interface card (NIC), a modem, printer or facsimile machine, a universal serial bus (USB) device or external hard drive may be included in I/O devices 345.

Embodiments of the invention may include a mini robot (e.g., in the form of mobile unit 140) adapted to travel on a ramp and below dairy livestock, between the fore and hind legs of the livestock. For example, an embodiment of a system may include a mini robot adapted to travel on a ramp on which livestock is standing. An embodiment of a system may include a mini robot adapted to travel to a spot under the livestock and park in at the predefined spot, e.g., as further described herein. In an embodiment, the mini robot or mobile unit may carry equipment usable for treating livestock or may use equipment placed in various, possibly designated, positions in the milking parlor. For example, the mini robot may carry, or extract from a housing, a milking unit and attach the milking unit to the dairy livestock. The milking robot may park under the livestock and, when parked, perform a treatment. For example, a treatment may be milking, disinfecting, obtaining measurements and the like. As described, a mini robot or mobile unit may travel on a ramp on which the livestock is standing. For example, a ramp on which cows are standing may include a guide or rail and a mini robot or mobile unit may travel along or on the guide or rail.

A method of treating dairy livestock may include navigating a mobile unit to a location under the livestock; and carrying out, by the mobile unit, at least one action related to a treatment of the dairy livestock. It will be understood that portions of the operations, such as milking, disinfecting, washing and obtaining measurements, may include usage of equipment as known in the art, which may be included in or on the mobile unit or at any appropriate location in the milking parlor. For example, the actual washing of udders of the animals, as described herein, may be performed as known in the art. Similarly, using jets to spray a disinfectant liquid may be as known in the art. Accordingly, for the sake of clarity and simplicity, details related to some of the operations performed by a mini robot or mobile unit as described herein are assumed to be understood or known to a person having ordinary skill in the art and are not described in detail.

Figure 4:
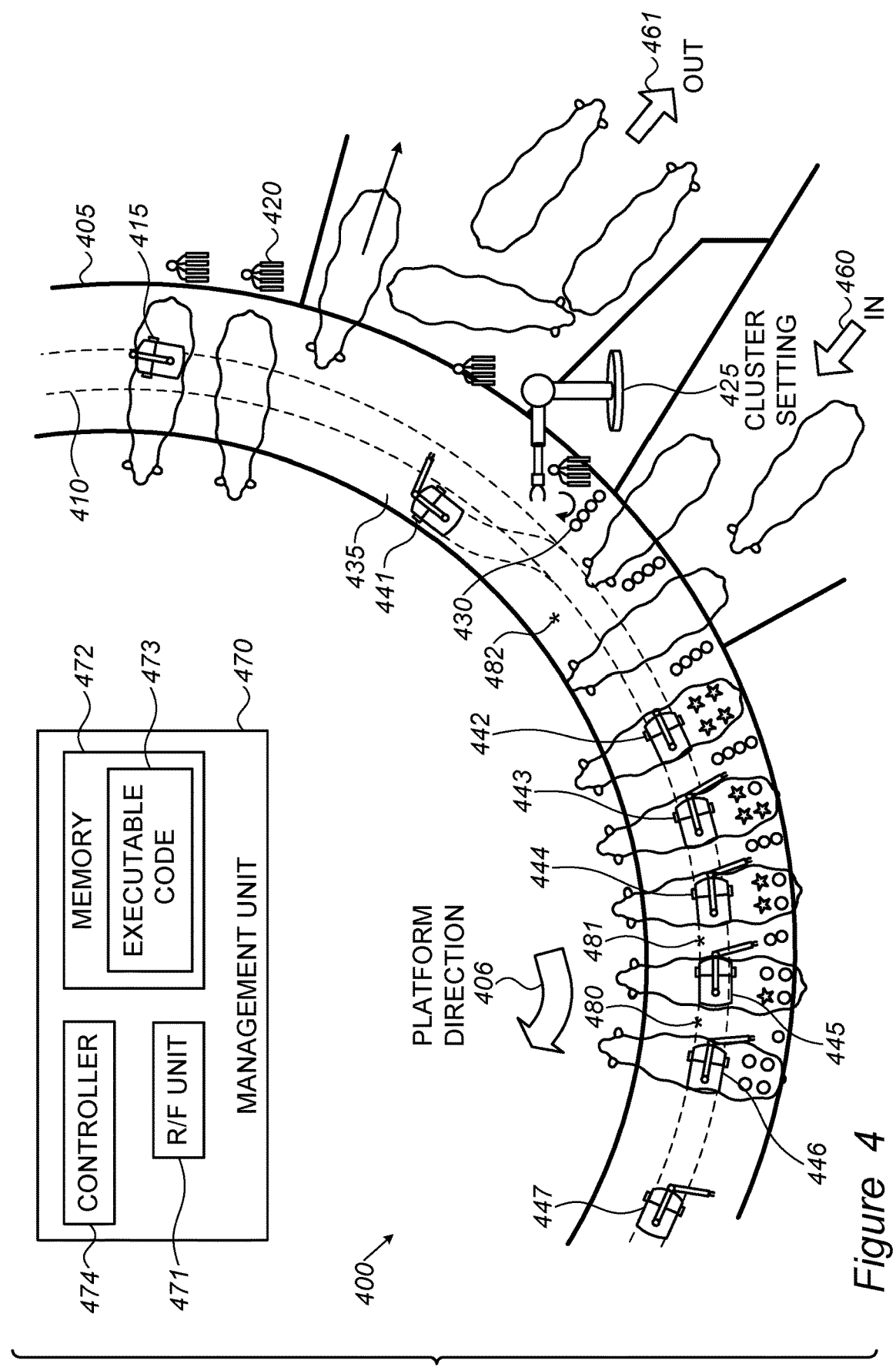
FIG. 4 shows a system according to embodiments of the invention in a rotary milking parlor.

Reference is made to FIG. 4 that shows a system 400 according to embodiments of the invention in a rotary milking parlor. As described herein, system 400 may be included in or operated as a milking parlor or milking platform. It is particularly noted, as will be detailed herein, that all of the elements of the system of the invention may be included in any existing milking parlor, including rotary and parallel milking parlors and may be altered as required according to the type of the milking parlor. As shown, system 400 may include a ramp 405. For example, ramp 405 may be a platform on which animals stand being milked or treated, wherein each animal, once entering ramp 405, stands in a stall, one animal per stall, as known in the art. As shown by arrow 406, ramp or platform 405 may rotate, with the livestock on it. As shown, ramp 405 may include a guide or rail 410 for guiding mobile units. As shown by mobile units 441, 442, 443, 444, 445, 446, 447 and 415, mobile units that may be similar to mobile unit 140 described herein, may be placed on ramp 405 and may travel on ramp 405, e.g., forward or backwards along rail 410 or out to a maintenance area (see, e.g., the position of mobile unit 441). As shown, system 400 may include a maintenance area 435. For example, as shown by mobile unit 441, a mobile unit may exit rail 410 into a maintenance area 435 where it may be serviced, including, for example, removing samples that mobile unit 441 collected from the monitored livestock. It is noted that once mobile unit 441 enters maintenance area 435, it may remain there until ramp 405 stops rotating and until at least in the vicinity of maintenance area 435 there are no moving animals and/or mobile units, such that an operator may safely enter ramp 405, without being endangered by movements of ramp 405, animals and/or mobile units. As shown by arrow 460, animals may enter or mount ramp 405 through a dedicated opening and as shown by arrow 461, animals may exit ramp 405 through a dedicated opening or gate.

System 400 may include a component for housing a milking unit, e.g., before milking has begun and/or after milking has been completed. For example, as shown by assembly 420, an assembly for housing milking equipment may be included in ramp 405. For example, when placed in assembly 420, a milking unit may be washed, disinfected and the like. A system may include a component for placing milking units in a dedicated place or holder that is relatively close to the location of an animal when milked. For example, as shown by arrangement 430, special holders may be included in ramp 405 and a milking unit may be placed in the holder or holders. For example, quartets of holders 430 may separately hold teat cups. As shown by arm 425, a system may include an arm adapted to extract or fetch a milking unit from assembly 420 and place the milking unit in holders 430. It is further noted that arm 425 may not be included in the system and that the milking units may be placed in holders 430 by any appropriate means, such as human operators. In addition, it is noted that the milking unit, which, as shown in FIG. 4, is part of system 400 or of the milking parlor, not part of mobile unit 140, is connected directly to the main milk-line (not shown). Accordingly, system 400 may further include any milk or livestock testing means necessary for assuring that only desired milk enters the main milk-line. Undesired milk, e.g., from an animal receiving antibiotics, may be collected separately. Different types of milk, such as colostrum, may also be collected separately.

In one embodiment, holders 430 are located at a minimal distance from the milked animal. It is noted that holders 430 may hold milking equipment, such as teat cups, cleaning equipment, such as brushes, disinfecting fluid or disinfecting fluid conduits, or any other necessary equipment or substances. According to one embodiment, one holder 430 is positioned between every two stalls, wherein an additional holder may be positioned before the first stall or after the last stall, or between the first and last stalls on a rotary platform. According to some embodiments, any one of the holders may be positioned about in line with the space between the hind legs of an animal, when confined to the stall. Either one of those positions enables arm 215 to be of minimal length, such that mobile unit 140 (see FIG. 2A) has a minimal footprint. According to some embodiments, arm 215 (see FIG. 2A) does not reach beyond the edge of ramp 130. According to some embodiments, arm 215 reaches up to 20 cm beyond the edge of ramp 130. According to some embodiments, arm 215 reaches up to 15 cm beyond the edge of ramp 130. According to some embodiments, arm 215 reaches up to 10 cm beyond the edge of ramp 130. According to some embodiments, arm 215 reaches up to 5 cm beyond the edge of ramp 130.

It is noted that throughout, although reference herein is made to specific mobile units and elements thereof, as well as specific elements of the system, such as mobile unit 140 and arm 215, as presented in FIG. 2A, the embodiments detailed are relevant for any mobile units and system elements, such as mobile units 441, 442, 443, 444, 445 and 446, unless specifically mentioned otherwise.

According to some embodiments, mobile unit 140 is configured such that it may travel on ramp 130, easily fit between the front and hind legs of the livestock, and, when parked under the livestock in working mode, can use arm 215 to reach and operate any necessary equipment, such as teat cups, cleaning brushes and the like. According to some embodiments, the mobile unit is designed such that, when parked under the livestock, as described, the external edges of main body 144 do not protrude beyond the external edge of the body of the livestock under which it is parked. According to some embodiments, any one of the external edges of main body 144 protrudes up to 20 cm beyond the external edge of the body of the livestock under which it is parked. According to some embodiments, any one of the external edges of main body 144 protrudes up to 15 cm beyond the external edge of the body of the livestock under which it is parked. According to some embodiments, any one of the external edges of main body 144 protrudes up to 10 cm beyond the external edge of the body of the livestock under which it is parked. According to some embodiments, any one of the external edges of main body 144 protrudes up to 5 cm beyond the external edge of the body of the livestock under which it is parked.

According to some embodiments, while mobile unit 140 is parked under the livestock, base 225 of arm 215 is positioned under the livestock, while arm 215 may extend out from under the livestock in order to perform any necessary operations, e.g., withdraw teat cups from holder 130 and the like.

As shown, system 400 may include a management unit 470 that may include an RF unit 471 enabling management unit 470 to communicate/coordinate with other components of system 400. For example, management unit 470 may communicate/coordinate with mobile units 441, 442, 443, 444, 445, 446, 447 and 415. As shown, management unit 470 may include a controller or processor 474 and a memory 472 that may include software, instructions or executable code 473. When executed by controller 474, executable code 473 may cause controller 474 to perform operations performed by management unit 470 as described herein. In one embodiment, management unit 470 includes a server computer equipped with RF capabilities. Accordingly, a management software application may be executed on management unit 470 and the management application may communicate with mobile units 441, 442, 443, 444, 445, 446, 447 and 415. Although not shown, management unit 470 may be connected to other components or computers, e.g., management unit 470 may be connected to the internet or to a remote sever. Accordingly, any data obtained by mobile units 441, 442, 443, 444, 445, 446, 447 and 415 may be communicated to management unit 470 and from management unit 470 to any computer or network. Controller or processor 474 and/or controller or processor 310 may be configured to carry out embodiments of the invention by for example executing instructions or software.

As described, a system for treating dairy livestock may include a ramp for containing dairy livestock and one or more mobile units configured to travel on the ramp and below the dairy livestock and perform at least one action related to treatment/testing of the dairy livestock. For example, mobile units 441, 442, 443, 444, 445, 446, 447 and 415 may be small enough to travel under, and between the front and hind legs of cows standing on ramp 405 and may perform various treatments and operations as described herein.

According to some embodiments, ramp 405 is a rotating platform in a rotary milking parlor. According to some embodiments, ramp 405 is a stationary platform in a parallel milking parlor. As would be understood by a person skilled in the art, when the system of the invention is assembled in a parallel milking parlor, there will be two ramps 405, each possibly fitted with a guide or rail 410, as detailed herein, and each having mobile units 140, 415 and the like moving thereon and treating animals on each one of the two parallel platforms.

In a rotary milking parlor ramp 405 may be adapted to translate or move both the dairy livestock and the mobile unit. Accordingly, when positioned under an animal, a mobile unit (e.g., mobile unit 442) may be stationary with respect to an animal above it, while both the animal and the mobile unit are translated (e.g., rotated) by ramp 405. For example, ramp 405 may be a round ramp adapted to translate the livestock and mobile units in a circle around a center. Ramp 405 may include stalls (e.g., as shown in FIG. 1) and may rotate slowly such that animal can enter or mount ramp 405 as shown by arrow 460 and exit ramp 405 as shown by arrow 461.

Guide or rail 410 may be designed to keep the mobile units (e.g., mobile units 446, 447 and 415) within a predefined path along ramp 405 and under the livestock positioned on ramp 405, wherein rail 410 may extend from one end of the ramp to the other and when the ramp is circular (or oval or otherwise shaped in a closed shape), rail 410, or at least a part thereof, may be designed to be the same shape as the ramp, or similar thereto, such that when the livestock are positioned on the ramp, rail 410 travels between the fore and hind legs of the livestock. For example, rail 410 may include side walls that may prevent mobile units from traveling at any direction other than along rail 410. In one embodiment, rail 410 may include rails on which wheels 210 (that may include a groove that fits the rails) travel such that the rails hold the wheels (and thus the mobile units) in a way similar to the way rails hold or guide a train.

In an embodiment, rail 410 may provide mobile units with electrical energy. For example, contacts may be placed on the sides of rail 410 and may provide current to mobile units via electrical contacts included in the mobile units. For example, metal brushes or other components in mobile unit 442 may be connected to motors 325 and be in touch with conductive metal strips or terminals placed on (or along) rail 410. Electric power may be fed into the conductive metal strips or terminals, may flow through the brushes and may power motors 325. Accordingly, rail 410 may provide mobile units with electrical energy.

According to other embodiments, rail 410 is absent, and then, possibly, the movement of the mobile units is controlled, e.g., limited to a certain path, by management unit 470, which may be transmitted/received via electrical means, Bluetooth, internet, WiFi and the like, by controller 310, included in mobile unit 140, by marks, such as marks 480, 481 and 482 on ramp 405 or rail 410 or by any other appropriate means.

Mobile unit 140 may be adapted to perform various treatments and operations. For example, mobile unit 415 may disinfect animals (e.g., udders or teats) by spraying a disinfectant liquid. For example, mobile unit 415 may include a container or tank that stores iodine and treatment units 240 may include a nozzle or jet for spraying the iodine on the animals, e.g., after milking is completed and a milking unit was removed. Treatment units 240 may include a component adapted to warm or heat the udder or other part of an animal, accordingly, a mobile unit as described herein may heat an organ of the livestock, e.g., by attaching a heating component to the livestock or placing a heating component in the proximity thereof.

In one embodiment, a mobile unit (e.g., mobile unit 140) may include a tank or container that stores water or other liquids usable for cleaning or washing the livestock and/or cleaning or washing ramp 405. For example, nozzles included in treatments units 240 may eject water or other liquids on animals standing on ramp 405. Nozzles or jets included in treatments units 240 may be used to wash ramp 405. Acting as a robot, a mobile unit described herein may move/extend arm 215 such that nozzles or jets are directed to wash a livestock or wash ramp 405.

Treatments units 240 and/or sensing units 230 may include a camera usable for acquiring an image. It is noted that throughout, unless specifically mentioned otherwise, the camera may be replaced with any other appropriate device, such as a laser scanner and the like. It is further noted that, unless specifically mentioned otherwise, any unit may include more than one device for acquiring an image, possibly two different types of devices. For example, arm 215 may place or aim a camera included in sensing units 230 such that an image of any desired part of the animal, such as an animal's belly, buttock or udder is captured. An image acquired as described may be used for attaching a milking unit (e.g., by determining exact or relevant location of teats), for diagnosing any possible condition or the like. An image may be used to identify an animal. For example, by analyzing an image of an udder or an image of a mark on an animal's body, the animal may be identified. For example, hot-iron branding on a belly of an animal may be identified by processing an image of the animal's belly and using known image or pattern recognition methods. For example, an image of the animal's belly may be processed by controller 310 or controller 474, a mark may be identified in the processed image and a database that includes a list of the animals and their respective marks may be used in order to identify the animal. Other marks (e.g., made using freezing, e.g., using liquid nitrogen or dry ice) may be similarly identified. Accordingly, sensing units 230 may include a sensing device for identifying the livestock.

Other devices or sensors included in treatments units 240 and/or sensing units 230 may be devices or sensors for testing for pregnancy as known in the art. For example, an ultrasound sensing device included in sensing units 230 may be used to capture a heartbeat of a fetus. It is noted that, although sensing units 230, treatment units 240 and gripping unit 250 are depicted on the distal end of arm 215, according to different embodiments they may be positioned on arm 215 or on mobile unit 140 at any appropriate location, and further, their location on arm 215 or mobile unit 140 may be changed, as required.

Any data acquired by sensing units 230 may be stored. For example, images acquired by a camera, laser scanner or any other appropriate device, or signals acquired by a sensor may be stored on data storage unit 340. Any data stored on data storage unit 340 may be downloaded or uploaded to a remote computer or data in data storage unit 340 may be communicated over a network. Data in data storage unit 340 may be transferred or copied using a direct wire, e.g., using a USB port included in mobile unit 140. Accordingly, it will be understood that data acquired, processed or generated by mobile units such as 441, 442, 443, 444, 445 and/or 140 may be available to other components of system 400.

In one embodiment, mobile unit 140 (or similar mobile units shown in FIG. 4) may travel to a predefined location under an animal and perform operations described herein when located at the predefined spot or location. For example, an optimal location for treating an animal may be right under the animal, possibly at a short distance from the udder. At the predefined location, mobile unit 140 may rotate or otherwise move or maneuver such that it is at a selected, possibly pre-defined, orientation. For example, mobile unit 140 may rotate itself such that arm 215 is at minimal distance from holders 430.

To determine its location, mobile unit 140 may use any applicable system or technique. For example, controller 310 (or controller 474) may use image processing techniques in order to determine a location of mobile unit 140, based on video or images received from a camera or any other appropriate device in sensor units 230.

An electro-mechanic switch may be used in order to enable mobile unit 140 to determine it has reached a predefined spot in a stall. For example, a mechanical sensor included in mobile unit 140 may be configured to detect a mark on rail 410. For example, rail 410 may include a bulge (or cavity or hole) that marks a center of a stall and a rod connected to a micro-switch included in mobile unit 140 may slide along rail 410 and activate the micro-switch when reaching the bulge or cavity. An activation of the microswitch may enable mobile unit 140 to determine it is located in a center of a stall. An optical sensor included in mobile unit 140 may detect an optically detectable signal emitted from a source placed in a center of a stall. In yet other embodiments, a mark may be or may include a magnet placed in a stall and a sensor adapted to sense a change in magnetic flux may be included in mobile unit 140, such that mobile unit 140 may stop or park in a stall based on a sensed magnetic field or flux.

In an embodiment, ramp 130 includes stalls for containing the livestock. For example, when entering platform 405 as shown by arrow 460, animals enter separate stalls.

In an embodiment, the floor of ramp 405 includes markings or marks that are detectable by the mobile units. For example, a mark may be placed at the center of each stall in ramp 130. For example, the mark may be an RF beacon, a specific color, e.g. paint, and the like. A sensor included in sensors 330 may detect a mark (e.g., by identifying the color of the mark or picking up an RF beacon). Based on identifying the location of the mark, mobile unit may travel to a location defined based on the location of the mark. For example, mobile unit may position itself such that a specific part of the mobile unit, e.g., the center thereof, is right above the mark or in a predefined proximity thereof. For example, a sensor included in sensors 330 may send controller 310 the location of a mark (or a relative location with respect to a mobile unit) and controller 310 may cause motors 325 to move (e.g., by driving wheels 210) a mobile unit to a location that is closest to the mark. It will be understood that various other methods or components for enabling a mobile unit to determine its location in a stall may be used.

In an embodiment, a marking or mark may be placed on or within rail 410. Accordingly, in order to place a mobile unit right above the mark, controller 310 may only need to cause the mobile unit to move in one of two directions (e.g., either forwards or backwards). For example, marks placed on the floor of ramp 405 and/or on or in rail 410 and at the centers of stalls may be used by mobile units such as 444, 445 and/or 140 in order to determine their location with respect to a stall containing the livestock. For example, using a mark as described, a mobile unit may position itself under an animal in a stall.

As described, a system may include a unit for placing a milking unit in a housing. For example, a system may include an arm 425 adapted to fetch a milking unit from assembly 420 (where the milking units may have been washed or otherwise treated) and place the milking units in holders 430. It will be understood that holders 430 may be any suitable housing adapted to house the milking units.

Holders 430 may be located at a minimal distance from the animal and the location of holder 430, e.g., with respect to a center of a stall, may be known. Accordingly, when located right above a mark or in close proximity thereto, e.g., approximately in a center of a stall, a mobile unit may determine the relative location of holders 430. Accordingly, a mobile unit may be adapted to determine its location (e.g., in a stall) and, based on its location, determine the location of holders 430. Otherwise described, knowing its location in a stall, a mobile unit may readily determine the location of a milking equipment unit housed by holder 430. According to some embodiments, mobile unit 140 is designed to locate any necessary milking equipment, even if when the specific location of the mobile unit is not known.

In an embodiment, a mobile unit is adapted to detach a milking equipment unit from a housing or holder and attach the milking equipment unit to the dairy livestock. For example, using arm 215 and gripping unit 250, mobile unit 140 may detach a milking unit (e.g., a teat cup) from holders 430 and attach the milking unit to the milked animal. For example, the location of holders 430 (with respect to a center of a stall) may be known in advance, accordingly, controller 310 may cause arm 215 to move to holders 430 and grip a milking unit. As described, the location and/or shape of an udder may be known to mobile unit 140 (e.g., based on processing an image of the lower part of the animal as described). Accordingly, controller 310 may cause arm 215 to move to a location under an udder and lift teat cups such that they snap onto the teats (e.g., by force of vacuum in the teat cups as known in the art). It will be noted that when a mobile unit is located under an animal, possibly in the near proximity of the udder, the distance an arm of the milking unit needs to travel in order to fetch a milking unit and attached the milking unit to the animal is kept to a minimum. A milking unit may be, for example, a set of four teat cups or it may be one teat cup.

Using marks 480, 481 and 481 in stalls as described, a mobile unit may automatically travel from a first stall to a second stall. For example, detecting marks 480, 481 and 481 on a floor of ramp 130 as described, mobile units 441, 442, 443, 444, 445, 446, 447 and 415 may travel from a first stall to a second stall. For example, to travel from a first to a second stall, mobile unit 442 may travel, along rail 410 until mark 480 is detected and determined to be right under any part of mobile unit 442. Leaving a first stall, a mobile unit may travel, along rail 410, till it detects mark 480. Detecting a mark on the floor of ramp 130 may indicate to a mobile unit that it is located in the proper position in a stall. In order to travel from a first stall to a third stall, a mobile unit may continue its motion after detecting a first mark till a second mark 481 is detected. Marks 480 and 481, for example, are placed on rail 410, while mark 482 is placed on the floor of ramp 130, and may be used, e.g., for a mobile unit not traveling on the rail, at least in that specific area in the vicinity of mark 482. Although for sake of simplicity only three marks are shown, and their position in the figure seems to be between the stalls, it is noted that any number of marks may be used, and they may be positioned as required, in the stalls, outside of the stalls, between the stalls, on the middle of the rail, and the like. It is further noted that as detailed above, different types of marks may be used, and further, the same system may include any number of any appropriate type of marks.

As shown by area 435, a system may include a service or maintenance area where mobile units may be parked and serviced or where samples obtained from the animals by the mobile unit may be collected and/or examined. Other operations may be performed when a mobile unit is in area 435, for example, data stored in data storage unit 340 may be transferred or copied from a mobile unit when in area 435. In an embodiment, management unit 470 may cause a mobile unit to exit rail 410 and enter area 435. For example, rail 410 may include an arrangement similar to a railroad switch or turnout as used in trains. A turnout may be operated by electric motors that may be controlled by management unit 470 (e.g., using RF or wired communication).

Accordingly, by controlling a component of rail 410, management unit 470 may cause a mobile unit to travel to area 435, e.g., as shown by mobile unit 441. In an embodiment, management unit 470 may monitor movements and locations of mobile units 441, 442, 443, 444, 445, 446, 447 and 415. For example, mobile units may report their location to management unit 470 or other means may be used (e.g., global positioning system components installed in mobile units). Accordingly, management unit 470 may determine when and how to operate a turnout such that a selected mobile unit travels into area 435.

Mobile units 441, 442, 443, 444, 445, 446, 447 and 415 may collaborate and/or cooperate to complete a task, treatment or operation. As known in the art, a milking unit may include four teat cups that need to be attached to the four teats of a cow (the number and size varying according to the animal being milked). In an embodiment, a first mobile unit (e.g., mobile unit 443) may be adapted to attach a first portion of a milking unit to the dairy livestock and a second mobile unit (e.g., mobile unit 444) may be adapted to attach a second portion of the milking unit to the dairy livestock. For example, mobile unit 443 may attach a first teat cup, mobile unit 444 may attach a second teat cup and mobile units 445 and 446 may respectively attach the third and fourth teat cups. Mobile unit 442 may perform preparation related operations, e.g., washing, heating and the like. As described, by processing an image of an udder, the teats in the udder may be identified and their location may be calculated, for example using known computer image processing or recognition methods. For example, if the location of mobile unit 442, when acquiring an image of an udder, is known, and a location of a camera, laser scanner or the like, on arm 215 is known (e.g., since the location or position of arm 215 are known) then the location of objects in an image may be calculated. In some embodiments, a video stream may be produced by a camera, laser scanner or the like, carried by arm 215 and controller 310 may use a video stream to move/extend arm 215 such that it brings a milking unit to the teats. Any known methods used by robots or other automated systems may be used by mobile units in order to carry and place equipment such as a milking unit at a desired location or position. For example, any methods used by milking robots known in the art may be used by mobile units 415, 442 and 443. As noted, unlike milking robots placed outside a stall, in an embodiment, a milking robot may be, or may be included, in a small mobile unit adapted to move to a location under the livestock and perform operations from under the livestock, thus minimizing movement of an arm or other parts of the milking robot.

When a mobile unit completes its task in a current stall it may travel to the next stall, e.g., in a direction opposite to the direction of rotation of ramp 405 or in the same directed as the rotation of ramp 405. Prior to moving to the next stall, a mobile unit may determine whether or not another mobile unit is located in the next stall. For example, as described, management unit 470 may monitor mobile units' locations and may therefore know whether or not mobile unit is located in a specific stall. Accordingly, a mobile unit may communicate with management unit 470 and may be advised whether or not it may move from its current stall to the next stall. In another embodiment, a mobile unit may communicate/coordinate with adjacent mobile units in order to determine their location and thus determine whether or not it may move into a stall. Accordingly, a mobile unit may automatically travel from a first stall to a second stall based on a command or information received from a management unit 470 and/or autonomously, based on information received from other mobile units.

In an embodiment, a plurality of mobile units may be configured to intercommunicate/coordinate in order to collaborate in performing an action related to treatment/testing of the dairy livestock. Collaboration or cooperation may be realized in various ways. For example, one mobile unit, e.g., mobile unit 442 that may be the first mobile unit to treat an animal in the current milking session, may include a camera, laser scanner or the like, for obtaining an image of the livestock. The image may be processed, e.g., by management unit 470 or by one of the mobile units, and a location of an organ of the livestock may be determined and possibly recorded. For example, using an image and provided with the location of the mobile unit that acquired the image, the location of an udder (and/or teats), with respect to a marking in a stall may be determined and possibly recorded. For example, coordinates of an udder or teats, relative to a mark in a stall may be sent to other mobile units. Accordingly, using an image obtained by mobile unit 442, mobile units 443, 444, 445, 446 and 447 may be informed, in advance, of the location of the udder or teat of the animal.

One (or more) mobile units in a plurality of mobile units may act as a backup unit. For example, mobile units 443, 444, 445 and 446 may each attach one of four teat cups to a cow (or two of a goat, etc.). For example, after mobile unit 443 attaches a first teat cup, it moves to the next stall and mobile unit 444 moves to the stall that mobile unit 443 left. Mobile unit 444 may then attach the second of four teat cups to the cow. Thus, mobile units may collaborate in attaching a complete milking assembly.

However, if one of mobile units 443, 444, 445 and 446 fails to attach a teat cup, it may report failure to management unit 470 (or to other mobile units) and mobile unit 447, when acting as a backup unit, may attach a teat cup that another mobile unit failed to attach. Adapted to communicate/coordinate either with each other or with a central management unit 470, mobile units may send and receive any information related to an operation performed by a set of mobile units. Accordingly, one mobile unit may correct errors or failures caused by another mobile unit. For example, a first mobile unit may automatically complete an action that at least one other mobile unit failed to complete as described.

In an embodiment, each mobile unit in a set of mobile units may be configured to communicate/coordinate with other mobile units included in the set. A set of mobile units may be configured to dynamically and automatically determine a portion of a treatment to be performed by each of the mobile units in a set. For example, mobile unit 444 may only move to the next stall if mobile unit 443 has left that stall. If mobile unit 444 completes attaching a teat cup as configured and cannot move to the next stall, mobile unit 444 may attach another teat cup, e.g., one typically attached by mobile unit 445. In an embodiment, distribution of sub-tasks may be configured (e.g., each mobile unit is configured to attach one specific teat cup). Mobile units may override a configured distribution of sub-tasks, e.g., a first mobile unit may perform a sub-task that was assigned to a second mobile unit in a configured distribution of sub-tasks.

It is noted that although the attachment of teat cups is related to herein, any sort of desired treatment/testing may be contemplated, such as cleaning, wherein one mobile unit applies disinfectant to a certain area on the animal, the second washes the disinfected area with water and the third dries the area. Testing may also be involved, e.g., utilizing syringes, wherein, after disinfecting/washing and possibly drying, a further mobile unit is utilized for retrieving a blood or milk sample.

Mobile units may send any information to management unit 470. For example, mobile units may report completion of a sub-task, failure to complete a task or sub-task and the like. Management unit 470 may be configured to be aware of the progress of the various tasks and to dynamically cause at least some of the mobile units to each perform a portion of a treatment. For example, provided with information from mobile units related to a progress of a treatment (e.g., milking), management unit 470 may dynamically allocate tasks to mobile units. For example, if mobile unit 445 reports a malfunction or a failure to attach a teat cup, management unit 470 may command mobile unit 444 to "fill in" for mobile unit 443, e.g., attach a teat cup that, in a previous configuration, was to be attached by mobile unit 443.

According to some embodiments, the distance between the mobile unit and the animal is between about 30-50 cm. According to some embodiments, the distance between the mobile unit and the animal is between about 20-30 cm. According to some embodiments, the distance between the mobile unit and the animal is between about 30-40 cm. According to some embodiments, the distance between the mobile unit and the animal is between about 40-50 cm. According to some embodiments, the distance between the mobile unit and the animal is between about 50-60 cm. It is noted that, although not limited to this definition, the distance between the mobile unit and the animal may be between any part, e.g., the base of the arm of the mobile unit and the position on the animal that is treated, e.g., the udder, such that the distance between the mobile unit and the animal is essentially the distance that the arm extends. According to other embodiments, the distance between the mobile unit may be measured between it's position on the ramp relative to the position of the animal or the area on the animal that it treated.

A movement of a mobile unit from one stall to another may be synchronized or based on a movement of another mobile unit. For example, when mobile unit 442 has finished washing the animal in its current stall it may move to the next stall and inform mobile unit 443 that it may move to the stall that mobile unit 442 just left. In another embodiment, mobile unit 442 reports to management unit 470 that it has finished its tasks in the current stall and may request permission from management unit 470 to move to the next stall. Management unit 470 may keep track of the location of all mobile units in system 400 (e.g., based on reports from the mobile units as described). Accordingly, management unit 470 may determine whether or not a mobile unit may move to the next stall (e.g., by determining no other mobile unit is present in the next stall), to the maintenance area or the like.

Mobile units and management unit 470 may share information. For example, an image taken by mobile unit 442 (that may be the first unit to treat an animal in a milking session) may be shared by all mobile units in system 400. Data (e.g., coordinates of teats in an udder) determined based on an image taken by one of the mobile units may be shared by some of or all of the units. For example, management unit 470 may receive an image from mobile unit 442, determine, based on the image, the location of the animal's teats with respect to the stall or with respect to a known location within a stall, and provide the coordinates to mobile units 442, 443, 444, 445, 446 and 447.

Figure 5A:
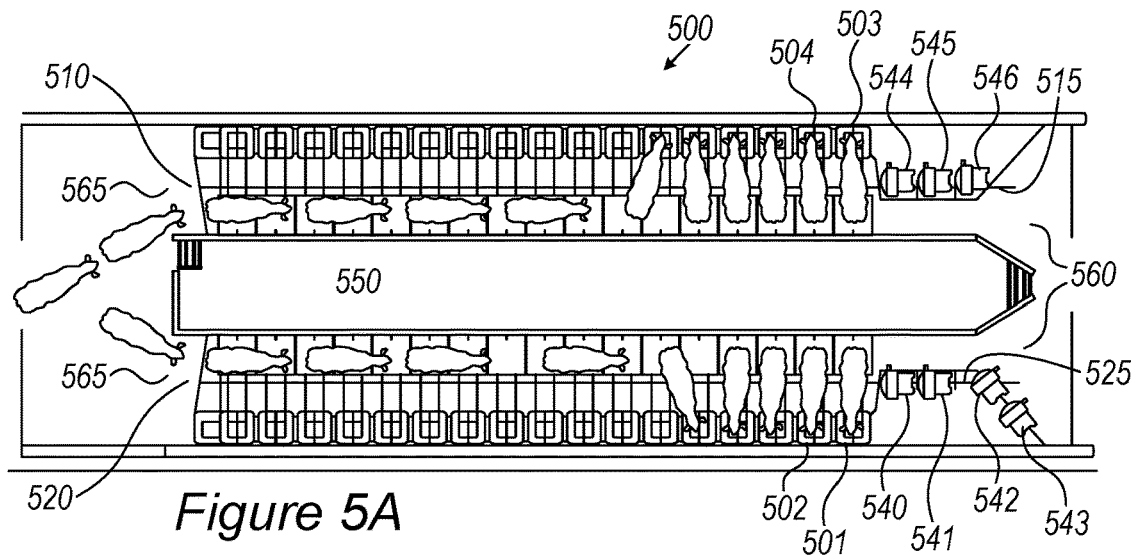
Figure 5B:
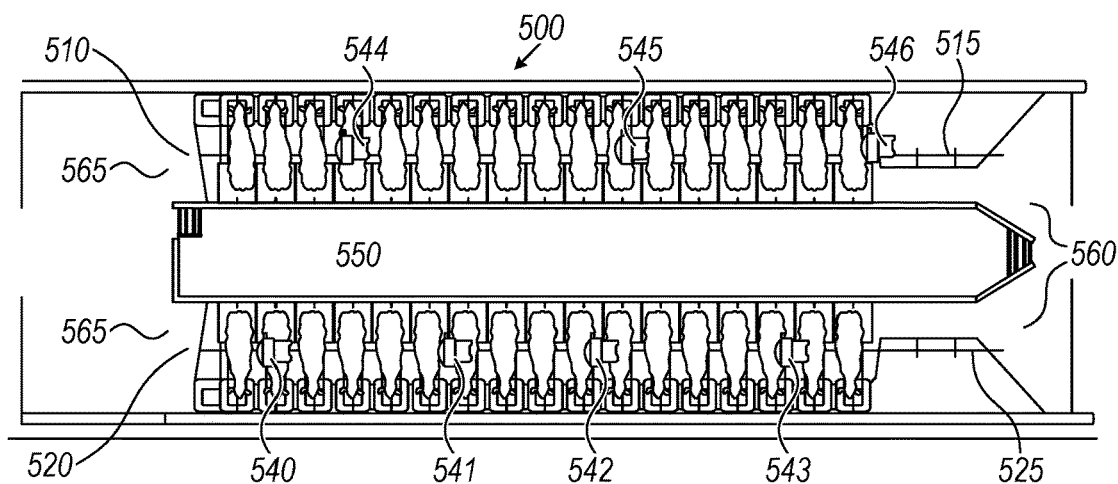
Figure 5C:
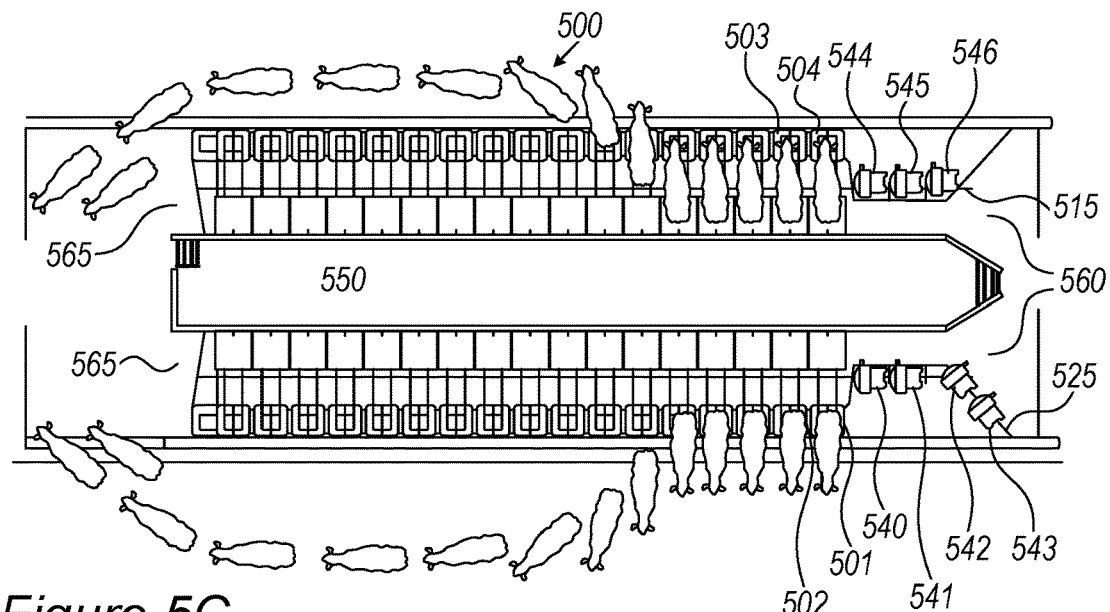

Reference is now made to FIGS. 5A, 5B and 5C, presenting embodiments of system 500 assembled in a parallel milking parlor. As shown in FIG. 5A, the livestock load into stalls 501, 502, 503, 504 and the like, while mobile units 540, 541, 542, 543, 544, 545 and 546 are positioned in parking area 560. It is noted that any number of mobile units may be used, including a single mobile unit and that for illustration reasons only a certain number of a plurality of mobile units is presented. It is further noted that although different numbers have been designated to different mobile units in the same or different figures, any of the mobile units may include any of the embodiments detailed regarding any of the other mobile units, including mobile unit 140. It is further noted that according to some embodiments, the system includes parking area 565, which may be used by the same or additional mobile units. According to some embodiments, the system includes both parking areas 560 and 565. It is further noted that any of the parking area may be used for parking, maintenance and the like.

As presented, stalls 501, 502, 503, 504 and the like are arranged on two parallel ramps 510 and 520, between which is milking pit 550. As presented, according to some embodiments, mobile units 540, 541, 542, 543, 544, 545 and 546 are positioned on or attached to rails 515 and 525, which stretch along platforms 510 and 520, respectively, and according to some embodiments, as shown, extend into parking area 560.

Once the livestock are loaded into stalls 501, 502, 503, 504 and the like, they remain within the stalls until the treatment thereof has been concluded. In this respect it is noted that although milking is the main treatment described herein, any other types of treatment could be performed according to the invention. While the livestock remain in the stalls, any number of mobile units 540, 541, 542, 543, 544, 545 and 546 may leave parking area 560. It is noted that according to embodiments of the invention, the mobile units are stationary while the livestock are "on the move", i.e., not confined to the stall, while when the livestock are confined to the stalls, the mobile units may be mobile, entering the stalls for treating the livestock. Accordingly, the chances of collisions and the like, between the livestock and the mobile units and kept to a minimum.

As presented in FIG. 5B, once the livestock are confined to stalls 501, 502, 503, 504 and the like, mobile units 540, 541, 542, 543, 544, 545 and 546 leave parking area 560. According to some embodiments, mobile units 540, 541, 542, 543, 544, 545 and 546 leave parking area 560 only after the positions of the livestock in stalls 501, 502, 503, 504 and the like have been identified/verified by any appropriate means, such as sensors positioned on the livestock, in the stalls and the like. As detailed herein, any number of controllers, management units, RF units, memory units, and the like may be included in the system and may provide data, e.g., regarding the position of the livestock, the position of the mobile units, any health parameters of the livestock, the stage of treatment and the like.

According to some embodiments, as shown, mobile units 540, 541, 542, 543, 544, 545 and 546 move along rails 515 and 525 from parking area 560 along ramps 510 and 520. As shown, rails 515 and 525 are positioned along ramps 510 and 520, respectively, such that when the livestock is confined to the stalls, rails 515 and 525 are positioned between the fore and hind legs of the livestock. Therefore, mobile units 540, 541, 542, 543, 544, 545 and 546 moving along rails 515 and 525 are also located on a path that passes between the fore and hind legs of the livestock, from where they perform any necessary treatments on the livestock. It is noted that one mobile unit may fully treat any one of the livestock, while according to other embodiments, a plurality of mobile units may treat any one of the livestock, such that each one of the plurality of mobile units performs part of the treatment. It is further noted that although two rails 515 and 525 are presented, any other configuration of a rail or number of rails is possible. For example, the rails may not extend into parking area 560. For example the rails may include any number of branches, e.g., within the parking area, or leading from any point on the ramp to any other point, e.g., into the milking pit, into designated areas in the milking pit or into other areas surrounding the ramp, which may be used, e.g., for removing or repairing malfunctioned mobile units from the ramp, for introducing additional mobile units, when necessary, for removing/replacing or exchanging parts of the mobile units and the like. For example, rails 515 and 525 may be connected to one another, e.g., in parking area 560, essentially providing one continuous rail. For example, any number of bridges may be formed between rails 515 and 525, e.g., over milking pit 550. According to some embodiments, any such branches, bridges and the like are designed such that human operators in the milking pit are not endangered by the mobile units, e.g., the branches/bridges are designed to be above the heads of the human operators, the branches/bridges are positioned in predefined areas to which the access of human operators is limited, at least when functioning mobile are present or may be present therein, and the like. It is noted that the rails referred to herein may be considered to be, or replaced by, any other type of guide, pathfinder or the like.

As shown in FIG. 5C, once the treatment of the livestock has been concluded, mobile units 540, 541, 542, 543, 544, 545 and 546 return to parking area 560 along rails 515 and 525. Once mobile units 540, 541, 542, 543, 544, 545 and 546 are parked in parking area 560, the livestock exits stalls 501, 502, 503, 504 and the like, as presented in FIG. 5C, wherein the livestock have already partially exited stalls 501 and 502.

It is further noted that any embodiments detailed above regarding system 400 in a rotary milking parlor, e.g., management unit 470, and the like, may be used, possibly after any necessary adjustments, in a system assembled in a parallel milking parlor, such as system 500, unless those embodiments are not appropriate for a parallel parlor setup. Further, any embodiments detailed regarding system 500 in a parallel milking parlor may be used, possibly after any necessary adjustments, in a system assembled in a rotary milking parlor, such as system 400, unless those embodiments are not appropriate for a rotary parlor setup.

Figure 6:
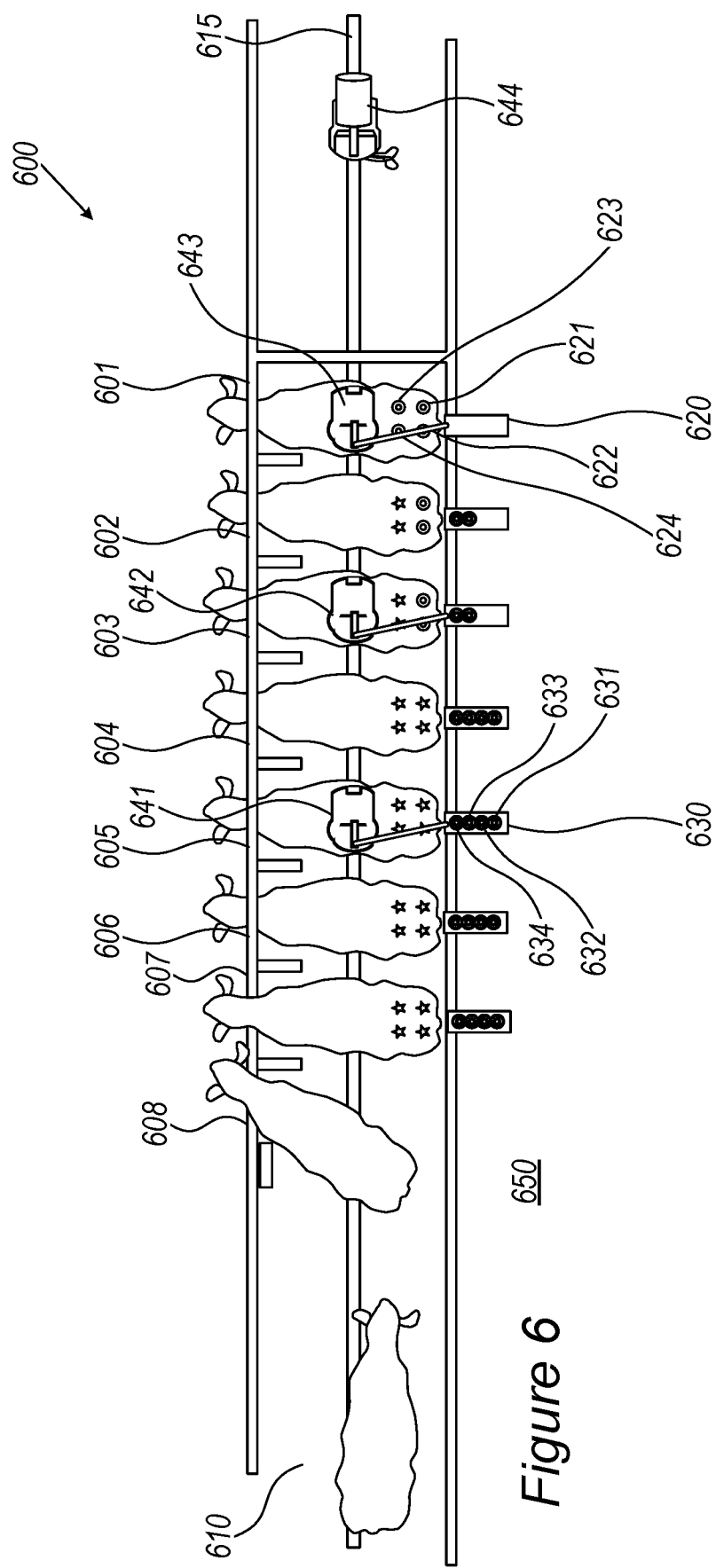
FIG. 6 shows a system according to embodiments of the invention in a parallel milking parlor, specifically presenting the treatment of the livestock, including attaching treat cups thereto, by a plurality of mobile units.

Reference is now made to FIG. 6, presenting embodiments of system 600, in a parallel milking parlor, wherein only part of one of the two parallel ramps is shown. As shown, rail 615 extends along ramp 610 and mobile units 641, 642, 643 and 644 move along rail 615, between the fore and hind legs of the livestock, while treating the livestock. According to some embodiments, any one of mobile units 641, 642, 643 and 644 may be mobile or stationary at any appropriate time or point along rail 615 and/or during the treatment of the livestock on ramp 610. For example, while treating a certain one of the livestock, any one of the mobile units may be parked under that livestock, at least for the time necessary to complete the treatment, or part of treatment, as necessary. It is further noted that, although a certain embodiment is presented, any coordination between the various mobile units is possible. For example, each livestock may be fully treated by one of the mobile units. For example, any number of mobile units may treat each livestock, wherein each one of the mobile units performs part of the overall necessary treatment. It is further noted that although four mobile units are depicted in FIG. 6, any number of mobile units, including a single mobile unit or a plurality of mobile units may be used according to embodiments of the invention.

As presented in FIG. 6, assuming that the mobile units are loaded onto ramp 610 from the right hand side, mobile unit 641 is the first mobile unit to pass under the livestock. According to some embodiments, when the treatment of the livestock includes milking, mobile unit 641 may be used for any necessary pre-milking task, such as cleaning and sanitizing the udders, stimulating the milk production, and the like. According to some embodiments, mobile unit 641 parks under each and every one of the livestock along the ramp, beginning on the right side in stall 601, and performing the designated part of the required treatment, e.g., pre-milking sanitizing the udders and stimulating milk production. According to some embodiments, mobile unit 641 includes any of the necessary pre-milking equipment, including brushes and sanitizing liquid, which may be stored on mobile unit 641 in a designated receptacle. According to some embodiments, any of the pre-milking equipment may be positioned on the ramp, e.g., in the stalls, at a position that mobile unit 641 may easily reach when positioned to treat the livestock. For example, each stall may comprise a receptacle holding sanitizing fluid and/or at least one brush. According to some embodiments, holders 620, 630 and the like may comprise any necessary pre-milking equipment. According to some embodiments, a separate unit comprising a reservoir of pre-milking disinfection liquid, brushes or any other equipment, may be conveyed along the rail, where it may be reached, e.g., by any one of the mobile units performing the pre-milking tasks.

Once mobile unit 641 has completed the pre-milking task on the animal in stall 601, it may move on into stall 602, where it may again park and treat the animal confined to stall 602. As detailed herein, any number of marks may be included on ramp 610 and/or on rail 615, enabling the proper positioning of any one of the mobile units as well as enabling the movement of any one of the mobile units from stall to stall.

Once mobile unit 641 leaves stall 601, second mobile unit 642 may enter stall 601. As detailed herein, the coordination between the various mobile units may be performed by any appropriate means, including direct communication between any of the mobile units, communication between the mobile units and a central management unit, sensors that are part of the milking parlor, e.g., on the ramp, in the stalls, from above the stalls, in the milking pit, and the like, which communicate with the mobile units and/or a central management unit.

Mobile unit 642 may be designated to connect any number of teat cups to the livestock. As detailed herein, the teat cups according to the invention are considered to be part of the milking parlor/platform/ramp/stalls, not part of the mobile unit, and accordingly, the milk passing through those teat cups passes directly into the main milk-line and is not stored in any receptacle on the mobile unit or the like. It is noted that, as known in the field, if certain milk should not enter the main milk-line for any reasons, such as it being milked from a cow receiving antibiotics, known methods may be used to prevent that particular milk from entering the main milk-line. Known methods may also be used to classify, test or identify the milk and/or its components.

Since the teat cups, e.g., teat cups 621, 622, 623 and 624, as well as teat cups 631, 632, 633, 634 and the like, are part of the milking parlor/platform/ramp, not part of the mobile unit, they may be positioned on ramp 610 at a position at which the mobile units may easily reach them. According to some embodiments, teat cups 621, 621, 623, 624, 631, 632, 633, 634 and the like are held in designated holders 620, 630 and the like. It is noted that although only a certain number of holders and teat cups are specifically related to herein, any appropriate number thereof may be included in system 600, as required according to the type of livestock, number of livestock and the like.

Each of holders 620, 630 and the like may hold any required number of teat cups, such as two or four. The number of teat cups per holder may change according to the number of teats the particular animal being milked has. As mentioned above, holders 620, 630 and the like are positioned in the milking parlor, e.g., on ramp 610, at a position where they can be readily reached by the mobile units. According to some embodiments, holders 620, 630 and the like are positioned between every two stalls 601, 602, 603, 604, 605, 606 and the like. Further, in order for the number of holders to match the number of stalls, an additional holder may be positioned before the first stall (according to the depicted embodiment, to the right of the first stall 601) or after the last stall (according to the depicted embodiment, to the left of the last stall). According to other embodiments, holders 620, 630 and the like are positioned about in line with the space between the hind legs of the animal confined to each stall.

According to some embodiments, holders 620, 630 and the like do not extend into milking pit 650. According to some embodiments, holders 620, 630 and the like extend into milking pit 650 by up to about 5, 10, 15, 20, 25, 30, 35, 40, 45 or 50 cm.

According to some embodiments, the position of holders 620, 630 and the like, including their configuration, e.g., folded or unfolded, may change during the treatment of the livestock. According to some embodiments, while the livestock enter stalls 601, 602, 603, 604, 605, 606 and the like, holders 620, 630 and the like extend, at least partially, out of ramp 610 into any part of the milking parlor, including, though not limited to, milking pit 650. For example, while the livestock enter stalls 601, 602, 603, 604, 605, 606 and the like, holders 620, 630 and the like, may be positioned, at least partially, in milking pit 650, such that the entrance of the livestock into stalls 601, 602, 603, 604, 605, 606 and the like is not hindered by holders 620, 630 and the like. Once the livestock are positioned in stalls 601, 602, 603, 604, 605, 606 and the like, holders 620, 630 and the like may remain in their position (between the stalls, though, at least partially, outside ramp 610, e.g., in milking pit 650), from where the mobile unit will remove the necessary equipment. According to such an embodiment, the arm of the mobile unit extends into milking pit 650 by up to about 5, 10, 15, 20, 25, 30, 35, 40, 45 or 50 cm. According to other embodiments, once the livestock are positioned in stalls 601, 602, 603, 604, 605, 606 and the like, the position of holders 620, 630 and the like may be changed, such that holders 620, 630 and the like move, at least partially, from milking pit 650 (or from any other appropriate area in the milking parlor), into a position between the stalls on the platform/ramp and/or into a position between the hind legs of the animal confined to the stall. According to such an embodiment, the arm of the mobile unit may not extend into milking pit 650 (or into any other appropriate area in the milking parlor). According to some embodiments, all of the holders move at the same time. According to other embodiments, any one of the holders may move, in or out of the position between the stalls, at a designated time, e.g., when the equipment therein, e.g., teat cups, is to be reached by a mobile unit, or when the livestock are confined to the two stalls between which the holder is positioned (or to any one of the stalls at the ends of ramp 610) or to the stall in which the holder is positioned, if the holder is about in line with the space between the hind legs of the animal confined to the stall. According to some embodiments, the movement of the holders and/or the configuration change thereof, is performed by any appropriate means, which may be mechanical, manual, electronic or automatic. According to some embodiments, the movement or configuration change of the holders is initiated according to any signal received from any appropriate sensors, which may be either part of the milking platform or of the mobile unit. According to some embodiments, any one of the mobile units may grab an edge of any one of the holders and either pull it, at least partially, into ramp 610 or push it, at least partially, away from ramp 610. According to some embodiments, when mobile unit 641, or any other mobile unit, is positioned in stall 605, it may grab holder 630 and pull it into a predefined area in stall 605 or into a predefined area between stalls 605 and 606 in order for mobile unit 641, and/or any other mobile unit, to be able to easily reach and withdraw teat cups 631, 632, 633 and 634 from holder 630. Once the milking is completed and teat cups 631, 632, 633 and 634 are removed from the livestock and returned to holder 630, mobile unit 641, or any other mobile unit, may push holder 630, at least partially, out from stall 605 or from between stalls 605 and 606 into milking pit 650 (or any other predefined area). It is noted that, although not shown, instead of the holders moving in and out of the ramp, they may be moved out of the way of the livestock, e.g., by elevation, depression, folding in any appropriate direction and the like. Once the milking is concluded and the holders are out of the way, the livestock may leave ramp 610, as presented, e.g., in FIG. 5C, without the movements thereof being hindered by holders 620, 630 and the like and without holders 620, 630 and the like being disturbed by movements of the livestock.

According to some embodiments, one mobile unit, e.g., mobile unit 643 attaches all of the teat cups, e.g., teat cups 621, 622, 623 and 624, to the animal confined in a stall, e.g., stall 601. According to other embodiments, a number of mobile units, e.g., mobile units 642 and 643 attached the teat cups, e.g., teat cups 621, 622, 623 and 624 to the animal confined in the stall, e.g., stall 601, wherein each one of the mobile units, e.g., mobile units 642 and 643 attaches a number of teat cups, e.g., teat cups 621, 622, 623 and 624 to the animal. According to some embodiments, mobile unit 642 attaches teat cups 621 and 622 to the animal in stall 601, and subsequently moves on towards stall 602 (where it may also attach two teat cups to the animal confined to stall 602). Once mobile unit 642 has moved out of stall 601 mobile unit 643 may enter stall 601. Mobile unit 643 may then park in stall 601 (or remain relatively stationary, e.g., reduce its speed in comparison to its speed when moving in and out of stalls) and then withdraw teat cups 623 and 624 from holder 620 and attached them to the animal confined to stall 601. Once all four teat cups 621, 622, 623 and 624 are attached to the animal, the milking may begin. Further, though not shown, four different mobile units may each attached one teat cup to the animal in stall 601 and to any other animals in any of the other stalls.

According to some embodiments, the order in which the teat cups are attached to the animal is random. According to other embodiments, the teat cups are attached to the animal in a predefined order, such that the tubes leading from the teat cups to the milk-line do not get tangled, and further, so that the attachment of one teat cup does not cause a different teat cup to detach from the animal's udder. For example, the mobile units may attach two teat cups near the hind legs of the animal and subsequently attach the next two teat cups closer to the front of the animal. For example, if the teat cups are taken from a holder on the left side of the animal, the first teat cups to be attached could be on the right hand side of the animal. For example, the teat cups may be attached in the order of the teat cups designated 621, 622, 623 and 624, as depicted. According to some embodiments, the removal of the teat cups from the animal is performed in a random order. According to some embodiments, the removal of the teat cups from the animal is performed in the same or the opposite order as the attachment of the teat cups to the animal. According to some embodiments, the removal of the teat cups from the animal may be performed according to any one of the embodiments disclosed above regarding the attachment of the teat cups, or opposite thereto, wherein the attachment and the removal orders may or may not be dependent on one another.

According to some embodiments, as presented in FIG. 6, the teat cups are arranged in a straight line array in the holder. According to some embodiments (not shown), the teat cups may be arranged in a staggered array in the holder. According to some embodiments (not shown), the teat cups may be arranged in two or more parallel lines in the holder.

According to some embodiments, the order in which the teat cups are withdrawn from the holders is random. According to other embodiments, the teat cups are withdrawn from the holders in a predefined order, inter alia, preventing the tubes attached thereto from tangling. According to some embodiments, the teat cups may be withdrawn from the holder from back to front. According to some embodiments, the teat cups may be withdrawn from the holder from front to back. According to some embodiments, the teat cups are withdrawn from the holder from left to right or from right to left. According to some embodiments, if the teat cups are arranged in two parallel lines in the holder, the left line is withdrawn first and then the right line, or vice versa. According to some embodiments, if the teat cups are arranged in two parallel lines in the holder, the teat cups in the back are withdrawn first and then the teat cups in the front, or vice versa. According to some embodiments, the teat cups are returned to the holders in a random order. According to some embodiments, the return of the teat cups to the holder is performed in the same or the opposite order as the removal of the teat cups from the holder. According to some embodiments, the return of the teat cups to the holder may be performed according to any one of the embodiment disclosed above regarding the removal of the teat cups form the holder, or opposite thereto, wherein the removal and return orders may or may not be dependent on one another.

Once the milking stage has been concluded and the teat cups are returned to the holders, a mobile unit may perform any necessary post-milking treatment, such as post-milking washing, disinfection and the like. According to some embodiments, the same mobile unit that performs at least part of the milking process, e.g., mobile unit 643, may perform the post-milking treatment. According to other embodiments, an additional mobile unit, e.g., mobile unit 644 may perform the post-milking treatment. According to some embodiments, the post-milking treatment is performed after all of the animals have been milked and all of the teat cups have been returned to the holders. According to some embodiments, the post-milking treatment is performed after at least one animal has been milked and the teat cups attached thereto have been returned to their holder. For example, once the animal confined to stall 601 has been milked and teat cups 621, 622, 623 and 624 have been returned to holder 620, mobile unit 643 may perform the post-milking treatment on that animal, regardless of whether the other animals have been fully milked or whether all of the teat cups have been removed therefrom. According to other embodiments and as presented in FIG. 6, once the animal confined to stall 601 has been milked and teat cups 621, 622, 623 and 624 have been returned to holder 620, mobile unit 643 may move along rail 615, e.g., into stall 602 and then, mobile unit 644 enters stall 601 and performs the post-milking treatment on the animal confined thereto. According to some embodiments, mobile unit 644 parks under each and every one of the livestock along the ramp, beginning on the right side in stall 601, and performing the designated part of the required treatment, e.g., post-milking treatment, regardless of whether the other animals have been fully milked or whether all of the teat cups have been removed therefrom.

According to some embodiments, the equipment necessary for the post-milking treatment, e.g. brushes and post-dip liquid, is part of ramp 615 or of each or any one of the stalls. If the equipment is part of the ramp or stall, it is positioned therein at a position convenient for the mobile unit to reach. According to some embodiments, the post-milking equipment may be included in holders 620, 630 and the like. According to other embodiments, the equipment necessary for the post-milking treatment, e.g. brushes and post-dip liquid, is part of the mobile unit performing the post-milking treatment. For example, mobile unit 644 may comprise at least one brush as well as a receptacle for post-dip liquid. According to some embodiments, a separate unit comprising a reservoir of post-dip liquid, brushes or any other equipment, may be conveyed along the rail, where it may be reached, e.g., by any one of the mobile units performing the pre-milking tasks.

Regarding the coordination between several mobile units it is noted that mobile unit 644 may enter stall 601 only after mobile unit 643 has, at least partially, exited stall 601, moving towards stall 602. This is true for all stalls and mobile units along ramp 615 in order to prevent collisions and the like between the various mobile units. Accordingly, in order for a plurality of mobile units to operate in a parallel milking parlor, it may be necessary to design ramp 610, rail 615 and/or to program the coordination between the different mobile units (641, 642, 643, 644 and the like) so as to prevent collisions since, if all of the mobile units are programmed to reach the left end of ramp 610, and since all are moving in a straight line along ramp 610, they may inevitably run into one another in the left-most stalls, unless designed otherwise.

For example, even if a plurality of mobile units is used, each mobile unit may be programmed and designed to perform all of the milking tasks, including pre- and post-milking, such that each one of the mobile units operates in a certain number of stalls, according to the order in which the mobile units enter ramp 610. For example, mobile unit 641 may treat the livestock confined to stalls 607 and 608, mobile unit 642 may treat livestock confined to stalls 605 and 606, mobile unit 643 may treat livestock confined to stalls 603 and 604 and mobile unit 644 may treat livestock confined to stalls 601 and 602. Once mobile unit 644 completes the treatment of the livestock on stalls 601 and 602, it may exit ramp 610 on the right, followed by mobile units 643, 642 and 641, in the opposite order in which they entered ramp 610.

According to other embodiments, a first mobile unit, e.g., mobile unit 641, may perform the pre-milking treatment on all of the livestock on ramp 610. After the pretreatment is performed, mobile unit 641 exits ramp 610 and then, either one or more mobile units enter ramp 610 to perform the milking tasks (attaching and then removing teat cups). If more than one mobile unit is designated to perform the milking tasks, the various mobile units may each operated in predefined stalls, e.g., mobile unit 642 may perform the milking tasks in stalls 605, 606, 607 and 608, while mobile unit 643 may perform the milking tasks in stalls 601, 602, 603 and 604. Once the milking task are completed, mobile units 643 and 642 exit ramp 610 in the opposite order in which they entered ramp 610. Once ramp 610 is free of mobile units, an additional mobile unit, e.g., mobile unit 644, may enter ramp 610 and perform the post-milking treatments in all of the stalls. In this respect it is noted, that although embodiments with only one mobile unit for performing pre- and post-milking treatments have been described, those treatments may be performed by any number of mobile units, each operating is predefined stalls, as described regarding the milking.

According to some embodiments, system 600 includes two parking areas, one on the right of ramp 610, in which the mobile units may be parked before entering ramp 610 and one on the left of ramp 610, in which the mobile units may be parked after leaving ramp 610. Accordingly, any number of tasks may be performed by any number of mobile units, each treating one or more livestock, wherein several mobile units may treat the same livestock, in turn, as detailed herein, and wherein once a specific mobile unit, which enters ramp 610 on the right, performs its designated tasks along ramp 610, it may exit ramp 610 on the left, allowing additional mobile units into the leftmost stalls on ramp 610. For example, mobile unit 641 performs pre-milking treatment in stalls 601-608, and is followed by mobile unit 642, which attaches teat cups to the livestock in stalls 601-608; however, before mobile unit 642 enters stall 608, mobile unit 641 exits ramp 610 on the left, e.g., into a second parking area (not shown), thus allowing mobile unit 642 to enter stall 608. Mobile unit 643 may then remove teat cups, after milking in all stalls 601-608, in the same manner, followed by mobile unit 644, which performs post-milking treatment in all stalls 601-608. It is noted that if two such parking areas are present, the mobile units may, in certain instances, leave the right parking area to treat the livestock and enter the left parking area after treating the livestock, while in other instances they may leave the left parking area to treat the livestock and enter the right parking area after treatment.

Figure 7A:
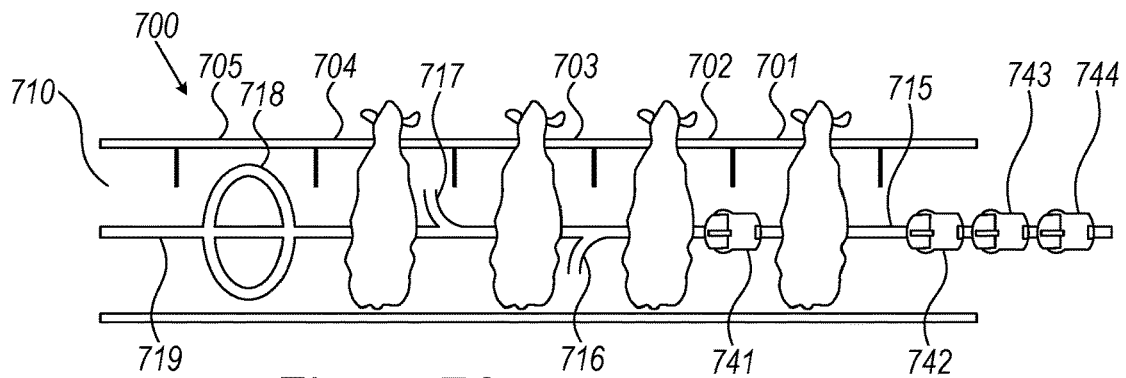
FIGS. 7A, 7B, 7C and 7D present embodiments of the system including rails comprising branches and loops.
Figure 7B:
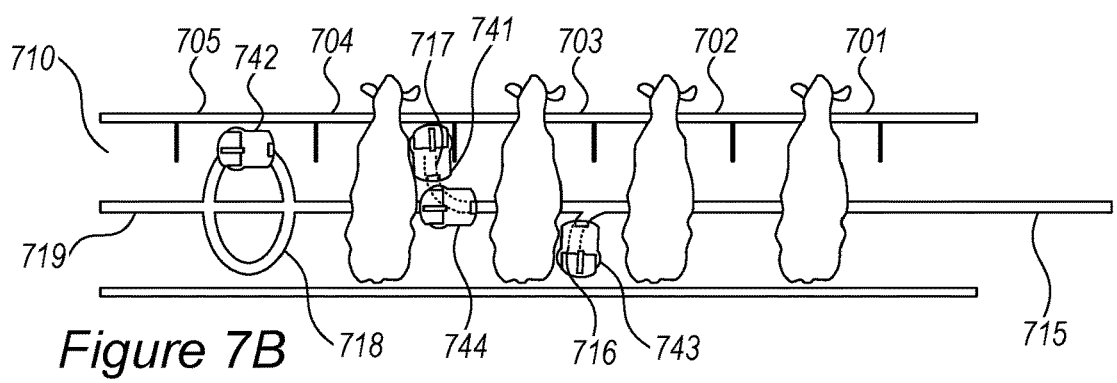

According to some embodiments, rail 615 includes any number of branches, allowing a first mobile unit to pass a second mobile unit, while the second mobile unit moves to any one of the branches. According to some embodiments, each ramp 610 may include a stall that remains vacant, such that mobile units may use the vacant stall to park, pass one another and the like. Such embodiments are shown in FIGS. 7A and 7B. Reference is now made to FIG. 7A, presenting system 700, assembled in a parallel milking parlor (only part of one of the parallel platforms/ramps is shown), wherein rail 715, along which mobile units 741, 742, 743 and 744 move, stretches across ramp 710. As shown in FIG. 7A, mobile units 741, 742, 743 and 744 may move along rail 715 in a straight line, one after the other. Rail 715, as well as ramp 710, including vacant stall 705, are designed such that when necessary, any one of the mobile units may pass any other mobile unit. Particularly, rail 715 may include any number of branches, which may extend in any appropriate direction, such as branches 716 and 717. The length and specific position of each branch may depend on the size of the mobile units, the size of the stalls, the size of the ramp, the size of the livestock and the like. It is further noted that the position of other equipment, such as teat cup holders, as detailed above regarding FIG. 6, may be taken into account when designing any branches, such as branches 716 and 717. The areas in which the animals stand and in which they are most prone to kick may also be taken into account when designing branches in rail 715.

According to some embodiments, ramp 710 includes at least one vacant stall, such as stall 705, which remains vacant throughout the treatment process. Rail 715 may be designed to include any branches or loops, such as loop 718 which extend into vacant stall 705. Although in FIG. 7A vacant stall 705 is depicted as the last stall on ramp 710, it is noted that the position of the vacant stall may be determined to be different in every milking parlor. If the vacant stall is indeed the last stall on ramp 710, rail 715 may extend further until the end of ramp 710, or beyond, e.g., as presented by rail extension 719. According to other embodiments, rail 715 ends or loops in the last vacant stall. According to other embodiments, rail 715 ends in a loop towards the end of ramp 710, in an area beyond the stalls (not shown).

Reference is now made to FIG. 7B, presenting mobile unit 744, which passed mobile units 743 and 741, which are located on branches 716 and 717, respectively. Mobile unit 744 may move further to the left hand side of ramp 710 and, if necessary, may pass mobile unit 742, positioned on loop 718, and possibly further move to rail extension 719. In this respect it is noted that the structure of loop 718 may vary, for example, it may include the inner path in the loop, as shown, or not. Using such a structure, each one of the mobile units may perform part of the treatment on the livestock and further, they may all be on ramp 710 at the same time, while the coordination between their movements includes the, possibly temporary, parking of any one of the mobile units on any one of the branches/loops in rail 715. For example, mobile unit 741 may perform the pre-milking treatment, followed by mobile unit 742, which attaches two teat cups (not shown) to the animals in all of the stalls. Once mobile unit 741 finalizes the pre-milking task in stall 704, it may move towards branch 717, allowing mobile unit 742 to pass by it into stall 704. Further, mobile unit 742 may be followed by mobile unit 743, which attaches two more teat cups to the animals in all of the stalls. In order for mobile unit 743 to also be able to enter stall 704 without colliding with mobile unit 742, mobile unit 742 may move further into stall 705 onto loop 718. Finally, mobile unit 744 may perform the post-milking treatment. In order for mobile unit 744 to be able to enter stall 704 without colliding with mobile unit 743, mobile unit 743 may move on into vacant stall 705 onto loop 718 (not shown, e.g., on the bottom part of loop 718, so as not to collide with mobile unit 742) or further onto rail extension 719 (not shown). According to other embodiments, mobile unit 743 may move back along rail 715 and enter branch 716 before mobile unit crosses rail 715 at the branching point of branch 716. Then mobile unit 744 is free to move on into any one of the stalls along ramp 710. When exiting ramp 710 and returning to the parking area to the right of ramp 710 (not shown), the mobile units may move in any appropriate order, e.g., in the opposite order in which they entered the ramp, such that mobile unit 744 returns to the parking area first, followed by mobile units 743, 742 and 741 in successive order. According to other embodiments, the mobile units may return according to their position on ramp 710, such that the rightmost mobile unit returns first. For example, according to FIG. 7B, the mobile units may return to the parking area on the right of ramp 710 (not shown) in the following order: mobile unit 743 (from branch 716), mobile unit 741 from branch 717, mobile unit 744 from stall 704 and finally, mobile unit 742 from loop 718. Any other order is also possible, as long as none of the mobile units collide with any other mobile unit. According to some embodiments, the coordination between the various mobile units, including their positions on the branches and loops along the rail and their sequence of movements along the rail and in and out of the parking area, may be optimized such that the overall treatment time is minimized.

Figure 7C:
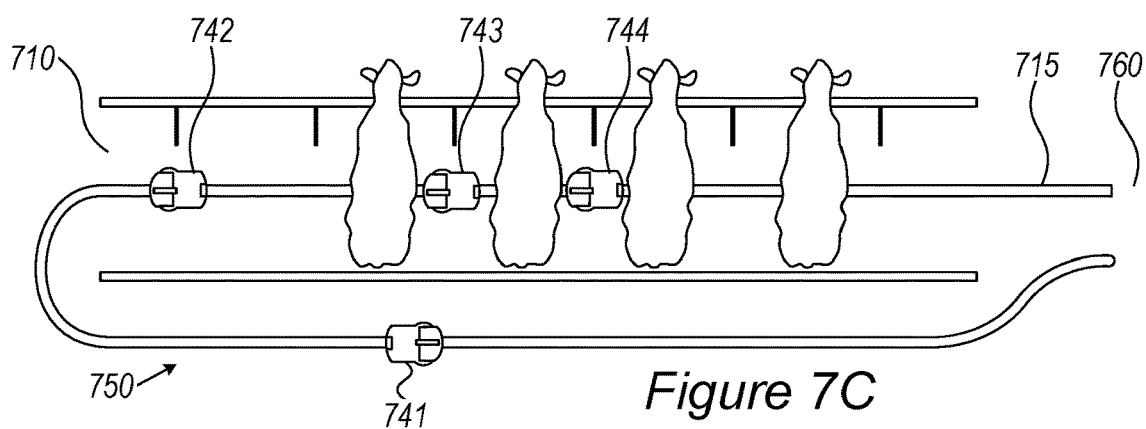
Figure 7D:
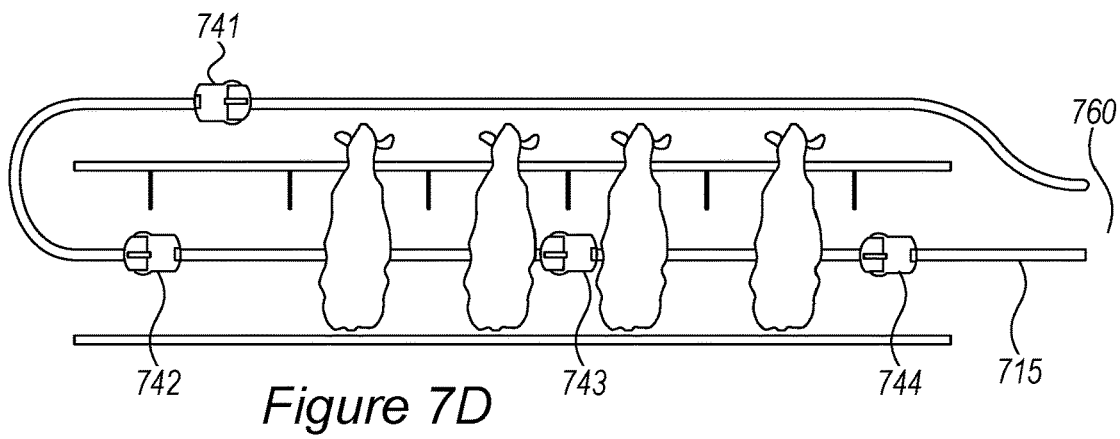

According to some embodiments, rail 715 loops out of ramp 710. In this respect, reference is made to FIGS. 7C and 7D. In FIG. 7C, for example rail 715 loops out of ramp 710, into (or over) milking pit 750, and back into parking area 760. Thus each one of the mobile units may perform any part of the treatment and none of them interfere with the others, since they loop out of ramp 710 into/over milking pit 750, in the same successive order that they enter ramp 710. It is noted that in order for human operators to be able to enter milking pit 750 it may be essential to design rail 715 such that the human operators are not in danger from the mobile units. According to some embodiments, rail 715 loops out of ramp 710 and is elevated in height and possibly placed on a plank, such that it passes over milking pit 750 in such a way that human operators are not endangered by the mobile units. According to further embodiments, rail 715 loops into milking pit 750 adjacent to ramp 710, possible fitted to a plank adjacent to ramp 710, such that the space occupied by the rail and the mobile units operating thereon is minimal. According to some embodiments, the space occupied by the rail and the mobile units may be separated from the surrounding milking pit areas by any appropriate means such as a barrier, bar and the like. According to some embodiments, the barrier may be moveable, by any appropriate means, such that it blocks part of the milking pit only when mobile units are found therein or may be found therein, or may be mobile therein. In FIG. 7D for example, rail 715 loops out of ramp 710 in the area where the animals usually leave the stalls. In order for the animals and the mobile units to be separate, it is possible for the rail to travel at a height above the tallest animal, possibly attached to or on a plank. It is further possible for the rail to travel in a path that is ordinarily not occupied by the livestock. It is also possible to have any type of bar, border, trench, fence or the like, surrounding the area the rail passes through, not allowing the livestock to enter the rail area.

Reference is now made to FIG. 8, presenting an embodiment in which each of mobile units 1441, 1442, 1443 and 1444 includes a control unit 1451, 1452, 1453 and 1454, respectively, such that any one of mobile units 1441, 1442, 1443 and 1444 may communicate/coordinate with any of the other mobile units, as well as with any other communicating entities in the milking parlor (not shown). FIG. 9 presents an embodiment in which mobile units 1541, 1542, 1543 and 1544 all communicate with central management unit 1550, and possibly with other communicating entities in the milking parlor (not shown). Further, FIG. 10 presents an embodiment in which each of mobile units 1641, 1642, 1643 and 1644 includes a control unit 1651, 1652, 1653 and 1654, respectively, such that any one of mobile units 1641, 1642, 1643, and 1644 may communicate/coordinate with any of the other mobile units, as well as with central management unit 1650 and possibly with other communicating entities in the milking parlor (not shown). It is noted that the arrows in FIGS. 8, 9 and 10 present communication between the two entities the arrows connect. It is further noted that the communication may be wired, or wireless, as detailed herein, and that it may be one-way or two way communication, as required.

As detailed above, the communication between the mobile units, directly or indirectly, via, e.g., control units 1451, 1452, 1453, 1454, 1651, 1652, 1653 or 1654, central management unit 1550 or 1650, or any other communicating entities in the milking parlor (not shown), may optimize the treatment of the livestock, enabling the various mobile units to perform different parts of the same task, to treat different animals, to take over tasks from one another when required, e.g., when one mobile unit malfunctions, to change roles before, during or after the treatment, to refrain from colliding and the like.

Reference is now made to FIG. 11, presenting an embodiment of the vertical upright teat cup holders. As shown in FIG. 11, the vertical upright teat cup holder 1100 holds teat cups 1101, 1102, 1103 and 1104 vertically upright, wherein the holes into which the teat enters (not shown) face upwards. In order to maintain vacuum in the system, without having a valve on each one of tubes 1111, 1112 and 1114, which lead milk from teat cups 1101, 1102 and 1104, respectively, (or on the tube leading from teat cup 1103, which is not shown) to the main milk line (not shown), and further in order to prevent contaminations from entering the system, teat cups 1101 and 1102 are covered by flap 1110 and teat cups 1103 and 1104 are covered by flap 1120. It is noted that, although not shown in FIG. 11, another tube leads from teat cup 1103 to the main milkline. According to some embodiments, flaps 1110 and 1120 mechanically lay on top of teat cups 1101, 1102, 1103 and 1104, and are held approximately in their position, e.g., about 90° to the back of vertical teat cup holder 1100, even after the teat cups are withdrawn from the holder, such that teat cups 1101, 1102, 1103 and 1104 are easily inserted back into vertical upright holder 1100 when the milking is concluded and are then covered by flaps 1110 and 1120.

Figure 14:
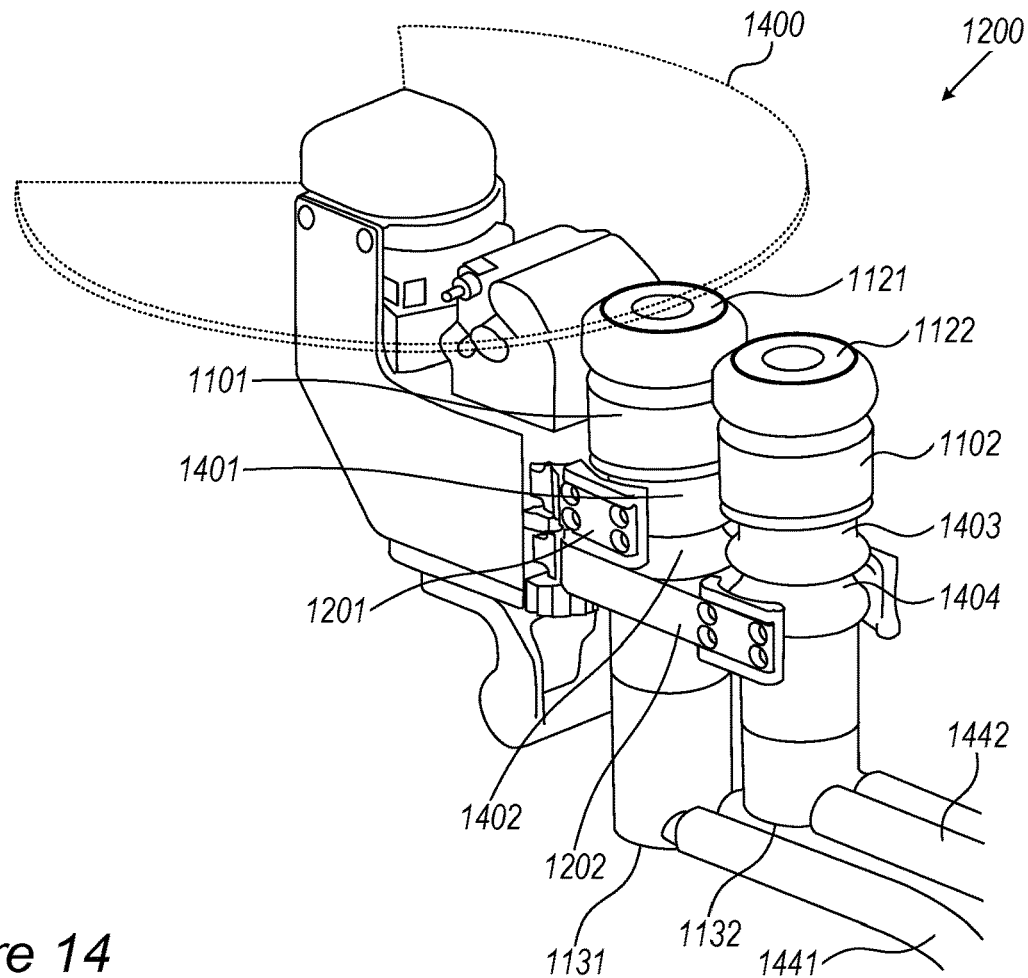
FIG. 14 presents an embodiment of the double gripper, after having gripped two teat cups.

As shown in FIG. 11, an angle of about 90° may be formed at the attachment point between each one of tubes 1111, 1112, 1114 and the tube attached to teat cup 1103 (not shown) and the teat cup to which it is attached (a similar approximately 90° angle is presented in FIG. 14, between teat cup 1101 and tube 1441 as well as between teat cup 1102 and tube 1442). This may enable the teat cups to be withdrawn from vertical upright teat cup holder 1100 and to be returned thereto while minimizing entanglement between the various tubes, even though vertical upright teat cup holder 1100 may be positioned towards the back of the animal being milked, not necessarily under or above the animal.

As further shown in FIG. 11, there is a difference in length between teat cups 1101 and 1103 and teat cups 1102 and 1104, wherein teat cups 1101 and 1103 are longer than teat cups 1102 and 1104. In order for the top end of teat cups 1101, 1102, 1103 and 1104 to be at the same height, teat cups 1102 and 1104 (the shorter teat cups) sit on step 1130, wherein the height of step 1130 is about the same as the difference in length between short teat cups 1102 and 1104 and long teat cups 1101 and 1103.

As further shown in FIG. 11, vertical teat cup holder 1100 comprises a multiple number of rollers 1140, some of which are not shown in the figure. Rollers 1140 allow teat cups 1101, 1102, 1103 and 1104 to easily move in and out of vertical teat cup holder 1100 by reducing the friction during movement of teat cups 1101, 1102, 1103 and 1104 as well as of tubes 1111, 1112, 1114, and the tube connected to teat cup 1103, which is not shown. Accordingly, since friction is reduced, the force necessary for withdrawing the teat cups from the holder and returning them thereto is reduced. It is further noted that rollers 1140 may also aid in moving teat cups 1101, 1102, 1103 and 1104 and tubes 1111, 1112, 1114 and the tube connected to teat cup 1103, along certain paths or trajectories. In addition, rollers 1140 may aid in holding teat cups 1101, 1102, 1103 and 1104 in place in their positions in vertical upright teat cup holder 1100. It is noted that rollers 1140 may be replaced by any appropriate element, such as wheels, ball bearings and the like, that may reduce the friction as detailed herein and possibly aid in holding the teat cups in place.

Figure 12:
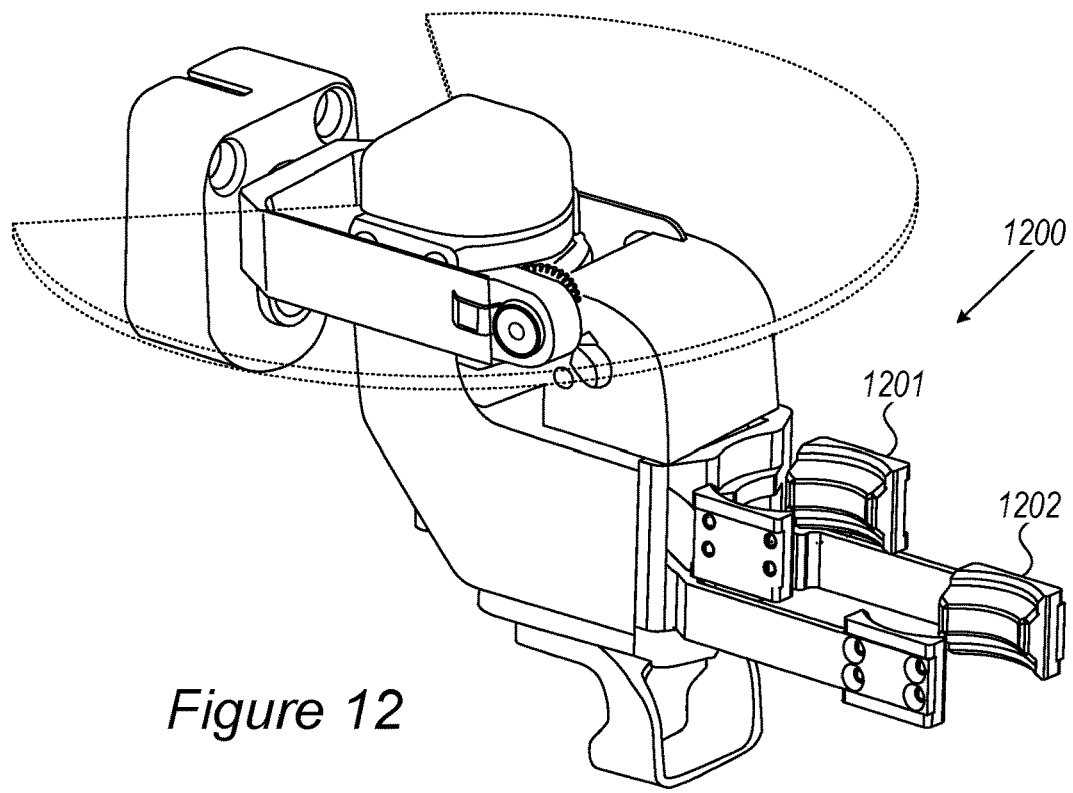
FIG. 12 presents an embodiment of the double gripper.

Reference is now made to FIG. 12, presenting an embodiment of the lengthwise double gripper. As shown in FIG. 12, lengthwise double gripper 1200 includes two gripping units 1201 and 1202, wherein each of gripping units 1201 and 1202 may grip any appropriate object, such as a teat cup, an autonomous pre-milking brush, a post-milking disinfection tool and the like. According to some embodiments, any one of gripping units 1201 and 1202 may grip an object, operate an object, such as press a button, move a lever, rotate a dial and the like, wherein the action of each of the gripping units may independent of the other gripping unit. Thus, according to some embodiments, while gripping unit 1201 performs one type of action, e.g., gripping, gripping unit 1202 may perform the same or a different type of action, e.g., pressing a button.

As shown in FIG. 12, gripping unit 1202 may be longer than gripping unit 1201 in order for the two gripping units to be able to grip two objects at the same time, without those two objects getting in the way of one another.

Figure 13:
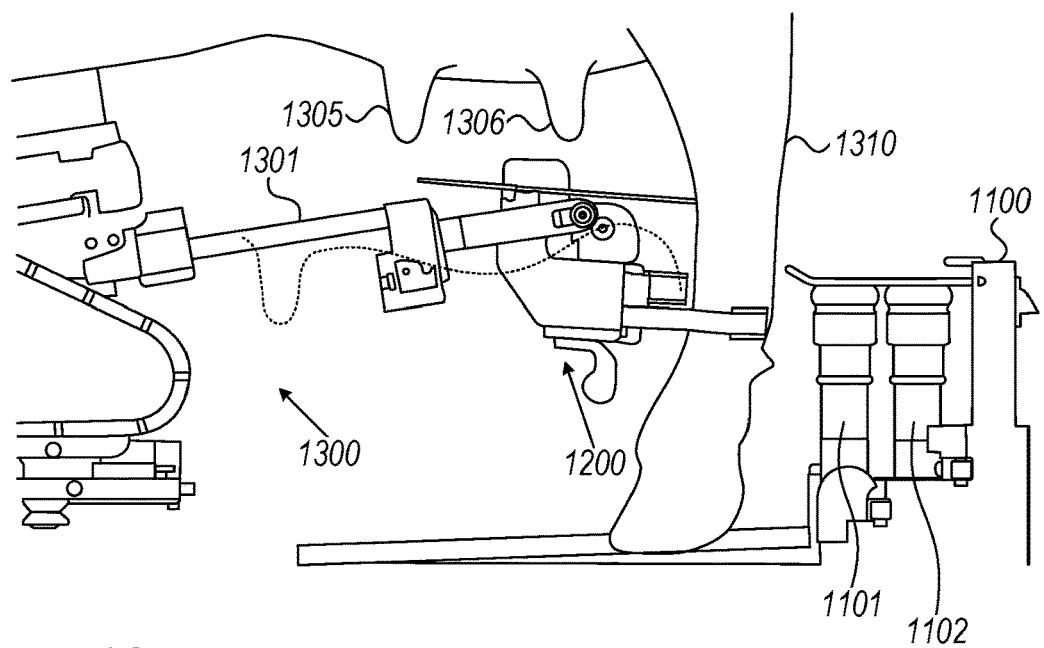
FIG. 13 presents an embodiment where the mobile unit, positioned under the abdomen of the animal, reaches with a double gripper towards the vertical upright teat cup holder, which is behind the hind legs of the animal.

For example, as shown in FIG. 13, mobile unit 1300, comprising arm 1301 that is equipped with lengthwise double gripper 1200, may be positioned under an animal's abdomen, wherein arm 1301 extends between animal's hind legs 1310 towards vertical upright holder 1100 in order to grip teat cups 1101 and 1102, which is positioned behind teat cup 1101, in order to withdraw teat cups 1101 and 1102 from holder 1100 and attach them to teats 1305 and 1306. It is noted that, when attaching the teat cups to the teats, teat cup 1102 will be attached to teat 1306 and only then will teat cup 1101 be attached to teat 1305, such that when arm 1301 moves to attached the second teat cup or retracts towards mobile unit 1300, none of the teat cups will be hindered by the movement of arm 1301.

As shown in FIG. 14, once lengthwise double gripper 1200 reaches vertical upright holder 1100 (not shown), gripping unit 1202 grips teat cup 1102, while gripping unit 1201 grips teat cup 1101. In order to properly maneuver and grip the teat cups (or perform any other required action), lengthwise double gripper 1200 and/or arm 1301 and/or mobile unit 1300 may be equipped with a detection element (not shown), e.g., a laser, an IR sensor or the like. The detection element may have field of detection 1400, through which data is received and may be transmitted, by any appropriate means, to a control system that provides motion instructions to mobile unit 1300 and/or arm 1301, according to the received data. According to some embodiments, tops 1121 and 1122 of teat cups 1101 and 1102, respectively, are designed to be essentially the same height even though bottoms 1131 and 1132 of teat cups 1101 and 1102, respectively are staggered. Accordingly, since tops 1121 and 1122 are at the same height, field of detection 1400 is not hindered by any of the teat cups and therefore, the detection element has "full view" of the area around it.

As shown in FIG. 14, bottoms 1131 and 1132 are staggered, since teat cup 1102 is shorter than teat cup 1101. This enables the two teat cups to be in line, one in back of the other, without tubes 1441 and 1442 hindering one another, so that lengthwise double gripper 1200 may grip both teat cups 1101 and 1102 simultaneously and maneuver them as necessary.

As further shown in FIG. 14, teat cup 1101 comprises two grooves 1401 and 1402 and teat cup 1102 comprises two grooves 1403 and 1404, wherein grooves 1401, 1402, 1403 and 1404 enable lengthwise double gripper 1200 to securely grip the two teat cups, i.e., teat cups 1101 and 1102.

Figure 15:
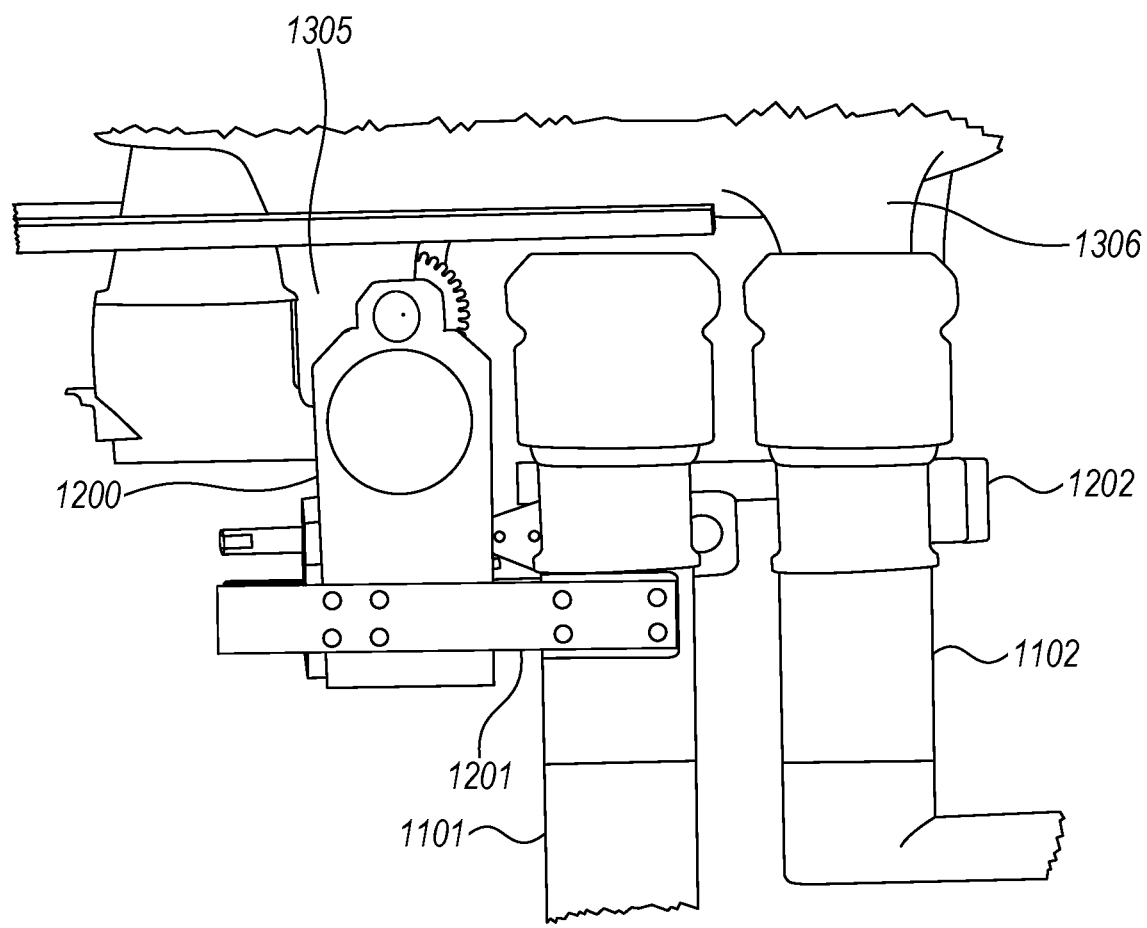
FIG. 15 presents an embodiment where the double gripper, gripping two teat cups, attaches the first of the two teat cups to the teat of the animal.

Once teat cups 1101 and 1102 are gripped by lengthwise double gripper 1200, as shown in FIG. 14, they are withdrawn from vertical upright holder 1100 (see FIG. 13) and are maneuvered into the proximity of teats 1305 and 1306 by arm 1301. As shown in FIG. 15, lengthwise double gripper 1200 grips teat cup 1101 with gripping unit 1201 and teat cup 1102 with gripping unit 1202. When attaching the teat cups to the animal, the back teat cup is attached to the back teat before the front teat cup is attached to the front teat, wherein the back and front directions are the same as the back and front directions of the animal. Thus, as shown in FIG. 15, first, teat cup 1102 is attached to teat 1306 and is then released from gripper 1202 (it is noted that gripping unit 1202 is not fully shown in FIG. 15 in order to provide a better view of teat cup 1102 and to emphasize that once teat cup 1102 is attached to teat 1306 it is released by gripping unit 1202). After teat cup 1102 is attached to teat 1306, arm 1301 (as shown in FIG. 13) maneuvers teat cup 1101 towards teat 1305, to which it is attached (not shown). Once teat cup 1101 is attached to teat 1305, gripping unit 1201 releases teat cup 1101 and arm 1301 retreats towards mobile unit 1300 and/or is maneuvered to withdraw teat cups 1103 and 1104 (as shown in FIG. 11) from vertical upright teat cup holder 1100, in order to attach teat cups 1103 and 1104 to the two remaining teats (now shown).

Figure 16:
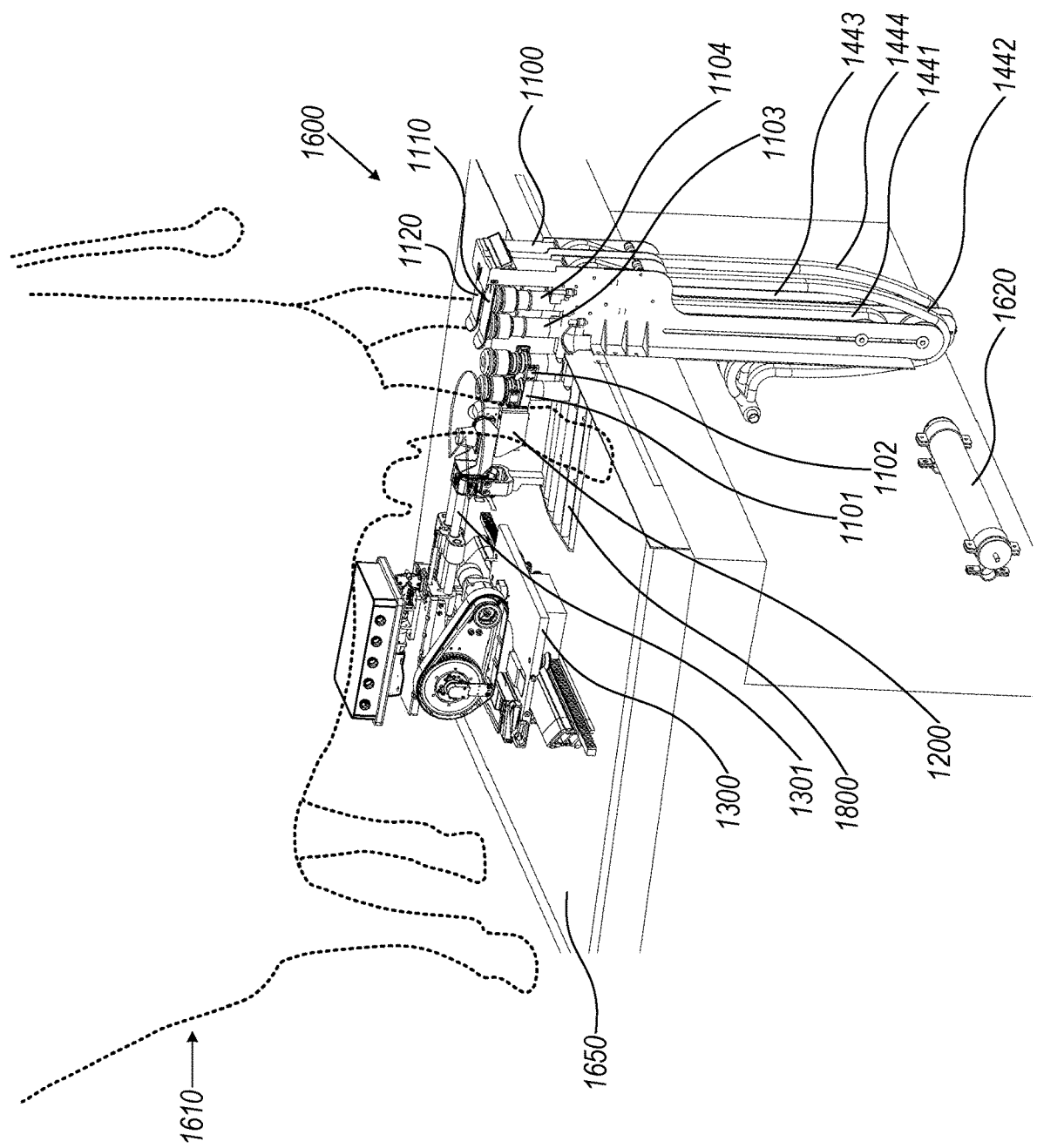
FIG. 16 presents an embodiment of the system include a vertical upright teat cup holder comprising tubes, flaps, axels and a piston.

Reference is now made to FIG. 16, presenting an embodiment of the system including a vertical upright teat cup holder comprising tubes, flaps, axels and a piston. As shown in FIG. 16, system 1600 includes vertical upright teat cup holder 1100 for holding teat cups 1101, 1102, 1103 and 1104. Mobile unit 1300, positioned under the abdomen of cow 1610 extends arm 1301, comprising lengthwise double gripper 1200, and utilizes lengthwise double gripper 1200 to grip teat cups 1101 and 1102, removing them from under flap 1110 and from vertical upright holder 1100, leaving teat cups 1103 and 1104 under flap 1120 and in vertical upright holder 1100, to be withdrawn therefrom at a later stage.

Each one of teat cups 1101, 1102, 1103 and 1104 is attached to tube 1441, 1442, 1443 and 1444, respectively, wherein milk entering teat cups 1101, 1102, 1103 and 1104 flows through tubes 1441, 1442, 1443 and 1444 into the main milk line (not shown). As known in the art, vacuum is provided through tubes 1441, 1442, 1443 and 1444 in order to milk cow 1610. Once the milking is concluded, teat cups 1101, 1102, 1103 and 1104 are released from the teats and returned to vertical upright holder 1100 by any appropriate means. According to some embodiments, teat cups 1101, 1102, 1103 and 1104 are released from the teats by release of the vacuum in tubes 1441, 1442, 1443 and 1444. According to some embodiments, once teat cups 1101, 1102, 1103 and 1104 are released from the teats, they are returned to vertical upright teat cup holder 1100 by a pulling force that pulls them backwards towards vertical teat cup holder 1100. According to some embodiments, all teat cups are pulled together, the teat cups are pulled back in pairs, one by one, or any other appropriate combination. According to some embodiments, piston 1620 provides a puling force for pulling teat cups 1101, 1102, 1103 and 1104 back into vertical upright holder 1100. According to some embodiments, at least one motor (not shown) provides such force. According to some embodiments, teat cups 1101, 1102, 1103 and 1104 are pulled back into vertical upright holder 1100 in pairs by two pistons, one of which is not shown, two motors, or the like. According to some embodiments, when teat cups 1101, 1102, 1103 and 1104 are returned to vertical upright holder 1100 in pairs, first the back teat cups, i.e., teat cups 1102 and 1104 are returned and then the front teat cups, i.e., teat cups 1101 and 1103 are returned.

Figure 17A:
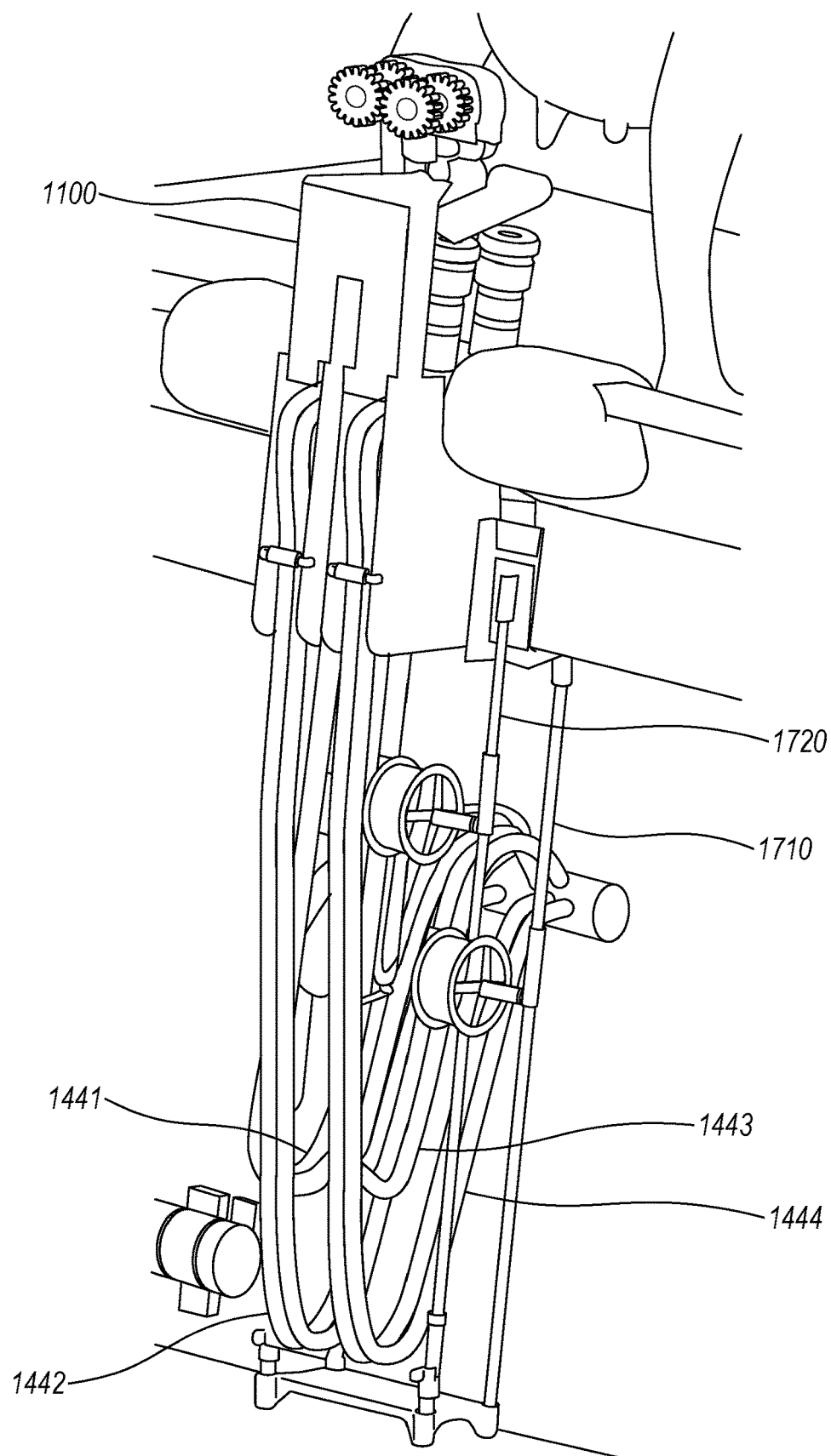
FIG. 17A presents a back-side view of an embodiment of the vertical upright teat cup holder, showing the tubes leading to the main milk line and the axels attached to each two sets of tubes.

Reference is now made to FIG. 17A, presenting the back side view of an embodiment of vertical upright holder 1100, showing tubes 1441, 1442, 1443 and 1444, leading from the teat cups to the main milk line (not shown), wherein each pair of tubes is attached a set of axels and wheels. Particularly, as shown in FIG. 17A, tubes 1441 and 1443, which are attached to teat cups 1101 and 1103, respectively, are attached to axel and wheel set 1720, while tubes 1142 and 1144, which are attached to teat cups 1102 and 1104, respectively, are attached to axel and wheel set 1710. Thus, axel and wheel set 1710 aids in returning the back teat cups, i.e., teat cups 1102 and 1104, into vertical upright holder 1100. Once the back teat cups 1102 and 1104 are returned to vertical upright holder 1100, axel and wheel set 1720 aids in returning the front teat cups, i.e., teat cups 1101 and 1103, into vertical upright holder 1100. As mentioned above, any appropriate means, such as a motor, a piston and the like, such as piston 1620 in FIG. 16, may be included in the system in order to move axel and wheel sets 1710 and 1720, as necessary, wherein each axel and wheel set may be coupled to a separate motor, piston or the like. Particularly, according to this embodiment, tubes 1441, 1442, 1443 and 1444 are pulled on backwards and/or downwards, i.e., in a direction that causes teat cups 1101, 1102, 1103 and 1104 to move away from the animal and back into vertical upright holder 1100. Thus, pulling on tubes 1441, 1442, 1443 and 1444 essentially returns teat cups 1101, 1102, 1103 and 1104 into vertical upright holder 1100. It is noted that although this particular embodiment is shown, any number of wheels/axels/pistons/motors may be attached to any number of tubes/teat cups.

Figure 17B:
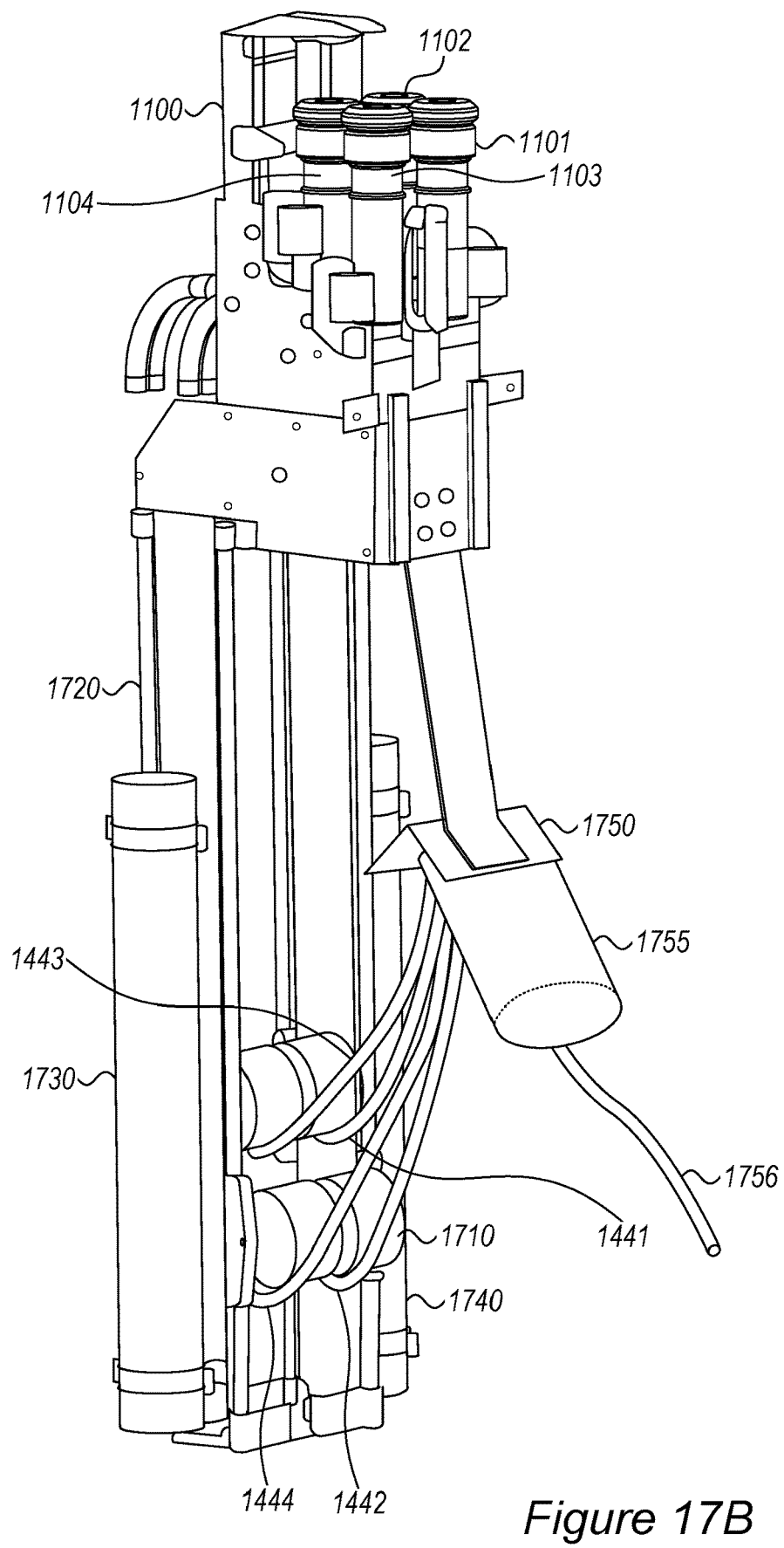
FIG. 17B presents a front-side view of an embodiment of the vertical upright teat cup holder, showing a manifold for gathering the milk from the four tubes, as well as wheels, axels and pistons, intended to aid in returning the teat cups into the vertical upright teat cup holder.

Reference is now made to FIG. 17B, presenting a frontside view of another embodiment of vertical upright holder 1100, showing manifold 1750 for gathering the milk from the four tubes 1441, 1442, 1443 and 1444 into vessel 1755, from which a single tube, 1756 leads the milk flowing through the tube to the main milk line (not shown) possibly via any further equipment, such as a milk monitor (not shown). Although not directly shown in FIG. 17B, each one of tubes 1441, 1442, 1443 and 1444 may be attached to each one of teat cups 1101, 1102, 1103 and 1104, possibly via any additional tubes, valves, connecting elements and the like, as shown, e.g., in FIGS. 14, 16 and 17A.

As further presented in FIG. 17B, the system of the invention may include two vertical pistons 1730 and 1740, one of which may operate wheel and axel set 1710, while the other may operate wheel and axel set 1720. When operated, e.g., moved vertically by any one of pistons 1730 and 1740, wheel and axel set 1710 may pull on tubes 1442 and 1444, pulling in turn on teat cups 1102 and 1104, thereby returning teat cups 1102 and 1104 into vertical upright teat cup holder 1100. Similarly, when operated, wheel and axel set 1720 may pull on tubes 1441 and 1443, pulling in turn on teat cups 1101 and 1103, thereby returning teat cups 1101 and 1103 into vertical upright teat cup holder 1100.

As detailed herein, pistons 1730 and/or 1740 may be replaced by any suitable motor. Further, as detailed herein, the invention is not bound to comprising two pistons/motors. Any appropriate number may be used in order to operate any appropriate number of wheel and axel sets, wherein the operation of the wheel and axel sets consists essentially of pulling on the tubes leading from teat cups 1101, 1102, 1103 and 1104, such that teat cups 1101, 1102, 1103 and 1104 are pulled back from the animal and returned into vertical upright holder 1100.

Figure 17C:
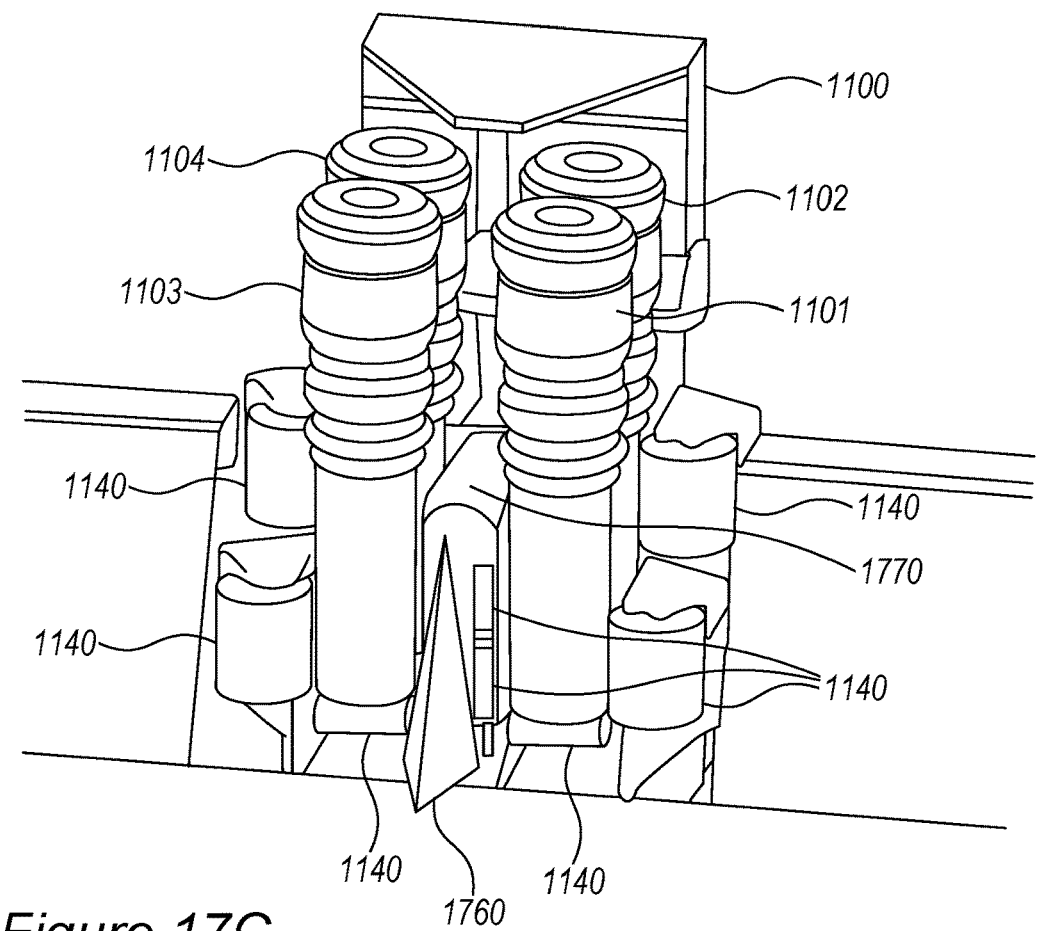
FIG. 17C presents a front-side view of an embodiment of the vertical upright teat cup holder, including an integrated teat cup and tube separator.

Reference is now made to FIG. 17C, presenting a frontside view of an embodiment of the vertical upright teat cup holder 1100, including integrated teat cup and tube separators 1760 and 1770. Integrated teat cup and tube separators 1760 and 1770 are positioned and shaped such that when teat cups 1101, 1102, 1103 and 1104 are returned to vertical upright teat cup holder 1100, the entanglement between the tubes (not shown) leading from each one if teat cups 1101, 1102, 1103 and 1104, is minimized.

It is noted that vertical upright teat cup holder 1100 may include any number of integrated teat cup and tube separators. In the particular embodiment shown, integrated teat cup and tube separator 1770 is positioned inside vertical upright teat cup holder 1100 between teat cups 1101/1102 and teat cups 1103/1104. Thus, integrated teat cup and tube separator 1770 ensured that each one of teat cups 1101, 1102, 1103 and 1104 is returned to its proper position inside vertical upright teat cup holder 1100. Integrated teat cup and tube separator 1770 may be further designed such that the teat cups adjacent thereto are held upright, minimizing their "wobbling" or "rocking" motion within vertical upright teat cup holder 1100.

As shown in FIG. 17C, vertical upright teat cup holder 1100 may include integrated teat cup and tube separator 1760, which protrudes out of vertical upright teat cup holder 1100 and into the stall/ramp (not shown). Integrated teat cup and tube separator 1760 may be designed such that entanglement of the tubes (not shown) is minimized. Integrated teat cup and tube separator 1760 may be specifically designed to fit the type (size, shape etc.) of tubes used and the type of teat cups used (size, shape, etc.).

Figure 17D:
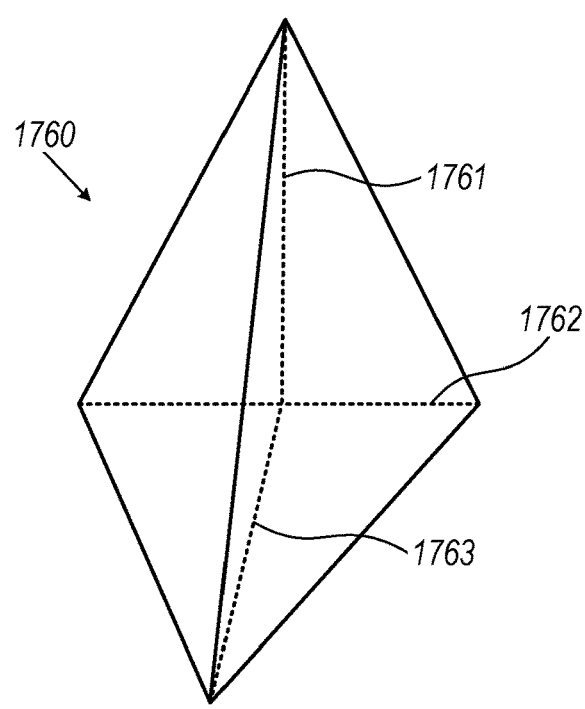
FIG. 17D presents an embodiment of an integrated teat cup and tube separator.

As shown in FIGS. 17C and 17D, according to some embodiments, integrated teat cup and tube separator 1760 is designed approximately as a right angle triangular pyramid, wherein the approximately 90° angle thereof may be adjacent to a bottom end of integrated teat cup and tube separator 1770. When referring to the bottom end of integrated teat cup and tube separator 1770 it is noted that any appropriate region near the bottom of integrated teat cup and tube separator 1770 is also included. According to some embodiments, base length 1763 of the triangular pyramid integrated teat cup and tube separator 1760 may have a length of between about 40-120 mm (wherein base length 1763 is defined as the length of the cross section of the pyramid). According to some embodiments, height 1761 of the triangular pyramid integrated teat cup and tube separator 1760 may be between about 60-150 mm (wherein height 1761 is defined as the highest line in the cross section, e.g., where separator 1760 is adjacent to separator 1770). According to some embodiments, base width 1762 of the triangular pyramid integrated teat cup and tube separator 1760 may be between about 5-20 mm (wherein base width 1762 is the side of the triangular pyramid integrated teat cup and tube separator 1760 that may be adjacent to separator 1770 and that may be at the about 90° angle of the pyramid).

It is noted that although a triangular shape is detailed herein, any other appropriate shape may be used for the integrated teat cup and tube separator 1760, e.g., an approximate triangular or triangular pyramid shape, wherein any one of the sides may be at least slightly curved or wherein any of the vertices may be trimmed, such that an additional, possibly small, side/edge is formed. It is further noted that although two separate integrated teat cup and tube separators 1760 and 1770 are described, one integrated teat cup and tube separator may be included in the system, wherein the single separator may have the approximate shape of the combination of the two integrated teat cup and tube separators 1760 and 1770.

As further shown in FIG. 17C and as detailed regarding FIG. 11, vertical upright teat cup holder 1100 may include any number of rollers 1140, some of which are not shown in the figure. Rollers 1140 allow teat cups 1101, 1102, 1103 and 1104 to easily move in and out of vertical teat cup holder 1100 by reducing the friction during movement of teat cups 1101, 1102, 1103 and 1104 as well as of tubes 1111, 1112, 1114, and the tube connected to teat cup 1103, which is not shown. Accordingly, since friction is reduced, the force necessary for withdrawing the teat cups from the holder and returning them thereto is reduced. It is further noted that rollers 1140 may also aid in moving teat cups 1101, 1102, 1103 and 1104 and tubes 1111, 1112, 1114 and the tube connected to teat cup 1103, along certain paths or trajectories. In addition, rollers 1140 may aid in holding teat cups 1101, 1102, 1103 and 1104 in place in their positions in vertical upright teat cup holder 1100. It is noted that rollers 1140 may be replaced by any appropriate element, such as wheels, ball bearings and the like, that may reduce the friction as detailed herein and possibly aid in holding the teat cups in place.

Figure 18:
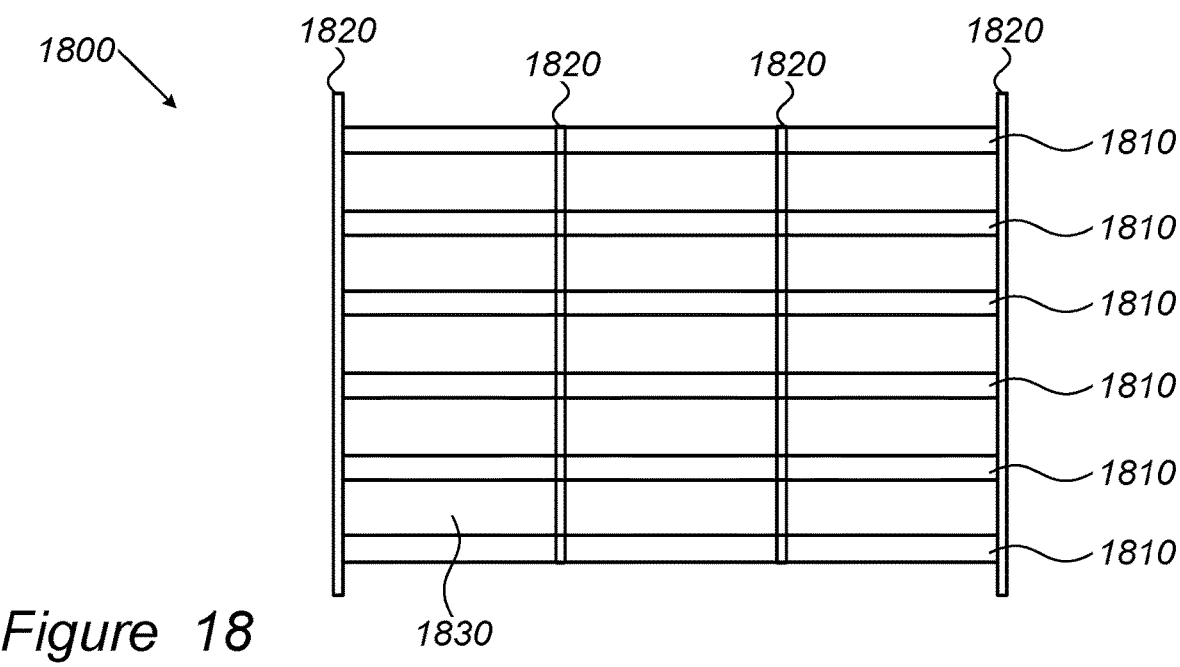
FIG. 18 presents an embodiment of the non-planar leg separator.

Reference is now made to FIG. 18, presenting an embodiment of non-planar leg separator 1800. As shown in FIG. 16, non-planar leg separator 1800 is positioned on the floor of ramp 1650, between the hind legs of cow 1610, and essentially causes cow 1610 to separate its hind legs, since non-planar leg separator 1800 is uncomfortable for cow 1610 to stand on. As shown in FIG. 18, non-planar leg separator 1800 includes rods 1810 and cross rods 1820. Although six rods 1819 and four cross rods 1820 are shown in FIG. 18, it is noted that any appropriate number of rods and cross rods may be used. Further, although all rods and cross rods shown in FIG. 18 are of the same length and diameter, it is noted they may differ from and further, they may be of any appropriate shape, not necessarily rounded rods. The size of the spaces between the rods/cross rods, e.g., space 1830 may also be changed as appropriate. The degree of the arch, as well as the number of arches and their shape may be determined as necessary.

Figure 19A:
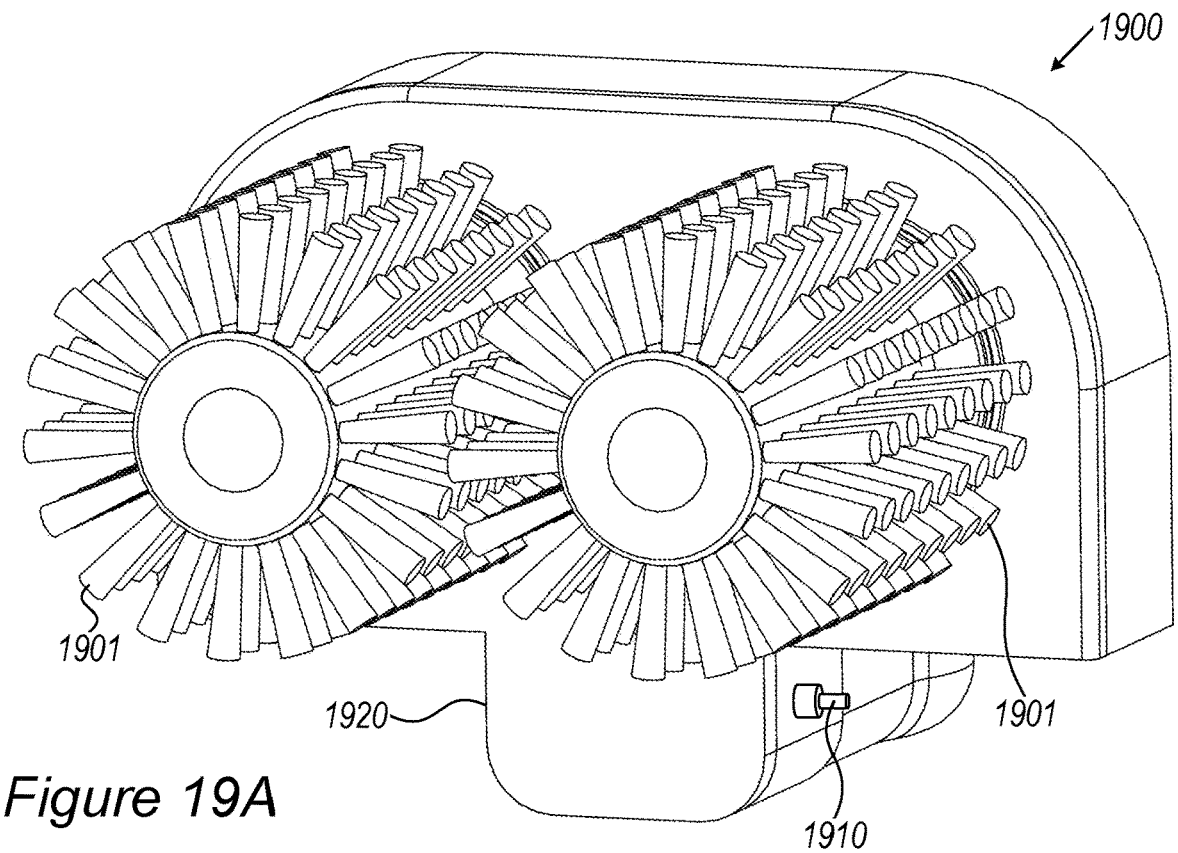
FIGS. 19A and 19B present embodiments of the autonomous pre-milking brush, differing from one another in the shape of their handle.
Figure 19B:
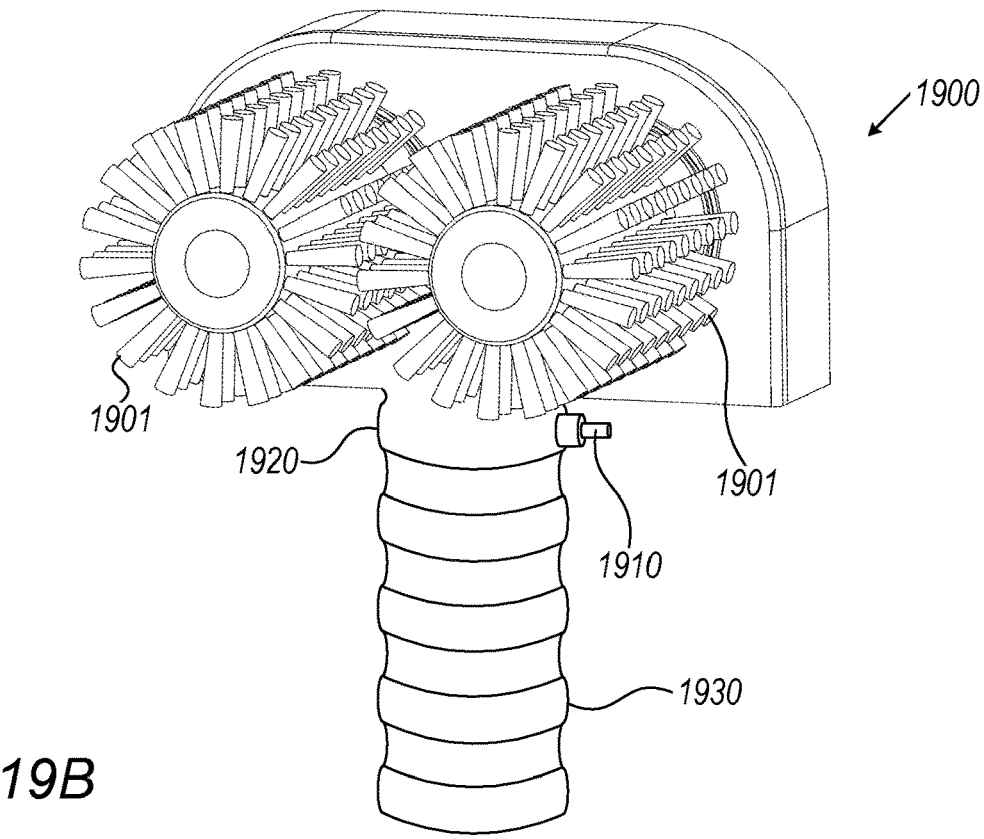

Reference is now made to FIGS. 19A and 19B, presenting embodiments of autonomous pre-milking brush 1900. According to the embodiment shown in FIGS. 19A and 19B, autonomous pre-milking brush 1900 includes two rotating brushes 1901 and 1902, which, upon rotation, may both sanitize and stimulate the teat, which is positioned between rotating brushes 1901 and 1902. As detailed above, rotating brushes 1901 and 1902 may be sprayed, e.g., by an element of the upright teat cup holder, with a disinfectant/water before contact with the teat, possibly a quick acting disinfectant, such that rotating brushes 1901 and 1902 themselves are both sanitized and wet and accordingly sanitize and stimulate the teats with their rotational movement and do not harm the teats since they are wet. According to other embodiments, rotating brushes 1901 and 1902 may be sprayed with disinfectant/water while contacting the teats.

According to some embodiments, the rotation of rotating brushes 1901 and 1902 is activated by switch 1910. According to some embodiments, lengthwise double gripper 1200, as shown e.g., in FIG. 12, grips autonomous pre-milking brush 1900 from its docking station, e.g., on vertical upright holder 1100, and maneuvers it, when necessary, to the animals' teats. According to some embodiments, one of gripping units 1201 or 1202 is utilized to grip and autonomous pre-milking brush 1900, while the second one of gripping units 1201 or 1202 is utilized to press switch 1910, thereby activating rotating brushes 1901 and 1902. Although not shown, any one of gripping units 1201 and 1202 may be utilized to cause disinfectant to be sprayed onto rotating brushes 1901 and 1902, e.g., by pressing a switch on vertical upright holder 1100 or the like. Further, although not shown, autonomous pre-milking brush 1900 includes a battery, e.g., a rechargeable battery, which is recharged when the autonomous pre-milking brush 1900 is placed in its docking station. According to some embodiments, the docking station is water proof.

According to the embodiment presented in FIG. 19A, autonomous pre-milking brush 1900 includes handle 1920, which is designed to be held or gripped by any appropriate means, including any one or both of gripping units 1201 and 1202. According to the embodiment presented in FIG. 19B, autonomous pre-milking brush 1900 includes handle 1930, which is designed to be held or gripped by any appropriate means, such as manually, by a human operator's hand. It is noted that the handle of autonomous pre-milking brush 1900 may be designed such that it may be gripped and used well by any number of means, including mechanical means, such as gripping units 1201 and 1202, as well as manual means, such as a human operator hands.

Figure 19C:
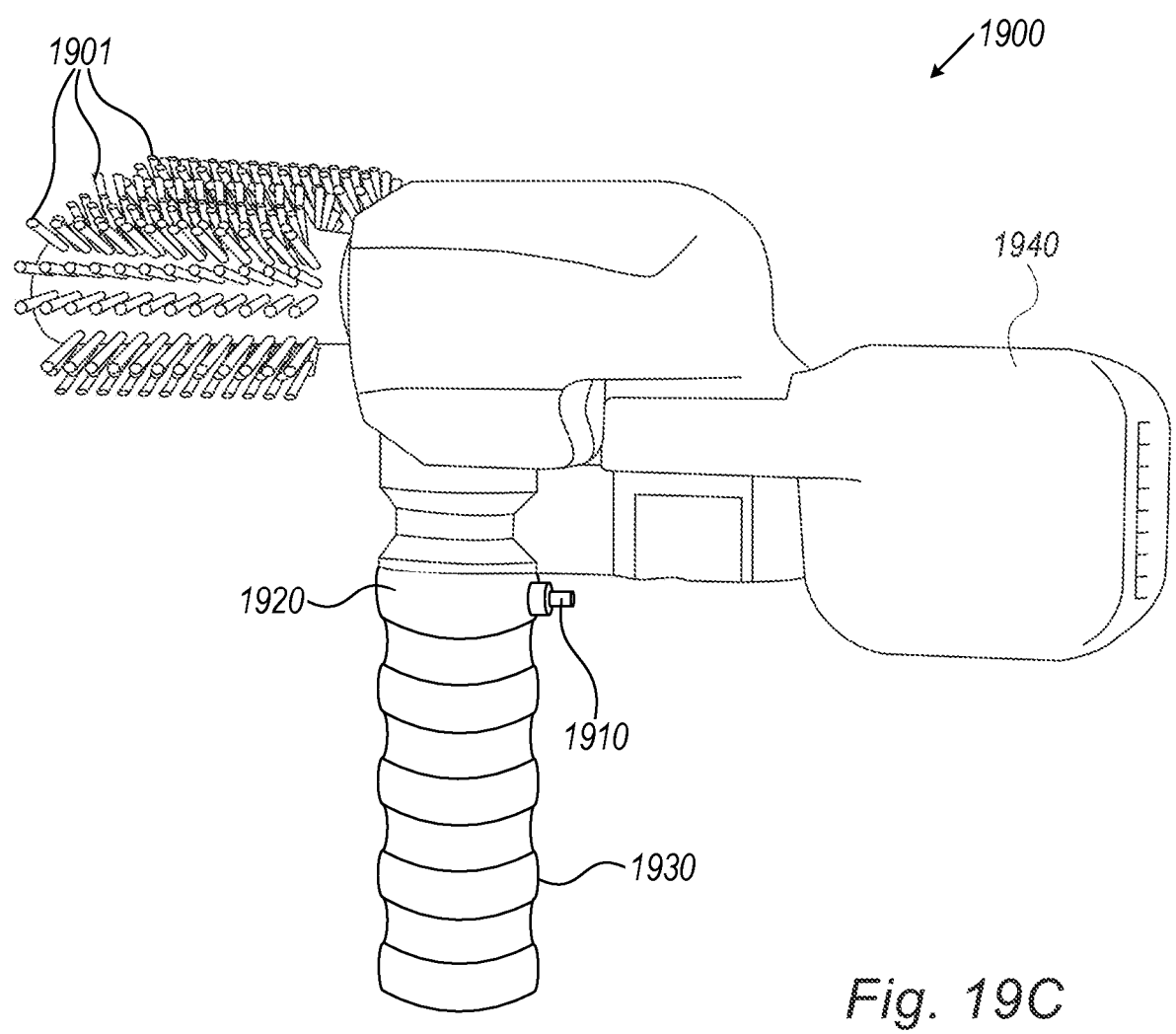
FIG. 19C presents an embodiment of the autonomous pre-milking brush that includes a liquid reservoir.

Reference is now made to FIG. 19C, in which is it shown that, according to some embodiments, autonomous pre-milking brush 1900 includes liquid receptacle 1940. Any type of liquid, e.g., sanitizing liquid or water, may be introduced into liquid receptacle 1940, from where the liquid may be sprayed via, e.g., a nozzle (not shown), onto brushes 1901 and 1902, onto the animal's teats (not shown) or both.

According to some embodiments, switch 1910 may activate the rotation of rotating brushes 1901 and 1902 as well as activating the spraying of liquid from liquid receptacle 1940 onto rotating brushes 1901 and 1902 and/or onto the animal's teats. According to some embodiments, activating switch 1910 once activates both the spraying of the liquid and the rotating of the brushes, either simultaneously or consecutively. According to some embodiments, activating switch 1910 once first activate spraying the liquid onto the brushes/teats and then, after a predetermined time, the brushes begin to rotate.

Further, although not all elements are shown in the Figures, it is noted that the autonomous pre-milking brush may include the following elements: a motor and a rechargeable battery. It is further noted that according to some embodiments, the autonomous pre-milking brush includes a direct drive motor. According to some embodiments, the autonomous pre-milking brush includes a motor for each brush, e.g., when including two brushes, two motors are included as well, wherein each motor operates one brush. According to other embodiments, any number of brushes, e.g., 1, 2, 3, 4, 5 etc., may be operated by one motor. According to some embodiments, the motor used is highly durable, provides high speeds, while requiring a relatively low electric current flow. According to some embodiments, the motor is an RC servos motor. According to some embodiments, the operating speed of the motor is between about 70-300 rpm. according to some embodiments, the stall torque of the motor is between about 1-4 Nm.

Figure 20:
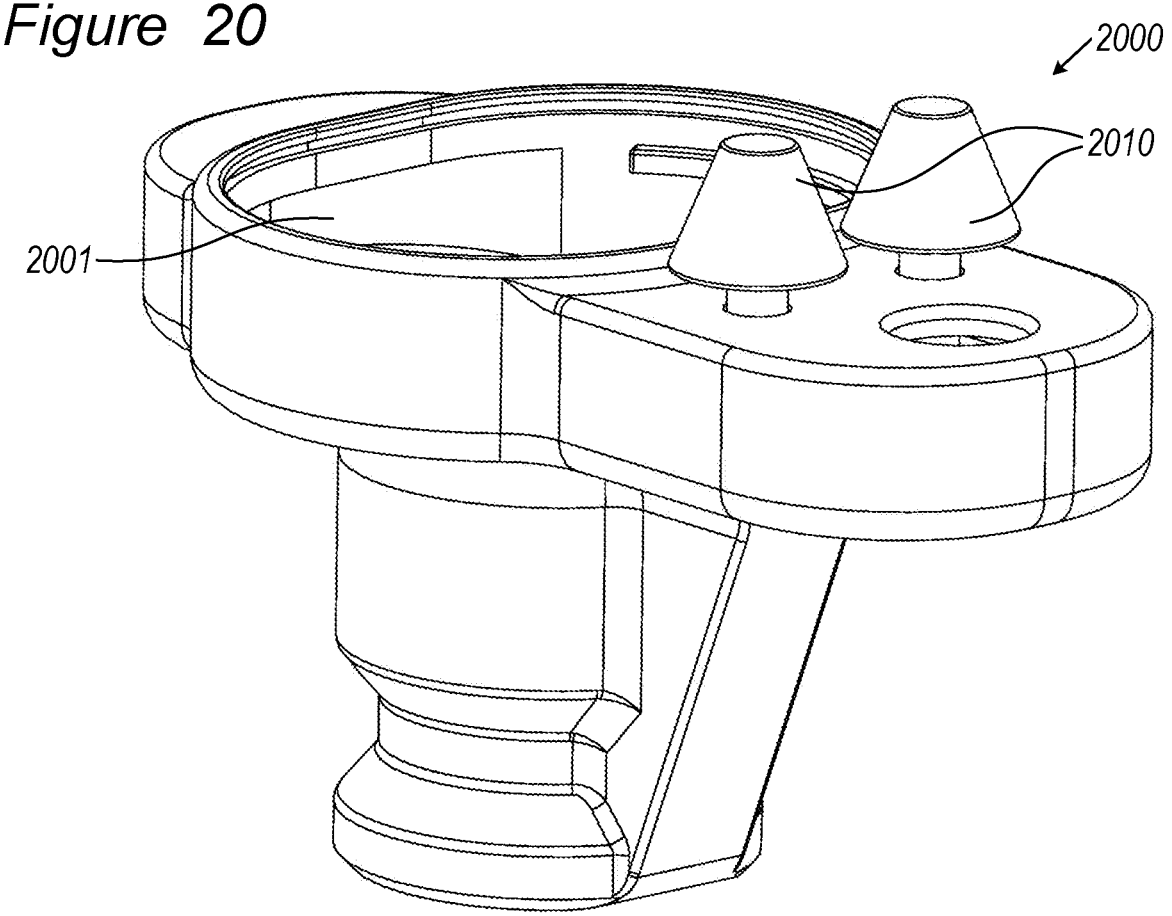
FIG. 20 presents an embodiment of the post-milking disinfection tool.

Reference is now made to FIG. 20, presenting post-milking disinfection tool 2000. As shown, post-milking disinfection tool 2000 comprises dipping chamber 2001, which is filled with a disinfectant (not shown) and filling detection element 2010. According to some embodiments, post-milking disinfection tool 2000 further comprises a brush (not shown), which may be positioned, at least partially, around the entrance of dipping chamber 2001. When post-milking disinfection is required, post-milking disinfection tool 2000 is brought into contact with the animal's teat, wherein post-milking disinfection tool 2000 is pushed up towards the teat, such that the teat is dipped in the disinfectant found in the dipping chamber. If post-milking disinfection tool 2000 includes a brush, the brush may brush the disinfectant on the teat, thereby spreading the disinfectant on the teat. It is noted that post-milking disinfection tool 2000 may be maneuvered manually or by a mobile unit, e.g., being gripped by a gripping element attached to the mobile unit, e.g., lengthwise double gripper 1200, as shown in FIG. 12.

As shown in FIG. 20, post-milking disinfection tool 2000 includes filling detection element 2010, which may detect the amount of disinfectant in dipping chamber 2001, or may simply detect whether dipping chamber 2001 needs to be filled. In the embodiment shown, filling detection element 2010 is a mechanical float the height of which is detected by a sensor, e.g., a laser, on the mobile unit, e.g., on the arm of the mobile unit, e.g., on a gripping element (not shown). If the height of filling detection element 2010 is below a predefined value, the system is alerted that dipping chamber 2001 needs to be filled and therefore, post-milking disinfection tool 2000 is brought to a filling station.

Figure 21:
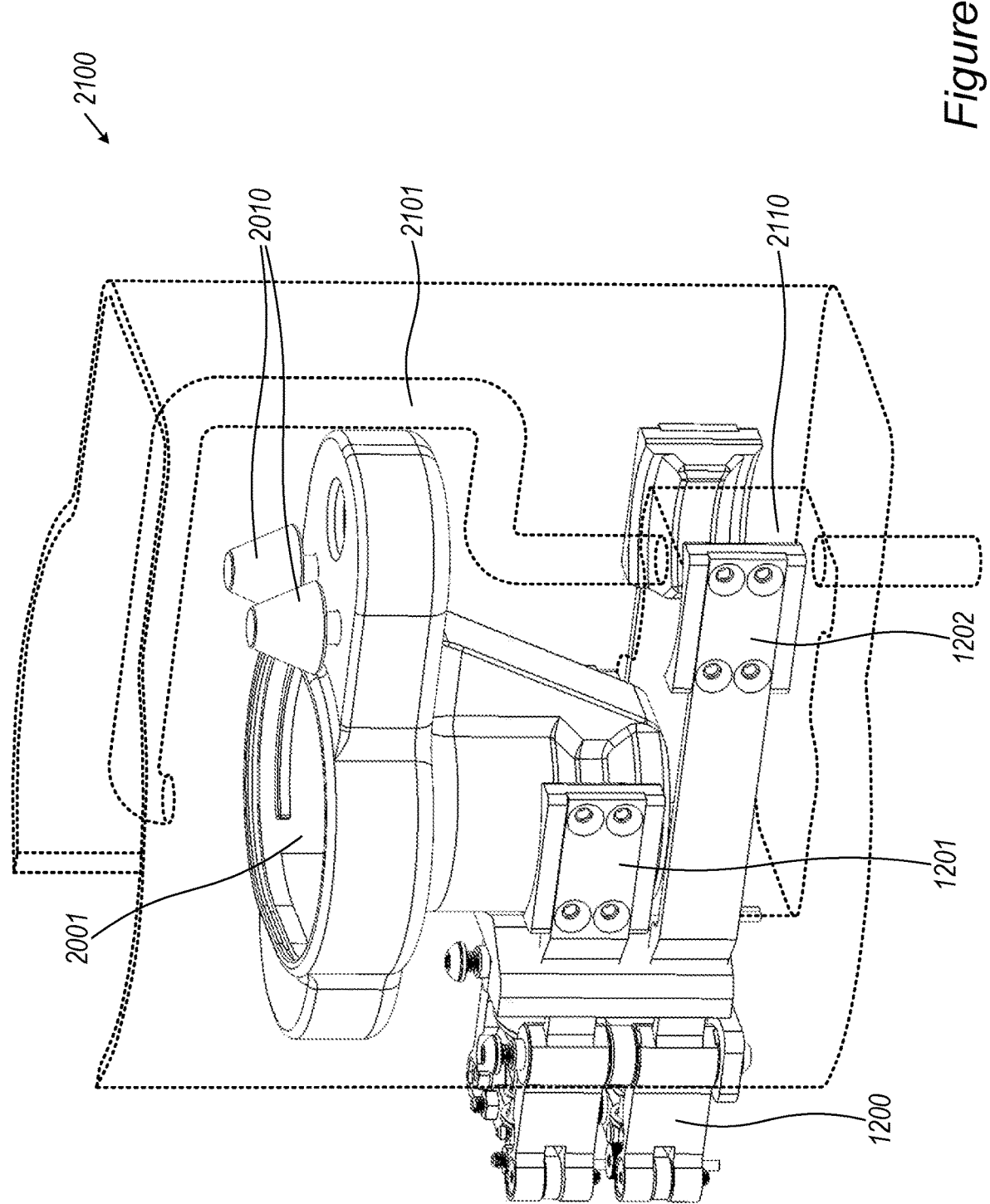
FIG. 21 presents an embodiment of the post milking disinfection tool in the filling station.

Reference is now made to FIG. 21, presenting an embodiment of filling station 2100. As mentioned above, post-milking disinfection tool 2000 may be maneuvered by a mobile unit, e.g., being gripped by lengthwise double gripper 1200. As shown in FIG. 21, gripping unit 1201 grips post-milking disinfection tool 2000, while gripping unit 1202 presses filling activator 2110, in order to fill dipping chamber 2001 with disinfectant (not shown), which flows through tube 2101. Once the system detects, e.g., by a laser on lengthwise double gripper 1200 (not shown) that filling detection element 2010 reaches a predefined height, the filling is ceased, e.g., by gripping unit 1202 releasing filling activator 2110. Once filled, post-milking disinfection tool 2000 may be maneuvered back to the teat of an animal by the mobile unit and lengthwise double gripper 1200. When the post-milking disinfection is concluded, post-milking disinfection tool 2000 may be stored for further use in filling station 2100, which may further serve as a docking station.

Figure 22:
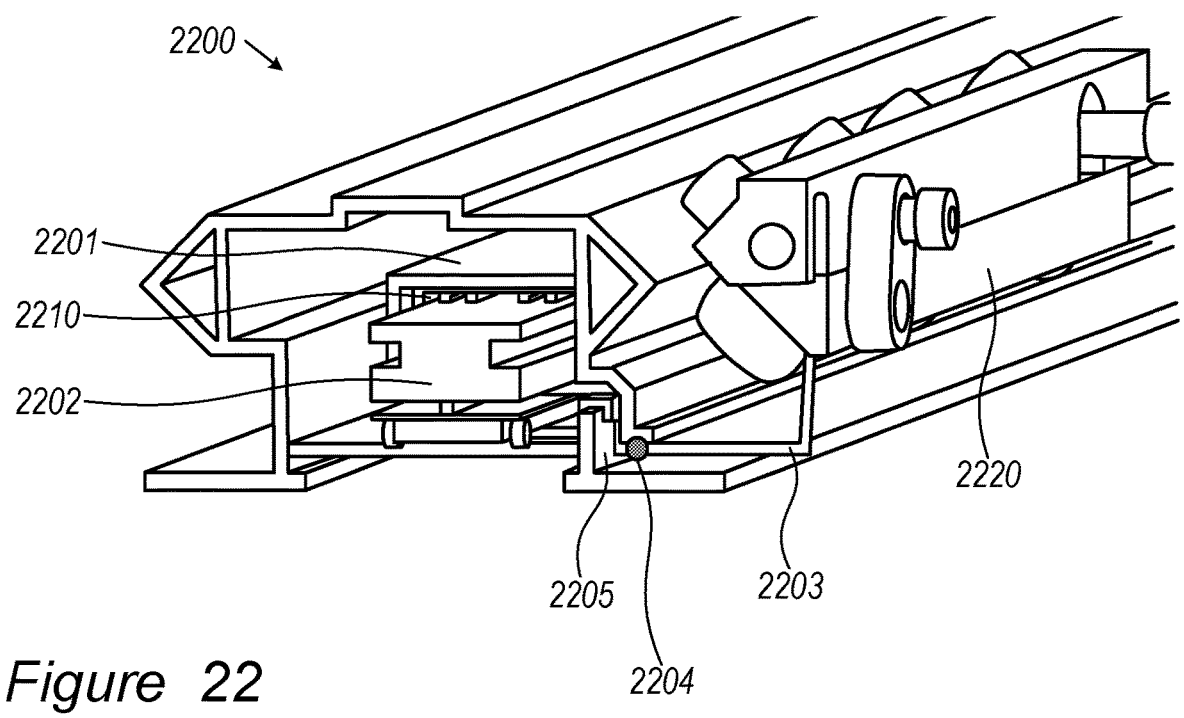
FIG. 22 presents an embodiment of the rail providing electricity to the mobile unit under wet and unsanitary conditions.

Reference is now made to FIG. 22 presenting an embodiment of the rail providing electricity to the mobile unit under wet and unsanitary conditions. As presented in FIG. 22, rail 2200 includes internal housing 2201, which houses contactors 2210. Gliding cart 2202, also found in internal housing 2201, prepared from a conductive material, is in contact with contactors 2210. Gliding cart 2202 is further in contact with (or is coupled to) mobile unit 2220 (not fully shown) via conductive rod 2203 and therefore, electricity is passed from contactors 2210, through gliding cart 2202 and conductive rod 2203 to mobile unit 2220. As detailed above, mobile unit 2220 comprises a motor that allows mobile unit 2220 to move along rail 2200, wherein gliding cart 2202, attached to mobile unit 2220, is pulled along the rail, inside housing 2201, together with mobile unit 2220.

Further, as detailed above, since rail 2200 is positioned on the floor of the ramp in the milking parlor, i.e., where the animals stand and walk, rail 2200 is designed such that water and contaminations do not come in contact with gliding cart 2202, contactors 2210, conductive rod 2203, or any other electrical elements. Accordingly, exposed electrical elements, such as conductive rod 2203 are securely insulated.

Further, the entrance of conductive rod 2203 into internal housing 2201 may be through a rubber stopper 2204 and/or a water block 2205, wherein water block 2205 may have a labyrinth shape, as shown.

Unless explicitly stated, the method embodiments described herein are not constrained to a particular order or sequence. Additionally, some of the described method embodiments or elements thereof can occur or be performed simultaneously, at the same point in time, or concurrently.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

The invention claimed is:

1. Voluntary livestock milking system comprising:
    a plurality of voluntarily accessible milking stalls for holding dairy livestock, wherein the dairy livestock freely roam in an area outside the milking stalls and enter the milking stalls, without human intervention, for milking;
    vertical upright teat cup holders comprising teat cups, which are part of the milking stalls and are connected directly to a main milk-line; and
    at least one mobile unit comprising:
        equipment for treating livestock and a processor, wherein the mobile unit is configured to:
            travel between the fore legs and hind legs of the dairy livestock; and
            use the equipment to perform at least one action related to a treatment of the dairy livestock;
        wherein the equipment includes an arm configured to withdraw the teat cups from the vertical teat cup holder and connect them to the dairy livestock, and
    wherein the vertical upright teat cup holders move vertically, such that a bottom end of the vertical upright teat cup holders is positioned above the livestock, when said livestock is entering the milking stall, and wherein the bottom end of the vertical teat cup holders is positioned below the level of the livestock's udder when the livestock is positioned in the milking stall, and wherein milk from the animal is milked to a high line.

2. The system according to claim 1, wherein the milking stalls in the plurality of milking stalls are adjacent to one another, and wherein each milking stall is voluntarily accessible, not depending on the occupancy of any of the other adjacent milking stalls.

3. The system according to claim 1, wherein the milking stall has a front end and a rear end and wherein the milking stall is designed for the animal to enter and exit the milking stall from the rear end.

4. The system according to claim 3, wherein the milking stall is wide enough for the animal to rotate within the milking stall in order to exit the milking stall from the rear end.

5. The system according to claim 3, wherein the milking stall is designed for the animal to back out of the rear end of the milking stall in order to exit the milking stall.

6. The system according to claim 1, wherein the milking stall has a front end, a front side or both, a rear side, a rear end or both, and wherein the milking stall is designed for the animal to enter the milking stall from the rear end or the rear side and exit the milking stall from the front end or the front side.

7. The system according to claim 6, wherein the front end of the milking stall is equipped with a barrier having a closed configuration and an opened configuration and wherein, when the barrier is transformed to the closed configuration, the animal is restrained within the milking stall and when the barrier is transformed to the opened configuration, the animal may exit the milking stall from the front end.

8. The system according to claim 1, wherein the plurality of milking stalls is divided into separate groups, such that each separate group comprises at least one milking stall.

9. The system according to claim 8, wherein each separate group of milking stalls comprises at least one mobile unit.

10. The system according to claim 9, wherein the mobile units are prevented from traveling from a first group of milking stalls to a second group of milking stalls.

11. The system according to claim 8, wherein at least one mobile unit may travel from a first group of milking stalls to a second group of milking stalls.

12. The system according to claim 1, wherein the vertical upright teat cup holders are protected by a protecting element.

13. Voluntary livestock milking system comprising:
    a plurality of voluntarily accessible milking stalls for holding dairy livestock, wherein the dairy livestock freely roam in an area outside the milking stalls and enter the milking stalls, without human intervention, for milking;
    vertical upright teat cup holders comprising teat cups, which are part of the milking stalls and are connected directly to a main milk-line; and
    at least one mobile unit comprising:
        equipment for treating livestock and a processor, wherein the mobile unit is configured to:
            travel between the fore legs and hind legs of the dairy livestock; and
            use the equipment to perform at least one action related to a treatment of the dairy livestock;
        wherein the equipment includes an arm configured to withdraw the teat cups from the vertical teat cup holder and connect them to the dairy livestock;
    wherein the bottom end of the vertical teat cup holders is lower than the platform or ramp on which the livestock enter the milking stall.

14. A method for milking animals, said method comprising:
    allowing at least one animal to voluntarily enter a milking stall, wherein said milking stall is one of a plurality of milking stalls and is equipped with a vertical upright teat cup holder comprising teat cups that are connected directly to a main milk line;
    a mobile unit positioning itself, at least partially, between the front legs and hind legs of the animal;
    attaching the teat cups to said animal by said mobile unit, thereby milking said animal, such that milk flows directed into the main milk line;
    detaching the teat cups from said animal and returning them to the vertical upright teat up holder by said mobile unit, when the milking is completed; and
    allowing said animal to exit the milking stall, and
    wherein the vertical upright teat cup holder moves vertically, wherein, during milking, the vertical teat cup holder is at a high position while during a time when an animal enters the milking stall, the vertical teat cup holder is at a low position.

* * * * *